(12) United States Patent
Morishima et al.

(10) Patent No.: US 7,664,514 B2
(45) Date of Patent: Feb. 16, 2010

(54) INFORMATION PROVISION METHOD AND COMPUTER-READABLE RECORDING MEDIUM RECORDING INFORMATION PROVISION PROGRAM

(75) Inventors: Hisayuki Morishima, Kawasaki (JP); Jun Kakuta, Kawasaki (JP); Takashi Ohno, Kawasaki (JP); Shingo Fujimoto, Kawasaki (JP); Yuuki Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 11/364,546

(22) Filed: Mar. 1, 2006

(65) Prior Publication Data

US 2006/0200540 A1 Sep. 7, 2006

Related U.S. Application Data

(63) Continuation of application No. PCT/JP03/11326, filed on Sep. 4, 2003.

(51) Int. Cl.
*H04Q 7/20* (2006.01)
(52) U.S. Cl. .................................. 455/456.3; 709/220
(58) Field of Classification Search ........................ None
See application file for complete search history.

(56) References Cited

U.S. PATENT DOCUMENTS

| 2001/0056489 A1* | 12/2001 | Ariga ........................... 709/225 |
| 2002/0184089 A1 | 12/2002 | Tsou et al. |
| 2003/0148771 A1* | 8/2003 | de Verteuil .................. 455/456 |

FOREIGN PATENT DOCUMENTS

| EP | 1320242 | 6/2003 |
| JP | 56-86542 | 7/1981 |
| JP | 09-298766 | 11/1997 |
| JP | 2001-326960 | 11/2001 |
| WO | 00/28759 | 5/2000 |
| WO | WO 00/54532 | 9/2000 |
| WO | 00/65747 | 11/2000 |
| WO | WO 02/05586 | 1/2002 |

OTHER PUBLICATIONS

International Search Report dated Dec. 24, 2003 in corresponding Application PCT/JP03/11326.
Patent Abstracts of Japan, Publication No. 11-004476, Published Jan. 6, 1999.

(Continued)

*Primary Examiner*—Lester Kincaid
*Assistant Examiner*—Phuoc Doan
(74) *Attorney, Agent, or Firm*—Staas & Halsey LLP

(57) ABSTRACT

The object is to enable suppression of an excessive number of changes in assignment of a server in charge of communication in response to movement of a terminal. A position-information acquisition unit in a computer acquires information on the position of a mobile terminal as a candidate for a destination of information provision. Then, a zone determination unit determines whether or not the mobile terminal is in a coverage zone or a margin zone on the basis of the information on the position. An information provision unit starts the information provision to the mobile terminal when the mobile terminal enters the coverage zone, and ends the information provision to the mobile terminal when the mobile terminal goes out of the margin zone.

16 Claims, 35 Drawing Sheets

OTHER PUBLICATIONS

Patent Abstracts of Japan, Publication No. 56-086542, Published Jul. 14, 1981.
Patent Abstracts of Japan, Publication No. 2001-326960, Published Nov. 22, 2001.
Patent Abstracts of Japan, Publication No. 2002-009691, Published Jan. 11, 2002.
Patent Abstracts of Japan, Publication No. 2002-064848, Published Feb. 28, 2002.
Patent Abstracts of Japan, Publication No. 2002-159048, Published May 31, 2002.
Patent Abstracts of Japan, Publication No. 2003-027529, Published Jan. 29, 2003.
Patent Abstracts of Japan, Publication No. 2003-076690, Published Mar. 14, 2003.
Patent Abstracts of Japan, Publication No. 2003-256308, Published Sep. 12, 2003.
"Internet Navigware Server Enterprise Edition", http://www.wlearning.net/products/i-navi/inse.html, Aug. 15, 2003, pp. 1-3 (3 pp).
Japanese Patent Office Action issued Nov. 11, 2008 in corresponding Japanese Patent Application No. 2005-508789.
Patent Abstracts of Japan, publication No. 09-298766[1], published Nov. 18, 1997.
Supplemental European Search Report dated Mar. 17, 2009 for corresponding application No. 03818573.2.
European Search Report mailed May 28, 2009 and issued in corresponding European Patent Application 03 818 573.2.

* cited by examiner

111 COVERAGE-DEFINITION TABLE

| Hostname | Coverage Zone | Margin | Designated Zone | Allowable Residence Time | Upper-limit Index | Lower-limit Index |
|---|---|---|---|---|---|---|
| α | 134.12.10<br>45.15.10<br>134.12.15<br>45.15.15 | 2 | 1 | 60 | 500,0.8<br>500,0.5 | 100,1.5<br>100,1.5 |
| β | 134.12.15<br>45.15.10<br>134.12.20<br>45.15.15 | 2 | 1 | 60 | 500,0.8<br>500,0.5 | 100,1.5<br>100,1.5 |
| γ | 134.12.15<br>45.15.05<br>134.12.20<br>45.15.10 | 1 | 2 | 120 | 1000,0.5<br>500,0.1 | 500,1.5<br>1000,2.0 |
| ... | ... | ... | ... | ... | ... | ... |

FIG. 6

112 SHOP-INFORMATION TABLE

| Name of Shop | Location | Coverage Zone | Shop Information | Category |
|---|---|---|---|---|
| a | 134.12.11 45,15.11 | A | This shop affords a beautiful night view. | Restaurant |
| b | 134.12.16 45,15.12 | A, B | You can get a free drink during rainy season. | Bar |
| c | 134.12.23 45,15.23 | C | Dinner menu is changed for summer. | Restaurant |
| ... | ... | ... | ... | ... |

211 COVERAGE-ZONE TABLE

| Coverage Zone | Margin | Designated Zone | Allowable Residence Time | Upper-limit Index | Lower-limit Index |
|---|---|---|---|---|---|
| 134.12.10 45.15.10 134.12.15 45.15.15 | 2 | 1 | 60 | 500,0.8 500,0.5 | 100,1.5 100,1.5 |

212 LOCAL-SHOP-INFORMATION TABLE

| Name of Shop | Shop Information | Zone |
|---|---|---|
| a | This shop affords a beautiful night view. | A |
| b | You can get a free drink during rainy season. | A |
| c | This Restaurant opened in July. | M1 |
| d | Please have delicious French food. | M2 |
| ... | ... | ... |

FIG. 11

213 NUMBER-OF-SERVED-USERS TABLE

| Location of User's Terminal | Number of Terminals |
|---|---|
| In Coverage Zone | 120 |
| In Designated Zone | 25 |
| In Margin M1 | 14 |
| ... | |
| In Margin M8 | 28 |
| In Adjacent Zone Containing M1 | 65 |
| ... | |
| In Adjacent Zone Containing M8 | 31 |

FIG. 12

214 SERVED-USER TABLE

| User | Category Requested to Deliver | Terminal-staying Zone | Margin-entry Time |
|---|---|---|---|
| IM Address #1 | Restaurant | M3 | 14:15:20 |
| IM Address #2 | Restaurant, Bar | A | |
| IM Address #3 | Bar | M7 | 14:14:03 |
| ... | ... | ... | ... |

FIG. 13

INFORMATION PROVISION METHOD AND COMPUTER-READABLE RECORDING MEDIUM RECORDING INFORMATION PROVISION PROGRAM

This application is a continuing application, filed under 35 U.S.C. §111(a), of International Application PCT/JP2003/11326, filed Sep. 4, 2003.

BACKGROUND OF THE INVENTION

1. Field of the Invention

The present invention relates to an information provision method, an information provision device, and a computer-readable recording medium in which the information provision program is recorded. In particular, the information provision method, the computer-readable recording medium recording the information provision program, and the information provision device are arranged for providing information to one or more mobile terminals in a coverage zone.

2. Description of the Related Art

Conventionally, when a system for a large-scale information provision service is constructed, loads are balanced in order to secure scalability of the system, where the scalability is a degree of adaptability for qualitative and quantitative changes in requests for processing. The load balancing is broadly divided into the zone-based load balancing and the content-based load balancing. In the zone-based load balancing, servers having identical content are assigned on a zone-by-zone basis, for example, on a prefecture-by-prefecture basis, i.e., servers which serve users are assigned according to the positions at which the users establish connections. In the content-based load balancing, servers are assigned on a content-by-content basis, i.e., servers which serve users are assigned according to the content which the users request.

In the case where a predetermined server is assigned for terminals in a predetermined zone according to the zone-based load balancing, errors in detection of the locations of the terminals may create a possibility that a terminal which is actually located inside the zone is determined to be located outside the zone when the location of the terminal is near a boundary of the zone. Therefore, a technique for flexibly determining whether a terminal is located inside or outside a zone is disclosed. For example, in the technique disclosed in Japanese Unexamined Patent Publication No. 2003-27529 (hereinafter referred to as JPP 2003-27529), a hysteresis zone is defined between an operation zone and a nonoperation zone in remote control of a construction machine.

One of services using a load-balancing system is the service for providing to each user shop-information content appropriate for the location of the users' terminal. In many cases where such service is provided, the area over which information is delivered is large, and the number of content items is great. Therefore, in such cases, load balancing is necessary. In the services in which content corresponding to the location of each of users' terminals is provided, it is possible to secure scalability by combining the zone-based load balancing and the content-based load balancing.

When a server assigned to each zone manages content items related to localities in the zone and users' terminals in the zone, it is possible to combine the zone-based load balancing and the content-based load balancing. However, when a user's terminal moves from a first zone covered by a first server to a second zone covered by a second server, operations for the second server inheriting information on the user's terminal from the first server are automatically performed between the first and second servers. Thus, the second server takes charge of the user's terminal.

Nevertheless, according to the above method, the operations for transferring user information on the user's terminal from the first server assigned to the first zone to the second server assigned to the second zone are necessary when the user's terminal moves from the first zone to the second zone. At this time, if processing for data storage into or data acquisition from a database or other similar processing occurs, the calculation cost becomes particularly high. In particular, when the user's terminal continuously moves around a boundary, zone changes frequently occur, so that the loads imposed on the servers become very heavy.

According to the technique disclosed in JPP 2003-27529, when the construction machine moves from the nonoperation zone into the hysteresis zone, it is determined that the construction machine directly enters the operation zone. Therefore, when the construction machine moves around the boundary between the hysteresis zone and the nonoperation zone, the determination whether the construction machine is in the operation zone or in the nonoperation zone successively changes. That is, the technique disclosed in JPP 2003-27529 cannot solve the aforementioned problem.

SUMMARY OF THE INVENTION

The present invention is made in view of the above problems, and the object of the present invention is to provide an information provision method, an information provision device, and a computer-readable recording medium in which the information provision program is recorded, where the information provision method, the information provision program, and the information provision device can suppress an excessive number of changes in assignment of a server in charge of communication with a terminal when the terminal moves.

In order to accomplish the above object, the present invention provides an information provision method for providing to a mobile terminal information corresponding to a position of the mobile terminal by using a computer. This information provision method comprises: acquiring information on the position of said mobile terminal; determining whether or not said mobile terminal is in one of a coverage zone and a margin zone on the basis of said information on the position, where the coverage zone and the margin zone are defined in advance so that the margin zone is located along an outer boundary of the coverage zone; starting information provision to said mobile terminal when the mobile terminal enters the coverage zone; and ending said information provision to said mobile terminal when the mobile terminal goes out of the margin zone after the mobile terminal becomes a destination of the information provision.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 6 is a diagram illustrating an example of a data structure of a coverage-definition table.

FIG. 8 is a diagram illustrating an example of a data structure of a shop-information table.

FIG. 10 is a diagram illustrating an example of a data structure of a coverage-zone table.

FIG. 11 is a diagram illustrating an example of a data structure of a local-shop-information table.

FIG. 12 is a diagram illustrating an example of a data structure of a number-of-served-users table.

FIG. 13 is a diagram illustrating an example of a data structure of a served-user table.

DESCRIPTION OF THE PREFERRED EMBODIMENTS

An embodiment of the present invention is explained below with reference to drawings.

First, an outline of the present invention which is realized in the embodiment is explained, and thereafter details of the embodiment are explained.

According to the present invention, a margin zone for each zone is defined in portions of adjacent zones. When a mobile terminal goes across the margin zone, it is determined that the mobile terminal has moved to an adjacent zone. Therefore, even when the mobile terminal moves around the boundary of each zone, it is possible to suppress occurrence of zone changes, and increase of loads imposed on servers in the case where the servers are assigned for respective zones for load balancing. In addition, the probability of occurrence of zone changes can be changed according to the loads imposed on each server covering a zone and another server covering an adjacent zone. Thereby, it is possible to prevent excessive suppression of zone changes.

Figure 1:
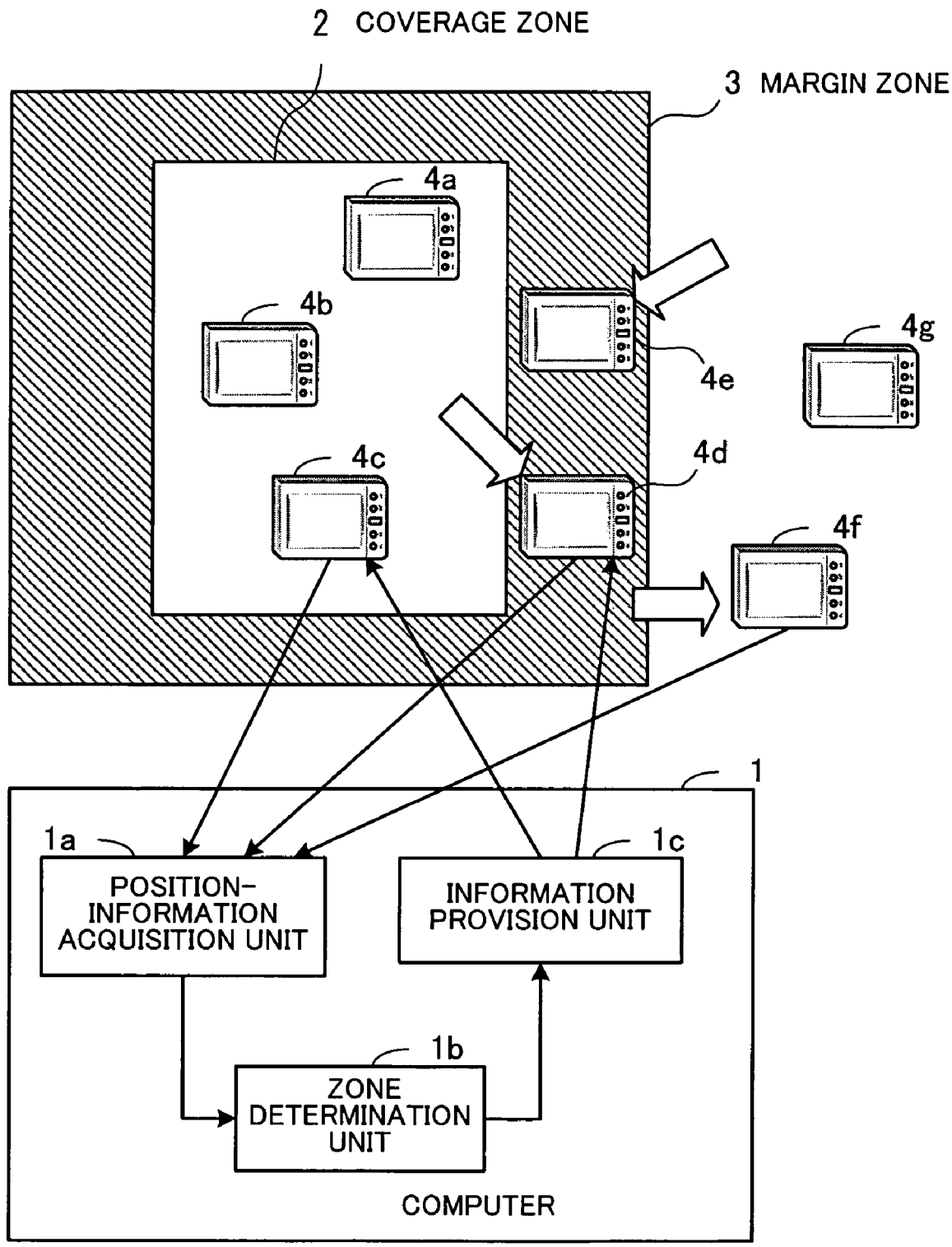
FIG. 1 is a conceptual diagram illustrating the present invention which is realized in an embodiment.

FIG. 1 is a conceptual diagram illustrating the present invention which is realized in an embodiment. The information provision method according to the present invention is provided for providing to the mobile terminals 4a to 4g information corresponding to the positions of the mobile terminals 4a to 4g by using the computer 1. The computer 1 realizes the functions of a position-information acquisition unit 1a, a zone determination unit 1b, and an information provision unit 1c, and behaves as an information provision device.

The position-information acquisition unit 1a acquires information indicating the positions of one or more of the mobile terminals 4a to 4g as one or more candidates for objects to which information is to be provided. Specifically, information on positions of one or more mobile terminals which are currently staying in a coverage zone 2 or a margin zone 3 or stayed in the coverage zone 2 or the margin zone 3 when an immediately preceding operation of acquiring information on positions of one or more mobile terminals was performed is acquired.

In the zone-determination unit 1b, the coverage zone 2 and the margin zone 3 are defined in advance so that margin zone 3 is located along the outer boundary of the coverage zone 2. The zone determination unit 1b determines whether or not each mobile terminal is in the coverage zone 2 or the margin zone 3, on the basis of the information indicating the position of the mobile terminal and being acquired from the mobile terminal.

When a mobile terminal enters the coverage zone, the information provision unit 1c determines the mobile terminal to be an object to which information is to be provided, and starts information provision to the mobile terminal. Thereafter, when a mobile terminal which is determined to be an object to which information is to be provided goes out of the margin zone, the information provision unit 1c ends the information provision to the mobile terminal.

That is, in the computer 1, when information indicating the position of a mobile terminal is acquired by the position-information acquisition unit 1a, the zone determination unit 1b determines whether or not the mobile terminal is in the coverage zone 2 or the margin zone 3, on the basis of the information indicating the position of the mobile terminal and being acquired from the mobile terminal. When a mobile terminal enters the coverage zone, information provision to the mobile terminal is started by the information provision unit 1c. When a mobile terminal which is determined to be an object to which information is to be provided goes out of the margin zone, information provision to the mobile terminal is ended by the information provision unit 1c.

In the example of FIG. 1, the mobile terminals 4a to 4c are in the coverage zone 2, the mobile terminals 4d and 4e are in the margin zone 3, and the mobile terminals 4f and 4g are outside the coverage zone 2 and the margin zone 3. At this time, it is assumed that the mobile terminal 4d has moved from the coverage zone 2 to the margin zone 3, the mobile terminal 4e has moved from the outside of the coverage zone 2 and the margin zone 3 into the margin zone 3, and the mobile terminal 4f has moved from the margin zone 3 to the outside of the coverage zone 2 and the margin zone 3.

In this case, the computer 1 provides information to the mobile terminals 4a to 4c. In addition, since the mobile terminal 4d has been an object to which information is to be provided when the mobile terminal 4d has been in the coverage zone 2, information provision from the computer 1 is continued even after the mobile terminal 4d has moved to the margin zone 3.

Since the mobile terminal 4e has moved from the outside of the coverage zone 2 and the margin zone 3 to the margin zone 3, the condition for starting information provision (that the mobile terminal 4e should have been in the coverage zone 2) is not satisfied. Therefore, computer 1 does not start information provision to the mobile terminal 4e. Since the mobile terminal 4f has moved from the margin zone 3 to the outside of the coverage zone 2 and the margin zone 3, information provision from the computer 1 to the mobile terminal 4f is ended when information indicating the position of the mobile terminal 4f is sent to the computer 1. Since the mobile terminal 4g remains outside of the coverage zone 2 and the margin zone 3, information is not provided from the computer 1 to the mobile terminal 4g.

As explained above, according to the present invention, the computer 1 starts information provision to a mobile terminal which enters the coverage zone 2. Thereafter, when the mobile terminal moves out of the coverage zone 2 and remains in the margin zone 3, the information provision is continued. Thus, even when a mobile terminal frequently moves into and out of the coverage zone 2, it is possible to reduce the frequency of occurrence of switching operations for starting or ending information provision.

Incidentally, it is possible to arrange a plurality of computers, divide an entire service area into a plurality of zones, balance loads imposed on the plurality of computers (on the basis of the zone-based load balancing), and provide information to one or more mobile terminals in each of the plurality of zones. In this case, it is possible to make a master server manage the coverage zones and margin zones of the respective servers, information which the respective computers should provide, and other information. Each computer recognizes the coverage zone and the margin zone of the computer by inquiring of the master server.

In addition, the master server sends to each computer one or more identifiers for identifying one or more mobile terminals for which information provision is to be started. Specifically, when a first computer ends information provision to a mobile terminal, the first computer sends the identifier of the mobile terminal to the master server. Then, the master server sends the identifier of the mobile terminal to a second computer which covers the current position of the mobile terminal. When the second computer receives the identifier, the second computer acquires information on the position of the mobile terminal, and starts information provision to the mobile terminal when the mobile terminal is in the coverage zone of the second computer. Therefore, even in the case where a plurality of computers provide information to a great number of mobile terminals distributed over a wide area, it is possible to prevent duplicated information provision from more than one computer to one mobile terminal.

The present invention can be used as follows.

First, the computer 1 according to the present invention can dynamically modify the margin zone 3. At this time, the computer 1 determines the increase or decrease in the margin zone of the computer on the basis of some information inputted from outside.

For example, the computer 1 can acquire the number of mobile terminals to which another computer covering another zone adjacent to the coverage zone of the computer 1 is providing information, and modify the margin zone according to the acquired number of the mobile terminals. Specifically, when the number of mobile terminals in an adjacent zone (excluding the mobile terminals in the margin zone of the computer 1) exceeds a predetermined upper limit, the computer 1 enlarges the margin zone. On the other hand, when the number of mobile terminals in an adjacent zone falls below a predetermined lower limit, the computer 1 reduces the margin zone. When the numbers of the mobile terminals in the adjacent zone are between the upper and lower limits, the computer 1 sets the margin zone in accordance with a predetermined value.

Alternatively, the computer 1 can modify the margin zone according to the number of mobile terminals in the coverage zone of the computer 1. Specifically, when the number of mobile terminals in the coverage zone exceeds a predetermined upper limit, the computer 1 reduces the margin zone. On the other hand, when the number of mobile terminals in the coverage zone falls below a predetermined lower limit, the computer 1 enlarges the margin zone. When the number of mobile terminals in the coverage zone is between the upper and lower limits, the computer 1 sets the margin zone in accordance with a predetermined value.

Further, the computer 1 can modify the margin zone according to the number of mobile terminals in the margin zone of the computer 1. Specifically, when the number of mobile terminals in the margin zone exceeds a predetermined upper limit, the computer 1 reduces the margin zone. On the other hand, when the number of mobile terminals in the margin zone falls below a predetermined lower limit, the computer 1 enlarges the margin zone. When the number of mobile terminals in the margin zone is between the upper and lower limits, the computer 1 sets the margin zone in accordance with a predetermined value.

Furthermore, the computer 1 can modify the margin zone according to the number of mobile terminals in a portion of the coverage zone of the computer 1 which is designated in advance. Specifically, when the number of mobile terminals in the designated portion of the coverage zone exceeds a predetermined upper limit, the computer 1 reduces the margin zone. On the other hand, when the number of mobile terminals in the designated portion of the coverage zone falls below a predetermined lower limit, the computer 1 enlarges the margin zone. When the number of mobile terminals in the designated portion of the coverage zone is between the upper and lower limits, the computer 1 sets the margin zone in accordance with a predetermined value.

Secondly, when a mobile terminal stays in the margin zone for a long time, the computer 1 may end information provision to the mobile terminal. For example, the computer 1 holds an allowable residence time in the margin zone in advance, and memorizes the time at which the computer 1 determines that the mobile terminal is in the margin zone on the basis of information on the position of the mobile terminal. Thereafter, when the computer 1 again determines that the mobile terminal is in the margin zone, the computer 1 compares the time at which the computer 1 again determines that the mobile terminal is in the margin zone, with the memorized time. When the allowable residence time is exceeded, the computer 1 ends the information provision to the mobile terminal.

At this time, it is possible to dynamically modify the allowable residence time on the basis of some information inputted from outside.

For example, it is possible to modify the allowable residence time on the basis of the number of mobile terminals to which another computer covering another zone adjacent to the coverage zone of the computer 1 is providing information. Specifically, when the number of mobile terminals in an adjacent zone (excluding the mobile terminals in the margin zone of the computer 1) exceeds a predetermined upper limit, the computer 1 increases the allowable residence time. On the other hand, when the number of mobile terminals in the adjacent zone falls below a predetermined lower limit, the computer 1 decreases the allowable residence time. When the number of mobile terminals in the adjacent zone is between the upper and lower limits, the computer 1 sets the allowable residence time in accordance with a predetermined value.

Alternatively, the computer 1 can modify the allowable residence time according to the number of mobile terminals in the coverage zone of the computer 1. Specifically, when the number of mobile terminals in the coverage zone exceeds a predetermined upper limit, the computer 1 decreases the allowable residence time. On the other hand, when the number of mobile terminals in the coverage zone falls below a predetermined lower limit, the computer 1 increases the allowable residence time. When the number of mobile terminals in the coverage zone is between the upper and lower limits, the computer 1 sets the allowable residence time in accordance with a predetermined value.

Further, the computer 1 can modify the allowable residence time according to the number of mobile terminals in the margin zone of the computer 1. Specifically, when the number of mobile terminals in the margin zone exceeds a predetermined upper limit, the computer 1 decreases the allowable residence time. On the other hand, when the number of mobile terminals in the margin zone falls below a predetermined lower limit, the computer 1 increases the allowable residence time. When the number of mobile terminals in the margin zone is between the upper and lower limits, the computer 1 sets the allowable residence time in accordance with a predetermined value.

Furthermore, the computer 1 can modify the allowable residence time according to the number of mobile terminals in a portion of the coverage zone of the computer 1 which is designated in advance. Specifically, when the number of mobile terminals in the designated portion of the coverage zone exceeds a predetermined upper limit, the computer 1 decreases the allowable residence time. On the other hand, when the number of mobile terminals in the designated portion of the coverage zone falls below a predetermined lower limit, the computer 1 increases the allowable residence time. When the number of mobile terminals in the designated portion of the coverage zone is between the upper and lower limits, the computer 1 sets the allowable residence time in accordance with a predetermined value.

As explained above, even when the mobile terminals move around the boundaries of the zones, it is possible to suppress the frequency of occurrence of switching operations for starting or ending information provision. Therefore, it is possible to suppress increase in the loads caused by movement of the mobile terminals between the zones.

In addition, it is possible to control the frequency of occurrence of zone-change processing in consideration of the load currently imposed on each computer, by dynamically changing the margin zone defined in the zones adjacent to the coverage zone of each computer on the basis of the number of users served by the computer or a server covering an adjacent zone.

Further, it is possible to appropriately perform substantial zone-change processing by setting the allowable residence time for which a mobile terminal can stay in the margin zone.

Furthermore, it is possible to control the frequency of occurrence of zone-change processing in consideration of the load currently imposed on each server, by dynamically changing the allowable residence time on the basis of the number of users served by the server or another server covering an adjacent zone.

Hereinbelow, an embodiment of the present invention is explained in detail, where the present invention is applied to a service of providing shop information which is optimum for the current position of a user carrying a mobile terminal having a GPS (Global Positioning System) function. In the following explanations, a computer which executes an information provision program (i.e., a computer which behaves as an information provision device) is referred to as a host.

Figure 2:
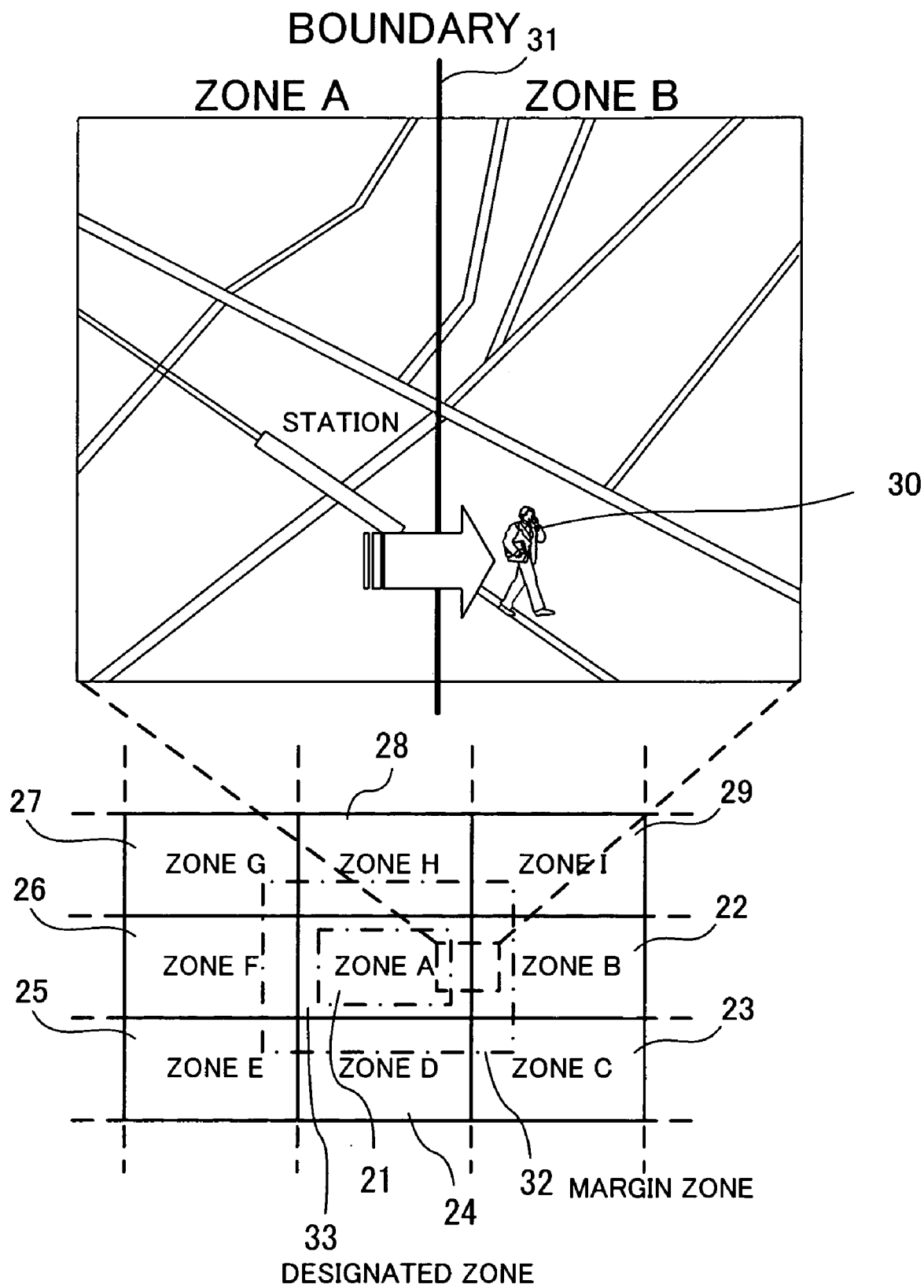
FIG. 2 is a diagram illustrating an example of division into zones.

FIG. 2 is a diagram illustrating an example of division into zones. As illustrated in FIG. 2, the entire service area is divided into a plurality of zones 21 to 29. An identifier is assigned for each of the zones 21 to 29. Specifically, the identifier of the zone 21 is "zone A," the identifier of the zone 22 is "zone B," the identifier of the zone 23 is "zone C," the identifier of the zone 24 is "zone D," the identifier of the zone 25 is "zone E," the identifier of the zone 26 is "zone F," the identifier of the zone 27 is "zone G," the identifier of the zone 28 is "zone H," and the identifier of the zone 29 is "zone I."

A host computer (host) which performs information provision service to one or more mobile terminals in each zone is predetermined. Hereinafter, a host which performs information provision service to a mobile terminal is referred to as a server in charge of service to the mobile terminal. For example, when a user 30 carrying a mobile terminal moves from the zone A to the zone B across the boundary 31, in principle, the server which provides information to the mobile terminal is changed. At this time, if the server in charge of service to the mobile terminal is changed immediately after the user 30 moves across the boundary 31, a change of the server in charge again occurs when the user 30 turns back. Therefore, in a local information system according to the present embodiment, a change of the server in charge is made only when a predetermined condition is satisfied after the user 30 moves across the boundary 31.

Specifically, a margin zone 32 is defined in advance along the outer boundary of the zone A. When the user 30 moves from the zone A to the margin zone 32, the host covering the zone A is still in charge of information provision to the user 30 (even though the user 30 moves to the outside of the zone A). In addition, it is possible to change the host in charge of information provision to the mobile terminal when the time for which the user 30 stays in the margin zone 32 outside the zone A exceeds a predetermined time. For example, when the time for which the user 30 stays in a portion of the margin zone 32 which is defined in the zone B and outside the zone A reaches a predetermined time, another server covering the zone B takes charge of information provision to the user 30.

Further, it is possible to dynamically change the size of the margin zone 32, for example, according to the number of terminals in the zone A, the number of mobile terminals in the margin zone 32, or the number of mobile terminals in the designated zone 33, which is defined inside the zone A along the outer boundary of the zone A.

Figure 3:
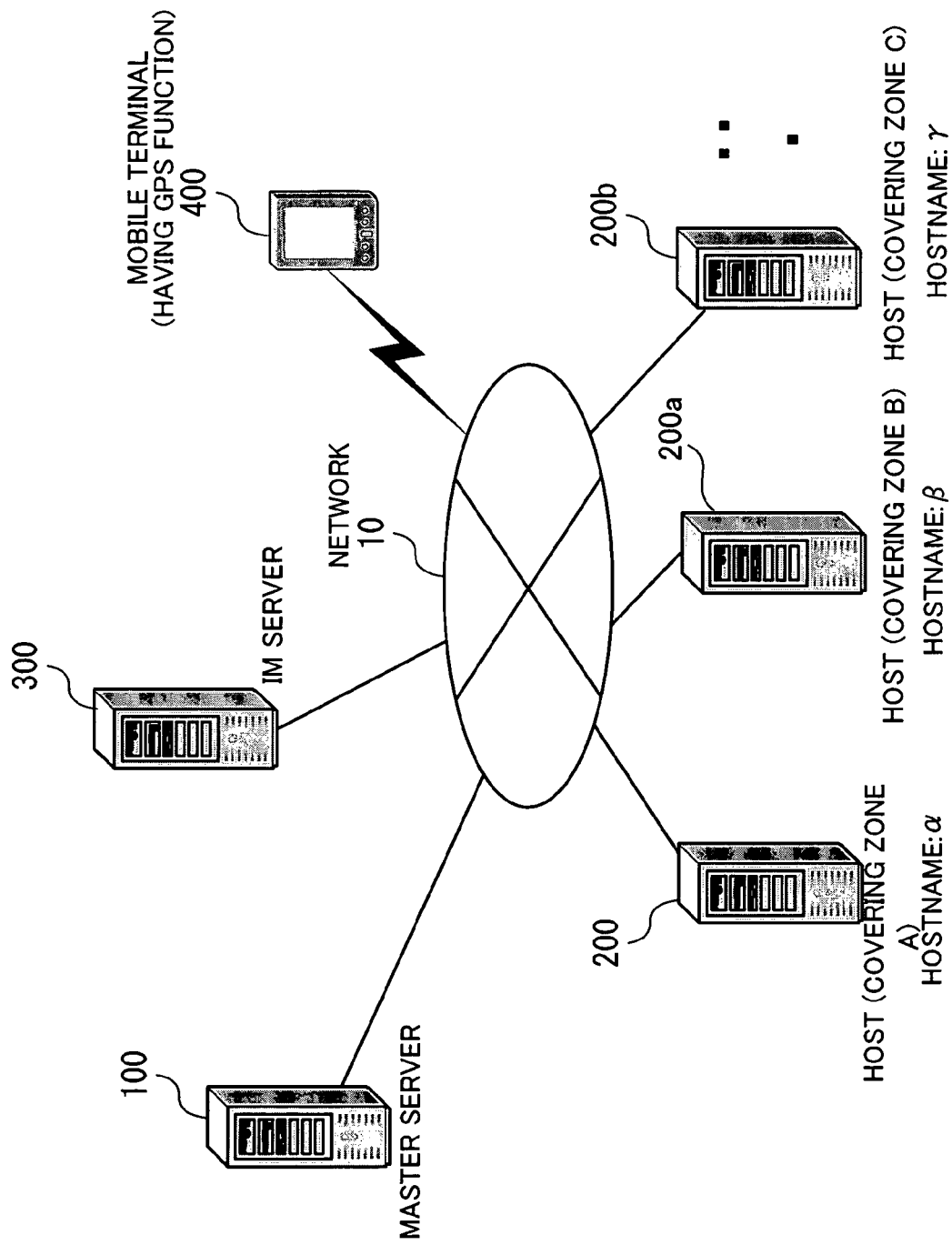
FIG. 3 is a diagram illustrating an example of a construction of a local information system according to the embodiment of the present invention.

FIG. 3 is a diagram illustrating an example of a local information system according to the embodiment of the present invention. The local information system according to the present embodiment is constituted by a plurality of server computers connected through a network 10, which is, for example, a wide-area network such as the Internet. Specifically, a master server 100, a plurality of hosts 200, 200*a*, 200*b*, . . . , an IM (Instant Message) server 300, and a mobile terminal 400 are connected to the network 10.

The master server 100 is a server computer which manages master information for providing service to users. The master server 100 comprises a master DB (database), and performs processing for users' registration and cancellation of registration, where the master DB stores information on coverage zones of the hosts 200, 200*a*, 200*b*, . . . , information on all shops, and the like. For example, the master server 100 delivers to each of the hosts 200, 200*a*, 200*b*, . . . information on shops located in the coverage zone of the host.

Each of the hosts 200, 200*a*, 200*b*, . . . has a local DB (database), which stores information on definitions of the coverage zone and the margin zone of the host, information on shops located in the coverage zone and the margin zone. The operations of each of the hosts 200, 200*a*, 200*b*, . . . include provision of shop information to one or more users staying in the coverage zone of the host, and notification to the master server 100 of movement of a user out of the coverage zone of the host. According to the present embodiment, the host 200 is a server computer covering the zone A, the host 200*a* is a server computer covering the zone B, and the host 200*b* is a server computer covering the zone C. Each of the hosts 200, 200*a*, 200*b*, . . . operates in accordance with a server program (an information provision program), which is prepared for receiving from each mobile terminal information indicating the position of the mobile terminal, and providing information on shops located in the coverage zone of the host to the mobile terminal. According to the present embodiment, the instant messaging technique is used for exchanging information between the mobile terminal 400 and one of the hosts 200, 200*a*, 200*b*, . . . .

In addition, a hostname as an identifier in the network 10 is assigned for each of the hosts 200, 200*a*, 200*b*, . . . . The hostname of the host 200 is "α," the hostname of the host 200*a* is "β," hostname of the host 200*b* is "γ."

The IM server 300 is a server computer which provides to users an instant messaging function, which is a function enabling direct exchange of messages between mobile terminals connected to the network 10. Since the instant messaging function (as distinct from the e-mail function) is used, it is possible to recognize whether or not a registered user is currently connected to the network 10, and send a message to a device connected to the network 10 on a real-time basis.

Hereinbelow, the operations according to the instant messaging technique are briefly explained. The instant messaging technique is constituted by the presence function and the messaging function. The presence function realizes the following service. For example, a user #1 sets in advance in the IM server 300 a subscription of arbitrary information (as presence information) on a user #2. Thereafter, when the user #2 changes the information, the user #1 is informed of the change on a real-time basis. Generally, a subscription to the presence information is realized by using an identifier called an IM address, where the IM address is used in the instant messaging service for identifying each user. In addition, the user which accepts a subscription can be informed of the IM address of the user which requests the subscription, and make a setting for determining one or more information items to be disclosed to the user which requests the subscription. The messaging function is a function of transmitting text messages between the users #1 and #2 on a real-time basis. In this case, the IM address is also used for identifying each user.

In the case where the above functions are used, when each of the hosts 200, 200*a*, 200*b*, . . . starts a subscription by designating the IM address of the mobile terminal 400, the mobile terminal 400 is informed of the IM address of each host and a request for the start of the subscription. When the mobile terminal 400 discloses the positional information as the presence information to the IM address of each of the hosts 200, 200*a*, 200*b*, . . . , the information on the position of the mobile terminal 400 is sent to each host as the presence information, so that each host can send information on shops to the mobile terminal 400 by using the messaging function.

The mobile terminal 400 is a portable computer used by a user for receiving service. The mobile terminal 400 has the GPS function, and can therefore measure the position (latitude and longitude) of the mobile terminal 400. Although not shown in FIG. 3, a wireless base station is connected to the network 10, so that the mobile terminal 400 is connected to the network 10 by performing wireless communication with the wireless base station.

Although the mobile terminal 400 is assumed to be a portable computer in this example, the mobile terminal 400 may be, for example, a mobile phone having the GPS function or another function for acquiring information on the position.

Figure 4:
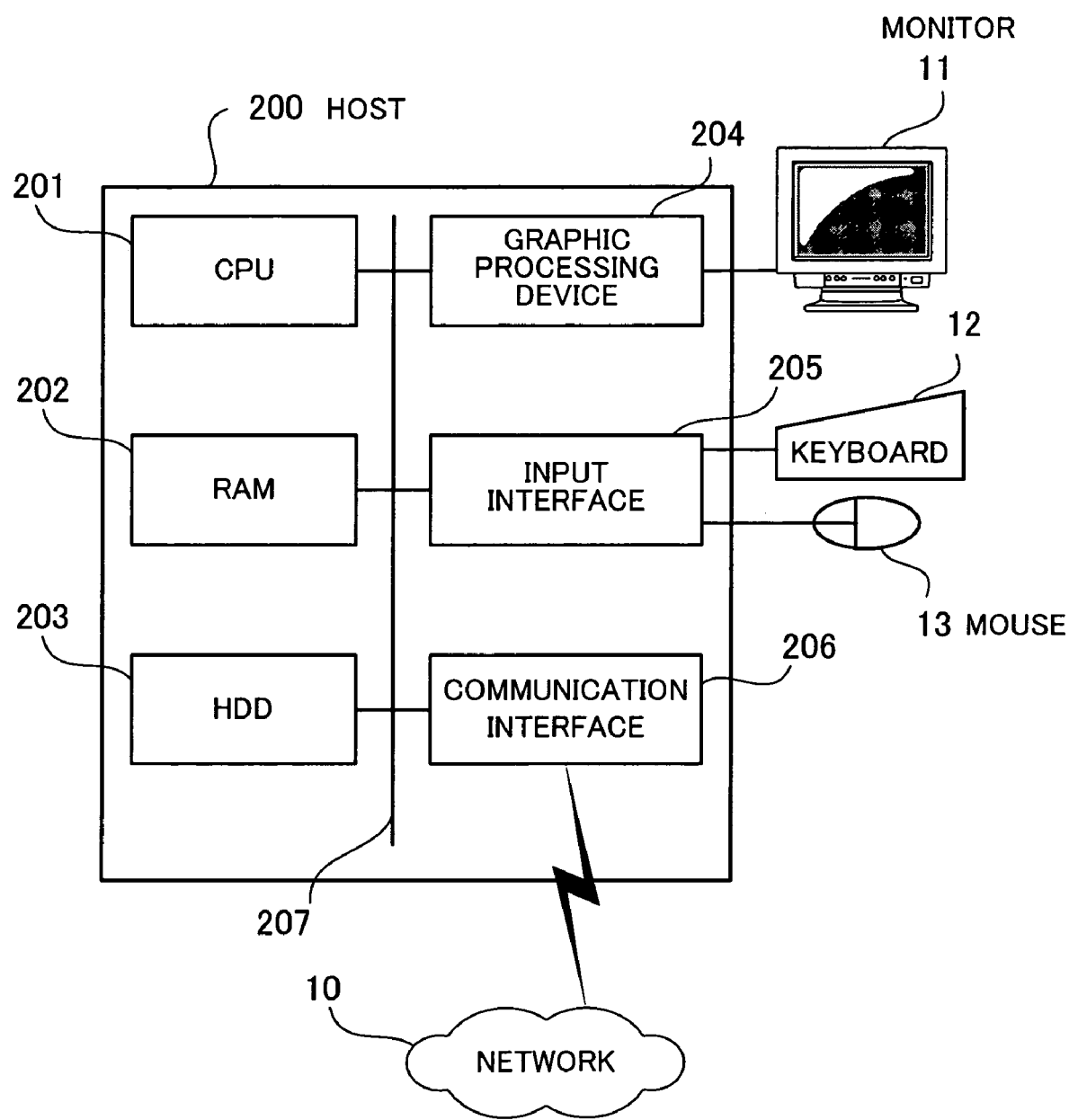
FIG. 4 is a diagram illustrating an example of a hardware construction of a server in charge used in the embodiment of the present invention.

FIG. 4 is a diagram illustrating an example of a hardware construction of a server covering a zone and being used in the embodiment of the present invention. The entire system of the host 200 is controlled by a CPU (central processing unit) 201, to which a RAM (random access memory) 202, an HDD (hard disk drive) 203, a graphic processing device 204, an input interface 205, and communication interface 206 are connected through a bus 207.

The RAM 202 temporarily stores at least portions of an OS (operating system) program and application programs which are executed by the CPU 201, as well as various types of data necessary for processing by the CPU 201. The HDD 203 stores the OS and the application programs.

A monitor 11 is connected to the graphic processing device 204, which makes the monitor 11 display an image on a screen in accordance with an instruction from the CPU 201. A keyboard 12 and a mouse 13 are connected to the input interface 205, which transmits signals sent from the keyboard 12 and the mouse 13, to the CPU 201 through the bus 207.

The communication interface 206 is connected to the network 10. The communication interface 206 is provided for exchanging data with other computers through the network 10.

By using the above hardware construction, it is possible to realize processing functions in the embodiment of the present invention. Although FIG. 4 shows a hardware construction of the host 200, each of the other hosts 200a and 200b . . . , the master server 100, the IM server 300, and the mobile terminal 400 can also be realized by using a similar hardware construction, except that the mobile terminal 400 further comprises a GPS antenna, a circuit for calculating the position on the basis of information received through the GPS antenna, and a wireless communication circuit. Further, the monitor and the keyboard may be built in the mobile terminal 400. Furthermore, it is possible to provide in the mobile terminal 400 a pointing device which uses a stick or a pen, instead of the mouse.

Figure 5:
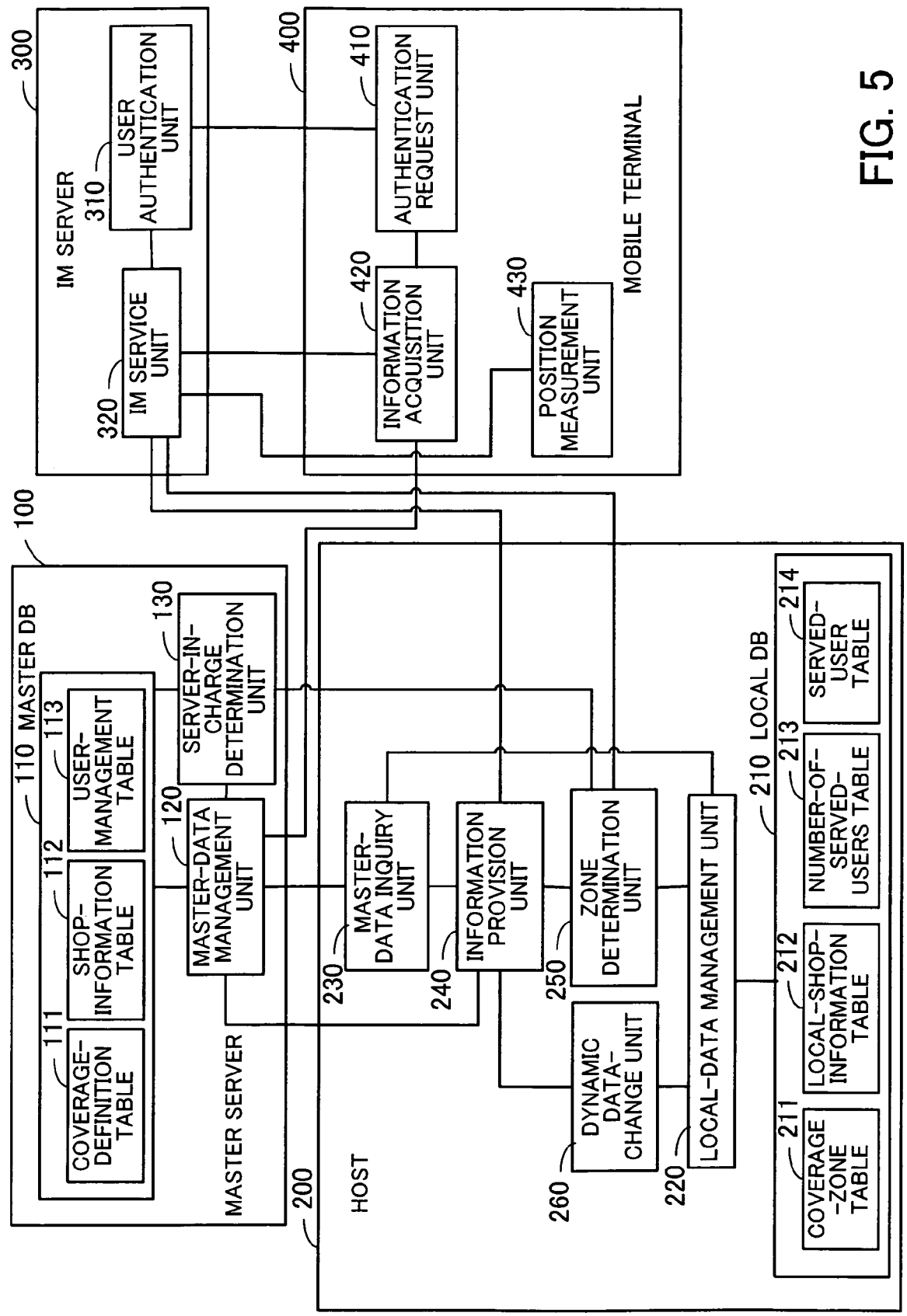
FIG. 5 is a diagram illustrating the functions of the local information system according to the embodiment of the present invention.

FIG. 5 is a diagram illustrating the functions of the local information system according to the embodiment of the present invention. In the example of FIG. 5, the construction of the host 200 is indicated as a representative of the hosts 200, 200a, 200b, . . . since the hosts 200, 200a, 200b, . . . have similar constructions.

The master server 100 comprises the master DB 110, a master-data management unit 120, and a server-in-charge determination unit 130.

The master DB 110 is a database which stores information related to the entire service. The master DB 110 comprises a coverage-definition table 111, a shop-information table 112, and a user-management table 113. Definitions of the coverage zone and the like are registered in the coverage-definition table 111 for each server. Information on shops which is to be provided to users is registered in the shop-information table 112. Management information for each user is registered in the user-management table 113.

The master-data management unit 120 updates various data in the master DB 110, and delivers data registered in the master DB 110 to each server in charge (e.g., the host 200). For example, when a user moves across a boundary between zones, and a server in charge of service to the user is changed, the master-data management unit 120 sends management information for the user to the server which newly takes charge of service to the user.

The server-in-charge determination unit 130 receives an out-of-zone message from the host 200, where the out-of-zone message is a notification that a condition for the host 200 being in charge of service to the user becomes unsatisfied. When the server-in-charge determination unit 130 receives the notification, the server-in-charge determination unit 130 determines a server which should newly take charge of service to the user, and notifies the master-data management unit 120 of the determination.

The host 200 comprises a local DB 210, a local-data management unit 220, a master-data inquiry unit 230, an information provision unit 240, a zone determination unit 250, and a dynamic data-change unit 260.

In the local DB 210, data necessary for managing one or more users served by the host 200, and providing information to the one or more users are registered. Specifically, the local DB 210 stores a coverage-zone table 211, a local-shop-information table 212, a number-of-served-users table 213, and a served-user table 214. In the coverage-zone table 211, information for defining a zone covered by the host 200 is registered. In the local-shop-information table 212, information on shops located in the coverage zone and the margin zone of the host 200 is registered. In the number-of-served-users table 213, the numbers of users in the coverage zone and the margin zone of the host 200 is registered. In the served-user table 214, information for management of the one or more users served by the host 200 is registered.

The local-data management unit 220 manages the data in the local DB 210.

The master-data inquiry unit 230 acquires from the master server 100 the information on the shops located in the coverage zone and the margin zone of the host 200 and the information for management of the one or more users served by the host 200, where these data are registered in the master DB 110.

The information provision unit 240 provides the information on the shops to the users served by the host 200, by using the instant messaging function in the IM server 300.

The zone determination unit 250 acquires information on the position of a user served by the host 200, and determines whether or not the user is staying in the coverage zone or the margin zone.

The dynamic data-change unit 260 dynamically modifies the margin zone on the basis of the data registered in the local DB 210, and the like. The local-data management unit 220 is informed of the modified margin zone, which is then reflected in the information registered in the local DB 210.

The IM server 300 comprises a user authentication unit 310 and an IM service unit 320.

The user authentication unit 310 receives from the mobile terminal 400 a request for authentication, and performs user authentication. The result of the user authentication is transferred to the mobile terminal 400. When the user authentication succeeds, the user authentication unit 310 notifies the IM service unit 320 of the success in the user authentication.

The IM service unit 320 provides a service for relaying messages between devices by using the instant messaging function. Specifically, the IM service unit 320 transfers to the host 200 information outputted from the mobile terminal 400 (e.g., the information on the position or the like) on a real-time basis, and transfers to the mobile terminal 400 information outputted from the host 200 (e.g., the information on the shops or the like). The IM service unit 320 provides the instant messaging service to only one or more mobile terminals of which the user authentication succeeds.

The mobile terminal 400 comprises an authentication request unit 410, an information acquisition unit 420, and a position measurement unit 430.

The authentication request unit 410 sends to the IM server 300 a request for authentication, and receives a result of the authentication processing of the request. When the authentication succeeds, the authentication request unit 410 notifies the information acquisition unit 420 of the success in the authentication.

When the information acquisition unit 420 receives the notification of the success in the authentication in the IM server 300, the information acquisition unit 420 acquires through the IM server 300 information delivered from the host 200, and displays, on a screen, information on shops, which is acquired as above.

The position measurement unit 430 measures the position of the mobile terminal 400 by using the GPS function or the like, and sends information on the position (latitude and longitude) through the IM server 300 to the host 200. It is possible to use a function other than the GPS function as a geodetic function (i.e., a function of measuring a position). For example, it is possible to determine the position of the mobile terminal 400 on the basis of the position of a wireless base station nearest to the mobile terminal 400.

Next, details of the contents of the databases used in the system according to the present embodiment are explained below. First, the data structures of the respective tables in the master DB 110 held in the master server 100 are explained.

FIG. 6 is a diagram illustrating an example of a data structure of the coverage-definition table 111. The coverage-definition table 111 is a table which holds information on coverage zones of the respective servers. The coverage-definition table 111 has the fields of "Hostname," "Coverage Zone," "Margin," "Designated Zone," "Allowable Residence Time," "Upper-limit Index," and "Lower-limit Index." The information items of the respective fields in each row are associated with each other, and constitute a record for each zone.

The "Hostname" field is a field for storing the hostnames of the servers covering the respective zones. In the example of FIG. 6, the hostnames "α," "β," "γ," and the like are registered.

The "Coverage Zone" field is a field for storing information on the definitions of the zones covered by the respective hosts. In each cell in the "Coverage Zone" field, the latitude and the longitude of the bottom left (the southwest corner) of the corresponding zone are indicated in the first and second rows, respectively, and the latitude and the longitude of the top right (the northeast corner) of the corresponding zone are indicated in the third and fourth rows, respectively. For example, the southwest corner of the coverage zone of the host having the hostname "α" is located at 45 degrees, 15 minutes, 10 seconds north latitude and 134 degrees, 12 minutes, 10 seconds east longitude, and the southwest corner of the same coverage zone is located at 45 degrees, 15 minutes, 15 seconds north latitude and 134 degrees, 12 minutes, 15 seconds east longitude. That is, the coverage zone of the host 200 having the hostname "α" is defined by the latitude range of 45 degrees, 15 minutes, 10 to 15 seconds north and the longitude range of 134 degrees, 12 minutes, 10 to 15 seconds east.

Although the zone is indicated by the latitude and the longitude in the above example, alternatively, it is possible to assign a unique ID to a rectangular zone by using the latitude and the longitude, and set the ID in the "Coverage Zone" field. For example, it is possible to produce a unique ID by consecutively arraying the character "E" (indicating "east longitude"), the numbers indicating the longitude in degrees, minutes, and seconds, the character "N" (indicating "north latitude"), and the numbers indicating of the latitude in degrees, minutes, and seconds. Specifically, the widths of each zone in the latitude and longitude directions are defined as 5 seconds in advance, and the ID of a rectangular zone defined by the latitude range of 45 degrees, 15 minutes, 10 to 15 seconds north and the longitude range of 134 degrees, 12 minutes, 10 to 15 seconds east is indicated as "E1341210N451510." Thus, the geographical extent of the above coverage zone can be defined by setting the above ID in the "Coverage Zone" field.

The "Margin" field is a field for storing the width of the margin zone defined outside each coverage zone. The width is indicated by an angle (in seconds) which is to be added to a latitude or a longitude. In the example of FIG. 6, the host 200 having the hostname "α" has a margin of 2 seconds on each side of the coverage zone in each of the latitude and longitude directions. Since the margin zone is defined outside the coverage zone, the margin zone is determined by excluding the coverage zone from the rectangular zone defined by the latitude range of 45 degrees, 15 minutes, 8 to 17 seconds north and the longitude range of 134 degrees, 12 minutes, 8 to 17 seconds east.

Although the widths of the margins in the latitude and longitude directions are identical in the example of FIG. 6, the widths of the margins in the latitude and longitude directions may be different. In addition, although the margin zone is defined by the latitude and the longitude (in seconds) in the example of FIG. 6, alternatively, it is possible to define a rectangular zone corresponding to the outer boundary of the margin zone by indicating an ID (e.g., "E1341208N451508") which is unique to the rectangular zone and similar to the ID explained for the "Coverage Zone" field. In this case, the rectangular zone of FIG. 6 can be defined by a single ID when the widths in the latitude and longitude directions of the rectangular zone corresponding to the outer boundary of the margin zone are defined as 9 seconds in advance.

The "Designated Zone" field is a field for storing the width of a rectangular zone defined inside the coverage zone. The width is indicated by the angle (in seconds) which is to be added to a latitude or a longitude. In the example of FIG. 6, the designated zone of the host 200 having the hostname "α" has a width of one second on each side of the coverage zone in each of the latitude and longitude directions. Since the margin zone is defined inside the coverage zone, the margin zone is determined by excluding from the coverage zone the rectangular zone defined by the latitude range of 45 degrees, 15 minutes, 11 to 14 seconds north and the longitude range of 134 degrees, 12 minutes, 11 to 14 seconds east.

Although the widths of the designated zone in the latitude and longitude directions are identical in the example of FIG. 6, the widths of the designated zone in the latitude and longitude directions may be different. In addition, although the designated zone is defined by the latitude and the longitude (in seconds) in the example of FIG. 6, alternatively, it is possible to define a rectangular zone corresponding to the inner boundary of the designated zone by indicating an ID (e.g., "E1341211N451511") which is unique to the rectangular zone and similar to the ID explained for the "Coverage Zone" field. In this case, the rectangular zone for the designated zone in FIG. 6 can be defined by a single ID when the widths in the latitude and longitude directions of the rectangular zone corresponding to the inner boundary of the designated zone are defined as 3 seconds in advance.

The "Allowable Residence Time" field is a field for storing the maximum time (in seconds) for which the mobile terminal 400 can stay in the margin zone. When the time for which the mobile terminal 400 stays in the margin zone exceeds the allowable residence time, the mobile terminal 400 is determined not to be managed by the corresponding server. For example, in the example of FIG. 6, when the mobile terminal 400 stays in the margin zone for more than 60 seconds, the host 200 having the hostname "α" determines that the mobile terminal 400 is not to be served by the host 200.

The "Upper-limit Index" field is a field for storing indexes for use in adjusting the margin and the allowable residence time when the number of served users in the coverage zone of the host 200 or an adjacent zone exceeds a value stored in this field. Indexes for the margin are indicated in the first line in each cell in the "Upper-limit Index" field, and Indexes for the time are indicated in the second line in each cell in the "Upper-limit Index" field. In the example of FIG. 6, when the number of served users in the coverage zone of the host 200 exceeds 500, the predetermined value of the margin, 2 seconds, is reduced by a factor of 0.8, and the predetermined value of the allowable residence time, 60 seconds, is reduced by a factor of 0.5. In addition, when the number of served users in an adjacent zone exceeds 500, the predetermined value of the margin, 2 seconds, is increased by a factor of 1/0.8, and the predetermined value of the allowable residence time, 60 seconds, is increased by a factor of 1/0.5.

The "Lower-limit Index" field is a field for storing indexes for use in adjusting the margin and the allowable residence time when the number of served users in the coverage zone of the host 200 or an adjacent zone falls below a value stored in this field. Indexes for the margin are indicated in the first line in each cell in the "Lower-limit Index" field, and Indexes for the time are indicated in the second line in each cell in the "Lower-limit Index" field. In the example of FIG. 6, when the number of served users in the coverage zone of the host 200 falls below 100, the predetermined value of the margin, 2 seconds, is increased by a factor of 1.5, and the predetermined value of the allowable residence time, 60 seconds, is increased by a factor of 1.5. In addition, when the number of served users in an adjacent zone falls below 100, the predetermined value of the margin, 2 seconds, is reduced by a factor of 1/1.5, and the predetermined value of the allowable residence time, 60 seconds, is reduced by a factor of 1/1.5.

Although, in the present embodiment, the indexes used for the adjustment of the margin and the allowable residence time on the basis of the number of served users in the coverage zone of the host 200 and the indexes used for the adjustment of the margin and the allowable residence time on the basis of the number of served users in an adjacent zone are identical, alternatively, the indexes based on the number of served users in an adjacent zone may be determined independently of the indexes based on the number of served users in the coverage zone.

Figure 7:
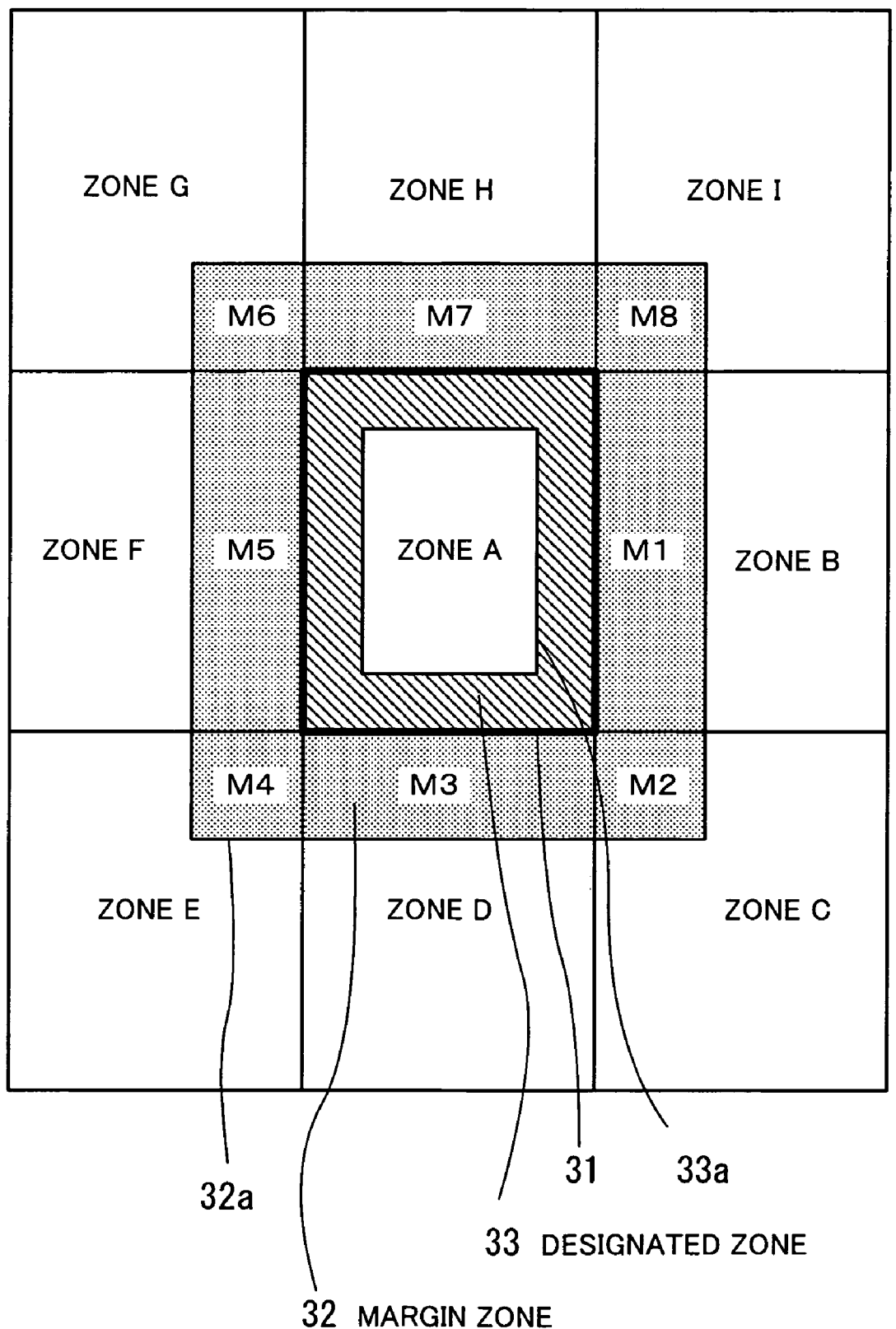
FIG. 7 is a conceptual diagram illustrating a coverage zone "zone A," a margin zone, and a designated zone.

FIG. 7 is a conceptual diagram illustrating the coverage zone "zone A," the margin zone, and the designated zone. The coverage zone "zone A" of the host 200 is inside the rectangular zone encircled by the boundary 31 which is defined in the "Coverage Zone" field in the coverage-definition table 111. The margin zone corresponding to the coverage zone "zone A" is determined by excluding the coverage zone "zone A" from the rectangular zone 32a. The rectangular zone 32a is obtained by adding or subtracting the value defined in the "Margin" field to or from the values defined in the "Coverage Zone" field (e.g., subtracting the value defined in the "Margin" field from the values of the latitude and longitude of the southwest corner, and adding the value defined in the "Margin" field to the values of the latitude and longitude of the northeast corner). In addition, the designated zone 33 corresponding to the zone A is determined by excluding the rectangular zone 33a from the coverage zone "zone A." The rectangular zone 33a is obtained by adding or subtracting the value defined in the "Designated Zone" field to or from the values defined in the "Coverage Zone" field (e.g., adding the margin value to the values of the latitude and longitude of the southwest corner and subtracting the margin value from the values of the latitude and longitude of the northeast corner).

Further, a portion of the margin zone overlapping the zone B is denoted by "M1," a portion of the margin zone overlapping the zone C is denoted by "M2," a portion of the margin zone overlapping the zone D is denoted by "M3," a portion of the margin zone overlapping the zone E is denoted by "M4," a portion of the margin zone overlapping the zone F is denoted by "M5," a portion of the margin zone overlapping the zone G is denoted by "M6," a portion of the margin zone overlapping the zone H is denoted by "M7," and a portion of the margin zone overlapping the zone I is denoted by "M8."

As explained above, a coverage zone is assigned to each server, and information on the margin zone, the designated zone, and the like corresponding to each coverage zone is set in the coverage-definition table 111.

FIG. 8 is a diagram illustrating an example of a data structure of the shop-information table. The shop-information table 112 is a table for holding information on all the shops, which is provided by the service according to the present embodiment. The shop-information table 112 has the fields of "Name of Shop," "Location," "Coverage Zone," "Shop Information," and "Category." The information items of the respective fields in each row are associated with each other. In addition, the shop-information table 112 can further contain other fields for various information, e.g., the fields of "Address," "Telephone Number," "URL of Homepage," and the like.

The "Name of Shop" field is a field for storing the name of each shop.

The "Location" field is a field for storing the location of each shop. Although the latitude and the longitude are stored in the example of FIG. 8, alternatively, it is possible to define the location by indicating an ID (e.g., "E1341211N451511"), which is unique to the geographical position, and similar to the ID explained for the "Coverage Zone" field in the coverage-definition table 111 illustrated in FIG. 6.

The "Coverage Zone" field in the shop-information table 112 is a field for storing names of one or more coverage zones in which each shop is located. The "Coverage Zone" field is set by the master-data management unit 120 in the master server 100 when the information on the shops is read in from a file. For example, when the information in the "Location" field illustrated in FIG. 8 and the "Coverage Zone" field and the "Margin" field in the coverage-definition table 111 illustrated in FIG. 6 are used, it is possible to recognize that the shop having the name "b" is located in the coverage zone B of the host having the hostname "β" and in the margin zone of the host having the hostname "α."

The "Shop Information" field is a field for storing information for explanation on each shop, of which users are to be informed.

The "Category" field is a field for storing information on the category to which each shop belongs.

In addition, the master-data management unit 120 in the master server 100 performs user registration or cancellation of user registration of users who receive the service according to the present embodiment, by using the user-management table 113.

Figure 9:
FIG. 9 is a diagram illustrating an example of a data structure of a user-management table.

FIG. 9 is a diagram illustrating an example of a data structure of the user-management table. The user-management table 113 is a table for holding information on each user to which the service is to be provided. The user-management table 113 has the fields of "User," "Server in Charge," "Default Server in Charge," and "Category of Delivery Request." The information items of the respective fields in each row are associated with each other, and constitute a record.

The "User" field is a field for storing an identifier for identifying each user who is registered for receiving the service according to the present embodiment. When user registration of a user is cancelled, a record corresponding to the identifier of the user is deleted. In the present embodiment, the IM address, which is a user identifier in the instant messaging service, is used as the above identifier for identifying each user.

The "Server in Charge" field is a field for storing the hostname of a server currently in charge of service to each user, and the "Server in Charge" field is updated when the server in charge is changed.

The "Default Server in Charge" field is a field for storing the hostname of a server which temporarily takes charge of service to each user when the user is registered. Concentration of loads on a single server is prevented by using the round-robin technique or the like.

The "Category of Delivery Request" field is a field for storing information on the category which each user requests to deliver. Only necessary information is delivered to each user by using the "Category of Delivery Request" field.

Next, the contents of the respective types of tables held in the local-data management unit 220 in the host 200 are explained below.

FIG. 10 is a diagram illustrating an example of a data structure of the coverage-zone table. The coverage-zone table 211 is a table for holding information on the zone which the host 200 covers. The coverage-zone table 211 has the fields of "Coverage Zone," "Margin," "Designated Zone," "Allowable Residence Time," "Upper-limit Index," and "Lower-limit Index." The information items of the respective fields in each row are associated with each other, and constitute a record. The fields in the coverage-zone table 211 respectively have identical functions to the fields having the identical names in the coverage-definition table 111 in the master server 100. Values acquired by inquiring from the master server 100 when the system is started are set in the respective fields of the coverage-zone table 211. At this time, only the data related to the coverage zone and the like of the host 200, among the data registered in the coverage-definition table 111, are set in the coverage-zone table 211.

FIG. 11 is a diagram illustrating an example of a data structure of the local-shop-information table. The local-shop-information table 212 is a table for holding information on shops, of which the host 200 informs the users. The local-shop-information table 212 has the fields of "Name of Shop," "Shop Information," and "Zone." The information items of the respective fields in each row are associated with each other, and constitute a record. The fields in the local-shop-information table 212 respectively have identical functions to the fields having the identical names in the shop-information table 112 in the master server 100. In addition, the local-shop-information table 212 can further contain other fields for various information, e.g., the fields of "Address," "Telephone Number," "URL of Homepage," and the like. Values acquired by inquiring from the master server when the system is started are set in the respective fields of the local-shop-information table 212. At this time, only the data of shops located in the coverage zone of the host 200 and around the coverage zone (e.g., in the margin zone), among the data registered in the shop-information table 112, are set in the local-shop-information table 212.

FIG. 12 is a diagram illustrating an example of a data structure of the number-of-served-users table. The number-of-served-users table 213 is a data table for managing the number of mobile terminals in each type of zone. The number-of-served-users table 213 has the fields of "Location of User's Terminal" and "Number of Terminals." The information items of the respective fields in each row are associated with each other.

In the "Location of User's Terminal" field, a plurality of types of zones classified on the basis of the locations of mobile terminals carried by users are set. In the example of FIG. 12, the types of zones in the "Location of User's Terminal" field are "In Coverage Zone," "In Designated Zone," "In Margin M1 (the portion of the margin zone on the east side of the coverage zone)," . . . "In Margin M8 (the portion of the margin zone on the northeast side of the coverage zone)," and "In Adjacent Zone Containing Margin M1 (the zone on the east side of the coverage zone)," . . . "In Adjacent Zone Containing Margin M8 (the zone on the northeast side of the coverage zone)."

In the "Number of Terminals" field, the number of mobile terminals located in each type of zone is set.

FIG. 13 is a diagram illustrating an example of a data structure of the served-user table. The served-user table 214 is a data table holding registered information on users the information provision service to which is handled by the host 200. The served-user table 214 has the fields of "User," "Category of Delivery Request," "Terminal-staying Zone," and "Margin-entry Time." The information items of the respective fields in each row are associated with each other.

The "User" field is a field for storing an identifier for identifying each user to which the server 200 in charge should deliver information.

The "Category of Delivery Request" is a field for storing information on the category of the shop information which each user requests to deliver.

The "Terminal-staying Zone" field is a field for storing information indicating the zone in which each user is currently staying. Specifically, information indicating a coverage zone or a margin zone is stored.

The "Margin-entry Time" field is a field for storing the time at which each user first enters the margin zone. When the user moves out of the margin zone, the stored time is cleared.

As explained above, the information provision service is provided in the system having the above construction. Hereinbelow, details of processing performed in each device when the information provision service is provided are explained.

Figure 14:
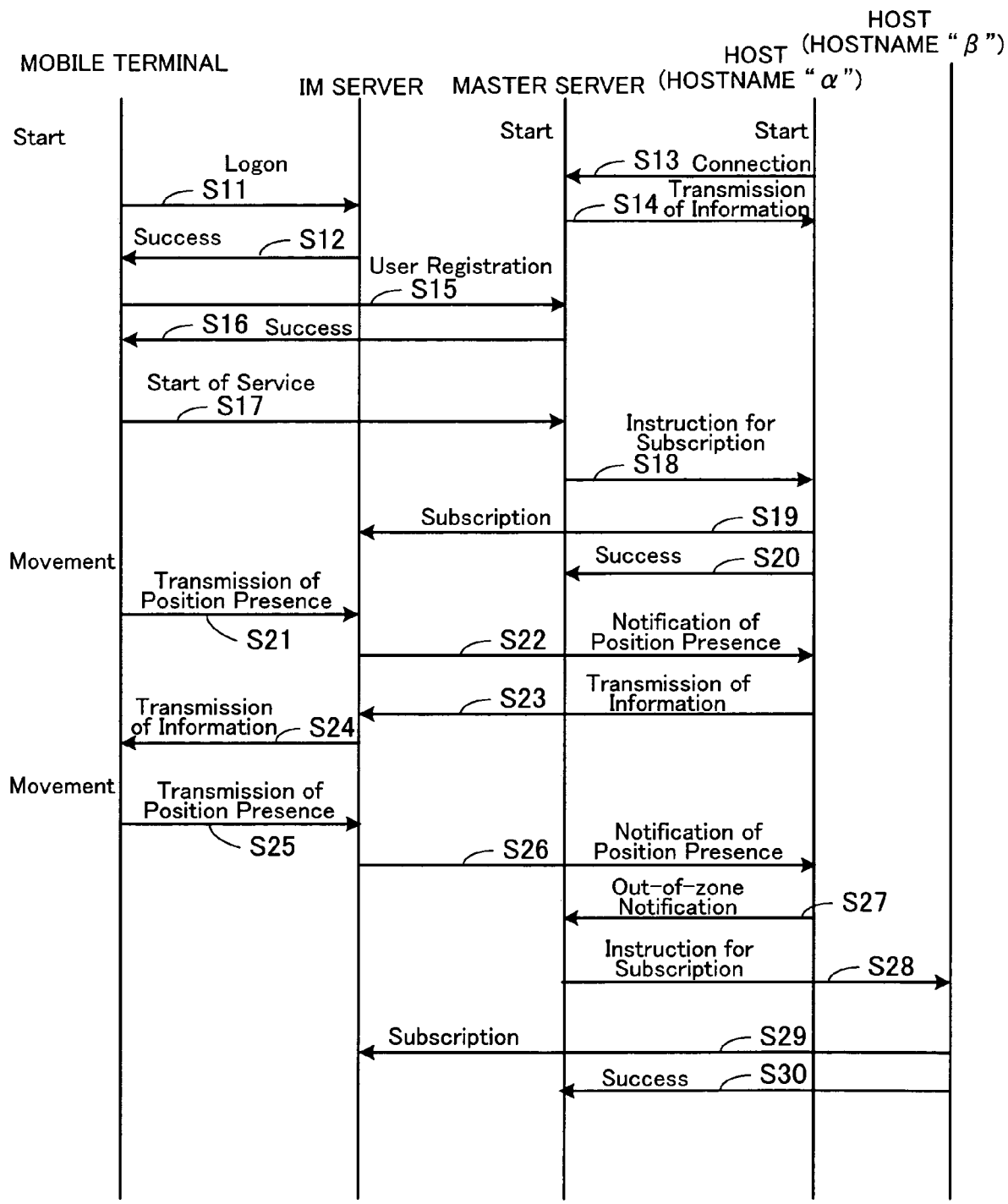
FIG. 14 is a sequence diagram indicating a sequence of processing performed for an information delivery service.

FIG. 14 is a sequence diagram indicating a sequence of processing for the information delivery service. The processing illustrated in FIG. 14 is explained below step by step. In the following explanations, it is assumed that the IM server 300 continuously performs the instant messaging service, aside from the information provision service according to the present embodiment.

<Step S11> When the mobile terminal 400 is started, the mobile terminal 400 performs processing for logging on to the IM server 300. Details of this processing are explained later (with reference to FIG. 15).

<Step S12> When the IM server 300 accepts the logon of the mobile terminal 400, the IM server 300 notifies the mobile terminal 400 of the success of the logon.

<Step S13> On the other hand, when the master server 100 and the host 200 are started, the host 200 sends a connection request to the master server 100.

<Step S14> When the connection between the master server 100 and the host 200 is established, the master server 100 sends to the host 200 various information (e.g., information for management of an information terminal to which the host 200 provides service). Details of the processing in steps S13 and S14 are explained later (with reference to FIG. 17).

<Step S15> The mobile terminal 400, which succeeds in the login, performs processing for user registration. Details of the processing in this step are explained later (with reference to FIG. 18).

<Step S16> When the master server 100 accepts the user registration of the mobile terminal 400, the master server 100 notifies the mobile terminal 400 of the success in the user registration. Details of the processing in this step are explained later (with reference to FIG. 19).

<Step S17> After the user registration, the mobile terminal 400 outputs to the master server 100 a request for starting provision of a service. Thereafter, the mobile terminal 400 receives provision of the service. In this example, it is assumed that the user carrying the mobile terminal 400 stays in the coverage zone of the host 200 when the service is started. Details of the processing in this step are explained later (with reference to FIG. 20).

<Step S18> The master server 100 sends to the host 200 an instruction for a subscription to information on the mobile terminal 400. Details of the processing in this step are explained later (with reference to FIG. 21).

<Step S19> The host 200 sends to the IM server 300 a request for a subscription to the information on the mobile terminal 400 (i.e., performs processing for starting a subscription), in response to the instruction for the subscription, received from the master server 100. Details of the processing in this step are explained later (with reference to FIG. 22).

<Step S20> When the processing for the subscription succeeds, the host 200 acquires from the master server 100 the category which the corresponding user requests to deliver.

<Step S21> Thereafter, every time the mobile terminal 400 moves, the mobile terminal 400 sends the position presence of the mobile terminal 400 to the IM server 300.

<Step S22> The IM server 300 sends the position presence of the mobile terminal 400 to the host 200.

<Step S23> The host 200 determines the zone on the basis of the position presence. When the host 200 determines that information is to be provided to the mobile terminal 400, the host 200 sends to the IM server 300 information directed to the mobile terminal 400. Details of the processing in this step are explained later (with reference to FIG. 23).

<Step S24> The IM server 300 sends to the mobile terminal 400 the information sent from the host 200. Then, the mobile terminal 400 displays shop information on a screen. Details of the processing in this step are explained later (with reference to FIG. 24).

<Step S25> Thereafter, the mobile terminal 400 moves. At this time, it is assumed that the mobile terminal 400 satisfies a condition for being out of the coverage by the host 200 (e.g., the mobile terminal 400 moves out of the margin zone of the host 200). The mobile terminal 400 sends the current position presence to the IM server 300.

<Step S26> The IM server 300 sends the position presence of the mobile terminal 400 to the host 200.

<Step S27> The host 200 determines that the mobile terminal 400 goes out of the coverage by the host 200, and sends an out-of-coverage notification to the master server 100.

<Step S28> The master server 100 determines a server in charge of service provision to the mobile terminal 400. (In this example, it is assumed that the host 200*a* is determined to be the server in charge.) Then, the master server 100 sends to the host 200*a* an instruction for the subscription.

<Step S29> When the host 200*a* receives the instruction for the subscription, the host 200*a* sends to the IM server 300 a request for the subscription to the information on the mobile terminal 400.

<Step S30> When the process for the subscription succeeds, the host 200*a* acquires from the master server 100 the category which the corresponding user requests to deliver.

In the above sequence, a service corresponding to the position of the mobile terminal 400 is provided to the mobile terminal 400. Hereinbelow, details of the processing of FIG. 14 are explained.

Figure 15:
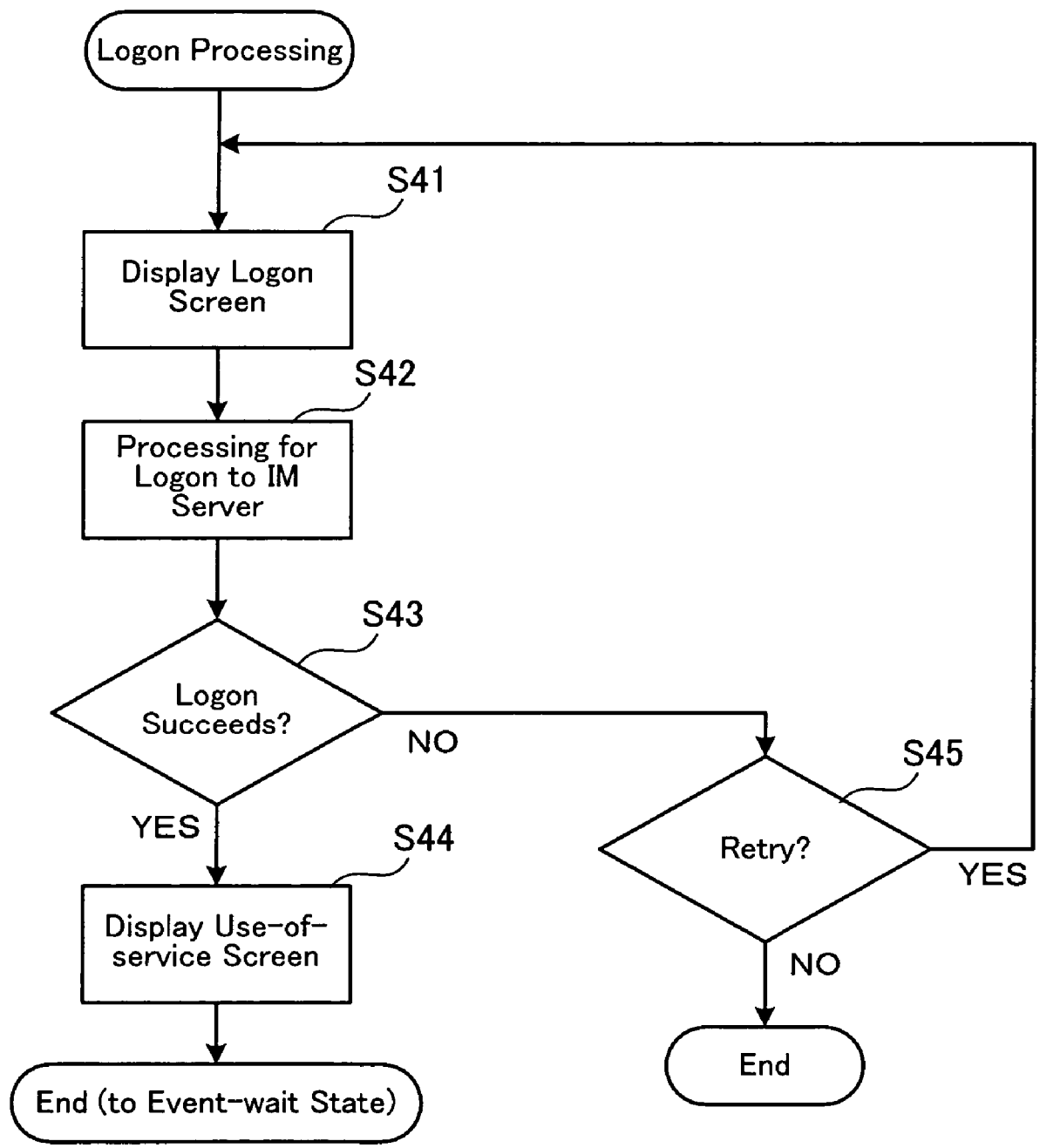
FIG. 15 is a flow diagram indicating details of logon processing performed by a mobile terminal.

FIG. 15 is a flow diagram indicating details of logon processing performed by a mobile terminal. The processing illustrated in FIG. 15 is explained below step by step.

<Step S41> The authentication request unit 410 in the mobile terminal 400 displays a logon screen in response to an input by user's manipulation or the like.

<Step S42> The authentication request unit 410 performs processing for logging on to the IM server. For example, the authentication request unit 410 receives a user's name, an IM address, and a password, which are inputted by user's manipulation, and sends to the IM server 300 a request for authentication containing a combination of the user's name, the IM address, and the password. The user authentication unit 310 in the IM server 300 receives the request for authentication, and compares the contents of the request for authentication with information registered in advance in a user database. When the combination of the user's name and the IM address contained in the request for authentication is registered in the user database, and the password is correct, the user authentication unit 310 authenticates the request, and notifies the mobile terminal 400 of the result of the judgment made in the authentication processing.

<Step S43> The authentication request unit 410 in the mobile terminal 400 determines the success or failure of the logon on the basis of the result of the judgment sent from the user authentication unit 310 in the IM server 300. When the logon succeeds, the operation goes to step S44. When the logon fails, the operation goes to step S45.

<Step S44> When the logon succeeds, the authentication request unit 410 notifies the information acquisition unit 420 of the success of the logon. In response to the notification of the success of the logon, the information acquisition unit 420 displays a use-of-service screen. Thereafter, the logon processing is completed, and the information acquisition unit 420 enters an event-wait state.

<Step S45> When the logon fails, the authentication request unit 410 determines whether or not a retry of the logon is allowed. For example, the allowed number of retries is set in advance. When the number of retries is equal to or smaller than the allowed number of retries, the authentication request unit 410 determines that the retry is allowed, the operation goes to step S41, and the logon processing is performed again. Otherwise, the authentication request unit 410 determines that the retry is not allowed, and the processing of FIG. 15 is completed.

When the logon succeeds, the mobile terminal 400 displays the screen for use of the local information system.

Figure 16:
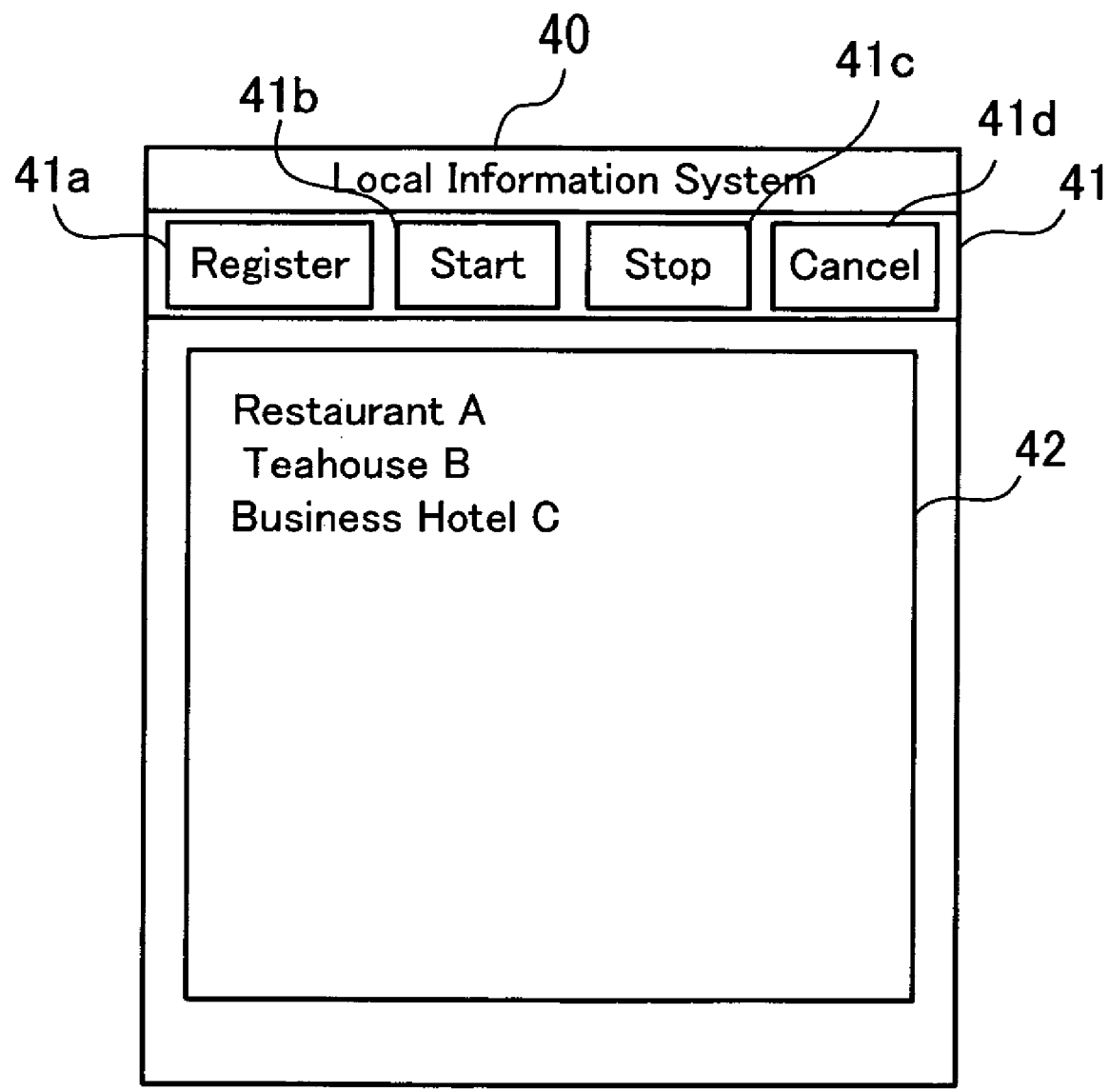
FIG. 16 is a diagram illustrating an example of a screen for use of the local information system.

FIG. 16 is a diagram illustrating an example of the screen for use of the local information system. As illustrated in FIG. 16, the screen 40 for use of the local information system has a tool bar 41 and a shop-list display area 42. It is possible to arrange further function buttons or display areas in the screen 40. The screen 40 is displayed only when the logon succeeds.

On the tool bar 41, four function buttons, a "Register" button 41*a*, a "Start" button 41*b*, a "Stop" button 41*c*, and a "Cancel" button 41*d*, are arranged.

The "Register" button 41*a* is a function button used when a user is registered in the present service, the "Start" button 41*b* is a function button used when the service is actually used after the user registration, and the "Stop" button 41*c* is a function button used when use of the service is temporarily stopped. Even when the "Stop" button 41*c* is pressed, the user registration in the service is not cancelled. The "Cancel" button 41*d* is a function button used when the user registration in the present service is cancelled. Pressing of each of the above buttons 41*a* to 41*d* is allowed or not allowed according to the status of the user registration and the start of use of the service.

Shop information provided from the server in charge is displayed in the shop-list display area 42. In the example of FIG. 16, only the names of some shops are displayed, where the information on the names of the shops is provided from the server in charge. However, information on the shops can be displayed, for example, by double-clicking the displayed names of the shops. Nevertheless, the shop-list display area 42 is blank immediately after the login since the shop information is not acquired at that time.

Since the screen 40 for use of the local information system is displayed as explained above, users can use the local information system.

On the other hand, in order to start the operation of the local information system, the master server 100 and the hosts 200, 200*a*, 200*b*, . . . are required to be activated. When the master server 100 is started, the master server 100 enters a state in which the master server 100 waits for various requests from the mobile terminal 400 and the hosts 200, 200*a*, 200*b*, . . . .

Figure 17:
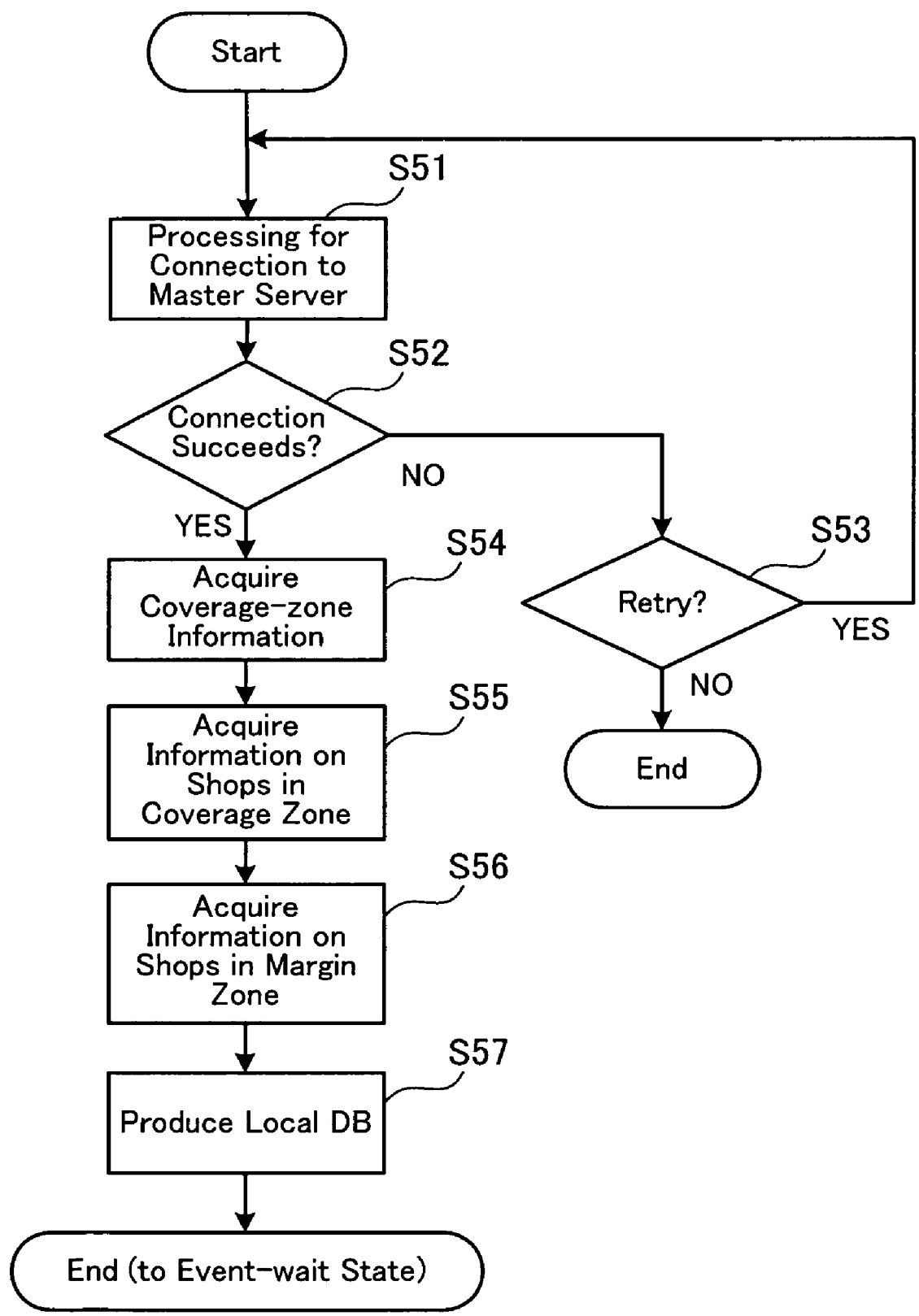
FIG. 17 is a flow diagram indicating a sequence of server-start processing.

FIG. 17 is a flow diagram indicating a sequence of server-start processing. The processing illustrated in FIG. 17 is explained below step by step.

<Step S51> The master-data inquiry unit 230 in the host 200 performs processing for connection with the master server 100. Specifically, the master-data inquiry unit 230 sends to the master server 100 a request for connection, and the master-data management unit 120 receives the request for connection, and returns a response to the request for connection.

<Step S52> The master-data inquiry unit 230 determines the success or failure of the connection on the basis of the response from the master server 100. When the connection succeeds, the operation goes to step S54. When the connection fails, the operation goes to step S53.

<Step S53> When the connection fails, the master-data inquiry unit 230 determines whether or not a retry is allowed. For example, the allowed number of retries is set in advance. When the number of retries is equal to or smaller than the allowed number of retries, the authentication request unit 410 determines that the retry is allowed, the operation goes to step S51, and the processing for connection is performed again. Otherwise, the authentication request unit 410 determines that the retry is not allowed, and the processing of FIG. 17 is completed.

<Step S54> When the connection succeeds, the master-data inquiry unit 230 acquires information on the zone covered by the host 200. Specifically, the master-data inquiry unit 230 sends to the master server 100 a request for acquisition of information for defining the coverage corresponding to the server name "α" of the host 200. Then, the master-data management unit 120 in the master server 100 reads out the record corresponding to the hostname "α" from the coverage-definition table 111, and sends to the host 200 the record as coverage-zone information. The master-data inquiry unit 230 receives the coverage-zone information sent from the master-data management unit 120, and passes the coverage-zone information to the local-data management unit 220.

<Step S55> The master-data inquiry unit 230 acquires information on one or more shops in the zone covered by the host 200. Specifically, the master-data inquiry unit 230 sends to the master server 100 a request for acquisition of the information on one or more shops in a zone corresponding to the server name "α" of the host 200. Then, the master-data management unit 120 reads out the record corresponding to the hostname "α" from the coverage-definition table 111, and recognizes the coverage zone of the host 200. Then, the master-data management unit 120 acquires from the shop-information table 112 the information on one or more shops in the coverage zone of the host 200, and sends the acquired information to the host 200. The master-data inquiry unit 230 receives the information sent from the master-data management unit 120, and passes the received information to the local-data management unit 220.

<Step S56> The master-data inquiry unit 230 acquires information on one or more shops in the margin zone of the host 200. Specifically, the master-data inquiry unit 230 sends to the master server 100 a request for acquisition of information on one or more shops in the margin zone corresponding to the server name "α" of the host 200. Then, the master-data management unit 120 reads out the record corresponding to the hostname "α" from the coverage-definition table 111, and recognizes the margin zone of the host 200. Then, the master-data management unit 120 acquires from the shop-information table 112 information on one or more shops in the margin zone of the host 200, and sends the acquired information to the host 200. The master-data inquiry unit 230 receives the information sent from the master-data management unit 120, and passes the received information to the local-data management unit 220.

<Step S57> The local-data management unit 220 produces the local DB 210 on the basis of the information received through the processing in steps S54 to S56. Thereafter, the processing of FIG. 17 is completed.

As explained above, the local DB 210 in the host 200 is constructed, and similar processing is performed for each of the other hosts 200a, 200b, . . . , so that the constructed local DB has contents corresponding to the coverage zone of each host. Thereafter, delivery of information from each of the hosts 200, 200a, 200b, . . . to the mobile terminal 400 is enabled.

Then, the user carrying the mobile terminal 400 chooses the "Register" button 41a in the screen 40, so that the processing for user registration is performed in the mobile terminal 400 by sending an IM address and a "user registration" command to the master-data management unit 120, where the master-data management unit 120 operates on the master server 100, and the IM address is an identifier used in the instant messaging system.

Figure 18:
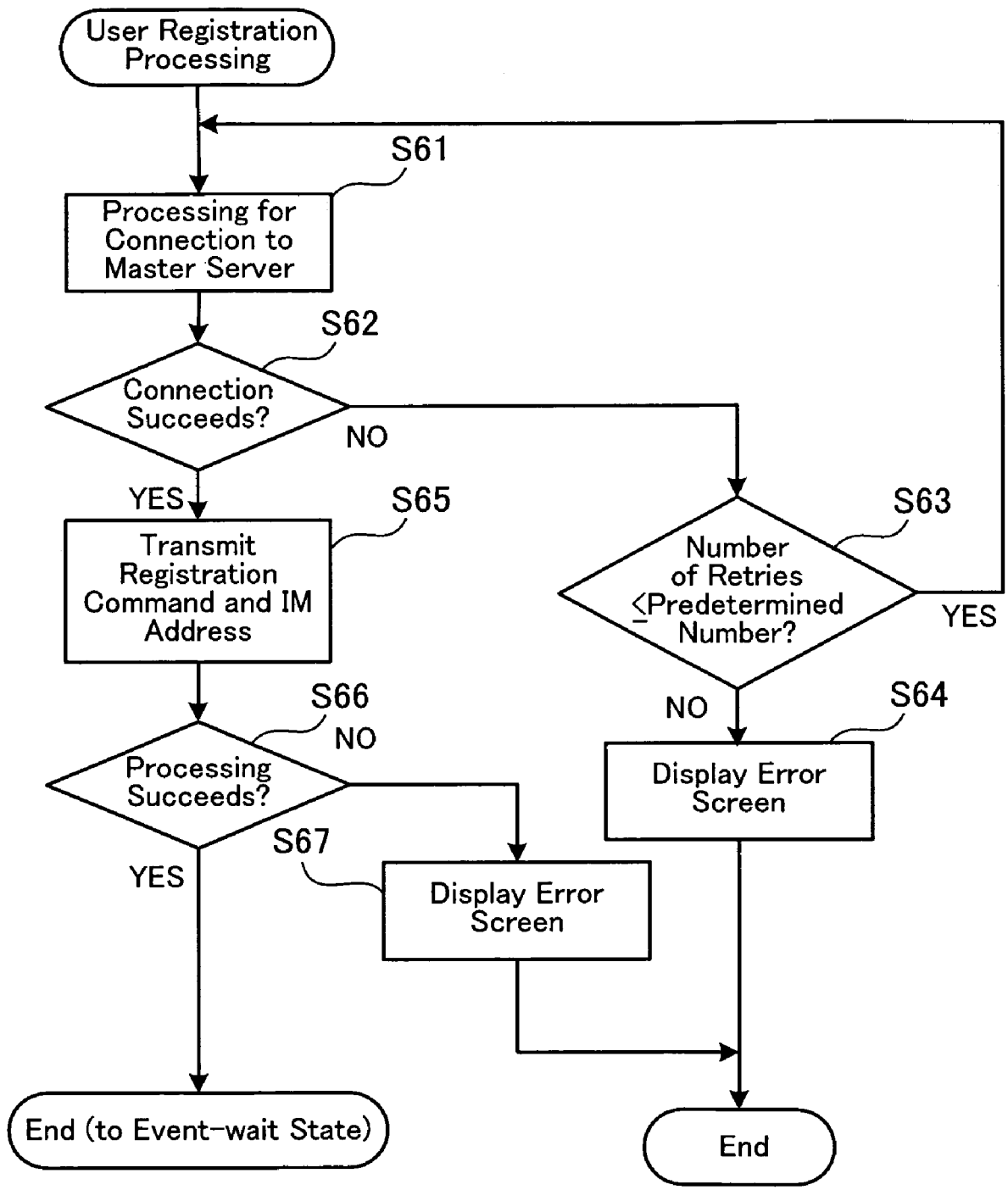
FIG. 18 is a flow diagram indicating a sequence of processing for requesting user registration.

FIG. 18 is a flow diagram indicating a sequence of processing for requesting user registration. The processing illustrated in FIG. 18 is explained below step by step.

<Step S61> The information acquisition unit 420 in the mobile terminal 400 performs processing for connection with the master server 100. Specifically, the information acquisition unit 420 sends to the master server 100 a request for connection. The master-data management unit 120 in the master server 100 receives the request for connection, and returns a response to the request for connection.

<Step S62> The information acquisition unit 420 determines the success or failure of the connection on the basis of the response from the master server 100. When the connection succeeds, the operation goes to step S65. When the connection fails, the operation goes to step S63.

<Step S63> When the connection fails, the information acquisition unit 420 determines whether or not a retry is allowed. For example, the allowed number of retries is set in advance. When the number of retries is equal to or smaller than the allowed number of retries, the information acquisition unit 420 determines that the retry is allowed, the operation goes to step S61, and the processing for connection is performed again. Otherwise, the information acquisition unit 420 determines that the retry is not allowed, and the operation goes to step S64.

<Step S64> The information acquisition unit 420 displays an error message on a screen of the mobile terminal 400, and the processing of FIG. 18 is completed.

<Step S65> When the connection succeeds, the information acquisition unit 420 sends to the master server 100 a user registration command containing an IM address. Then, the master-data management unit 120 registers the IM address in the user-management table 113, and returns to the mobile terminal 400 a result of the processing for registration.

<Step S66> The information acquisition unit 420 determines the success or failure of the processing for registration on the basis of the response from the master server 100. When the processing for registration succeeds, the processing of FIG. 18 is completed. When the processing for registration fails, the operation goes to step S67.

<Step S67> The information acquisition unit 420 displays an error message on a screen of the mobile terminal 400, and the processing of FIG. 18 is completed.

Next, details of processing performed in the master server 100 when the master server 100 receives the user registration command are explained below.

Figure 19:
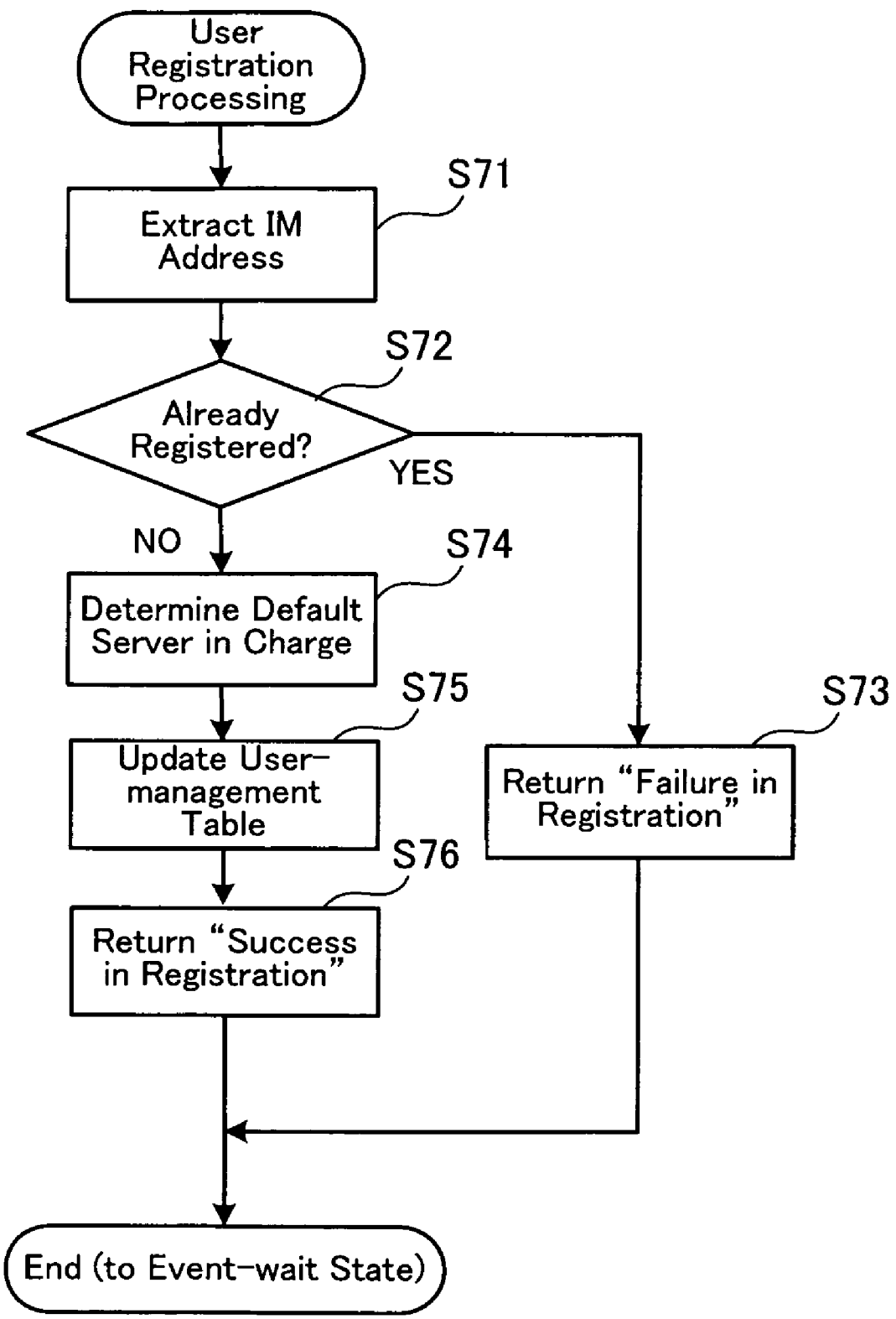
FIG. 19 is a flow diagram indicating a sequence of processing for user registration.

FIG. 19 is a flow diagram indicating a sequence of processing for user registration. The processing illustrated in FIG. 19 is explained below step by step.

<Step S71> When the master-data management unit 120 in the master server 100 receives the user registration command, the master-data management unit 120 extracts the IM address.

<Step S72> The master-data management unit 120 determines whether or not the extracted IM address is already registered in the user-management table 113. When yes is determined, the operation goes to step S73. When no is determined, the operation goes to step S74.

<Step S73> The master-data management unit 120 returns to the mobile terminal 400 a response indicating the failure in the registration, and the processing of FIG. 19 is completed.

<Step S74> The master-data management unit 120 determines a default server in charge. For example, all the servers in charge are assigned in turn as the default server in charge. For example, in the case where the servers in charge in the entire system are the servers "α," "β," and "γ," and the server "α" is assigned as the default server in charge in the preceding user registration, the server "β" is assigned as the default server in charge in the current user registration. Alternatively, it is possible to sum up the contents of the "Server in Charge" field on a real-time basis, and assign a server which is currently in charge of service to the smallest number of users as the default server in charge.

<Step S75> The master-data management unit 120 registers in the user-management table 113 a record having the IM address extracted in step S71 in the "User" field. Since, at this time, use of the service is not started, the "Server in Charge" field is blank.

<Step S76> The master-data management unit 120 returns to the mobile terminal 400 a response indicating the success of the registration, and the processing of FIG. 19 is completed.

As explained above, user registration can be realized in the master server 100 by sending a user registration command from the mobile terminal 400. The user registration command may contain a user's name, a password, and the like as well as the IM address. In this case, since the user's name, the password, and the like are sent to the master server 100, the master server 100 can perform user authentication independently of the IM server 300.

After the user registration, when the "Start" button 41*b* in the screen 40 on the mobile terminal 400 is pressed, the information acquisition unit 420 in the mobile terminal 400 performs processing for starting the service.

Figure 20:
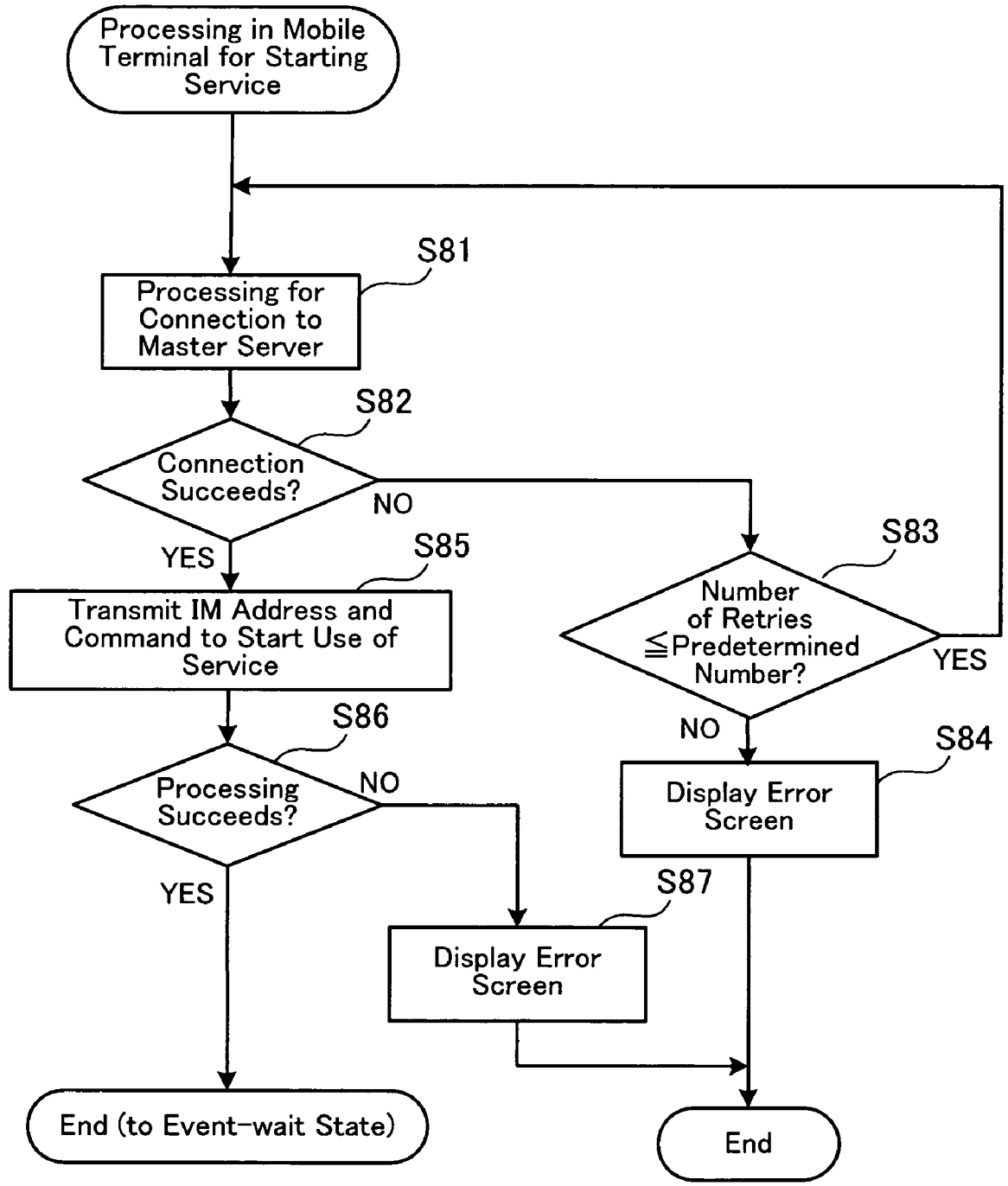
FIG. 20 is a flow diagram indicating a sequence of processing performed in the mobile terminal for starting the service.

FIG. 20 is a flow diagram indicating a sequence of processing performed in the mobile terminal for starting the service. The processing illustrated in FIG. 20 is explained below step by step.

<Step S81> The information acquisition unit 420 in the mobile terminal 400 performs processing for connection with the master server 100. Specifically, the information acquisition unit 420 sends to the master server 100 a request for connection. The master-data management unit 120 in the master server 100 receives the request for connection, and returns a response to the request for connection.

<Step S82> The information acquisition unit 420 determines the success or failure of the connection on the basis of the response from the master server 100. When the connection succeeds, the operation goes to step S85. When the connection fails, the operation goes to step S83.

<Step S83> When the connection fails, the information acquisition unit 420 determines whether or not a retry is allowed. For example, the allowed number of retries is set in advance. When the number of retries is equal to or smaller than the allowed number of retries, the information acquisition unit 420 determines that the retry is allowed, the operation goes to step S81, and the processing for connection is performed again. Otherwise, the information acquisition unit 420 determines that the retry is not allowed, and the operation goes to step S84.

<Step S84> The information acquisition unit 420 displays an error message on a screen of the mobile terminal 400, and the processing of FIG. 20 is completed.

<Step S85> When the connection succeeds, the information acquisition unit 420 sends to the master server 100 a command containing an IM address to start use of the service. Then, the master-data management unit 120 performs processing for starting use of the service, and returns to the mobile terminal 400 a result of the processing for starting use of the service.

<Step S86> The information acquisition unit 420 determines the success or failure of the processing for starting use of the service, on the basis of the response from the master server 100. When the processing for starting use of the service succeeds, the processing of FIG. 20 is completed. When the processing for starting use of the service fails, the operation goes to step S87.

<Step S87> The information acquisition unit 420 displays an error message on a screen of the mobile terminal 400, and the processing of FIG. 20 is completed.

Next, details of processing performed by the master server 100 when the master server 100 receives the command to start use of the service are explained below.

Figure 21:
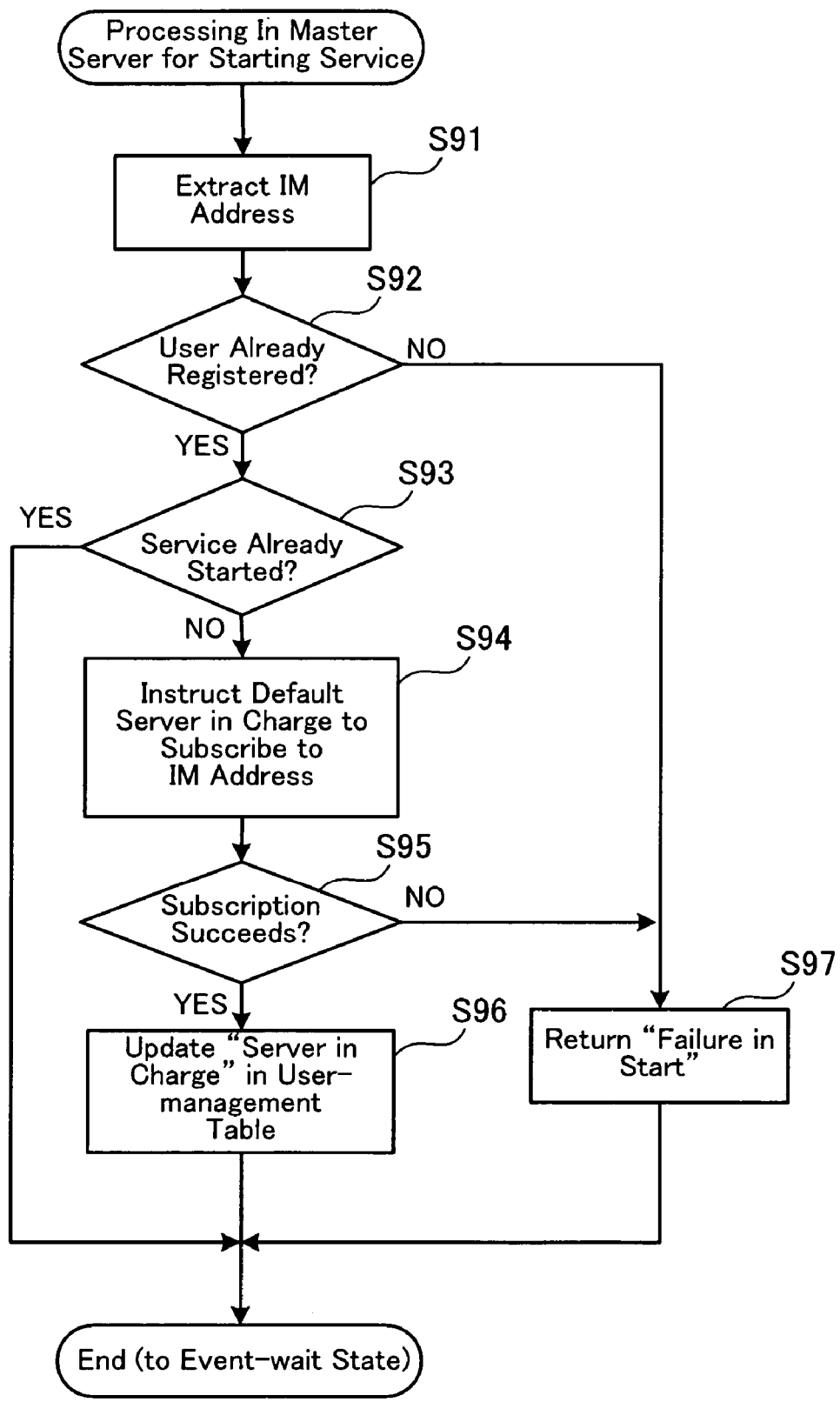
FIG. 21 is a flow diagram indicating a sequence of processing performed in the master server for starting the service.

FIG. 21 is a flow diagram indicating a sequence of processing performed in the master server for starting the service. The processing illustrated in FIG. 21 is explained below step by step.

<Step S91> The master-data management unit 120 in the master server 100 extracts the IM address from the command to start use of the service.

<Step S92> The master-data management unit 120 determines whether or not the user is already registered, on the basis of the extracted IM address. Specifically, when the extracted IM address is already registered in the "User" field in the user-management table 113, the user is already registered. When the user is already registered, the operation goes to step S93. Otherwise, the operation goes to step S97.

<Step S93> The master-data management unit 120 determines whether or not the service is already started. Specifically, when the hostname of the host is already set in the "Server in Charge" field in the user-management table 113, the master-data management unit 120 determines that the service is already started. When the service is already started, the processing of FIG. 21 is completed. Otherwise, the operation goes to step S94.

<Step S94> The master-data management unit 120 sends to the default server in charge an instruction for a subscription to the corresponding IM address. Specifically, the master-data management unit 120 sends to the default server in charge a subscription-start command containing the IM address.

<Step S95> The master-data management unit 120 determines the success or failure of the subscription on the basis of a response from the default server in charge. When the subscription succeeds, the operation goes to step S96. When the subscription fails, the operation goes to step S97.

<Step S96> The master-data management unit 120 updates the "Server in Charge" field in the user-management table 113. Specifically, the master-data management unit 120 sets the hostname of the default server in charge in the "Server in Charge" field in the user-management table 113. Thereafter, the processing of FIG. 21 is completed.

<Step S97> The master-data management unit 120 returns to the mobile terminal 400 a response indicating the failure of the start.

As explained above, when the mobile terminal 400 sends to the master server 100 an IM address and a subscription-start command, the master server 100 instructs the default server in charge to subscribe to information on the mobile terminal 400. The default server in charge performs processing for starting a subscription to the IM address in accordance with the instruction from the master server 100.

Next, details of the processing for starting a subscription are explained below, where it is assumed that the host 200 is the default server in charge.

Figure 22:
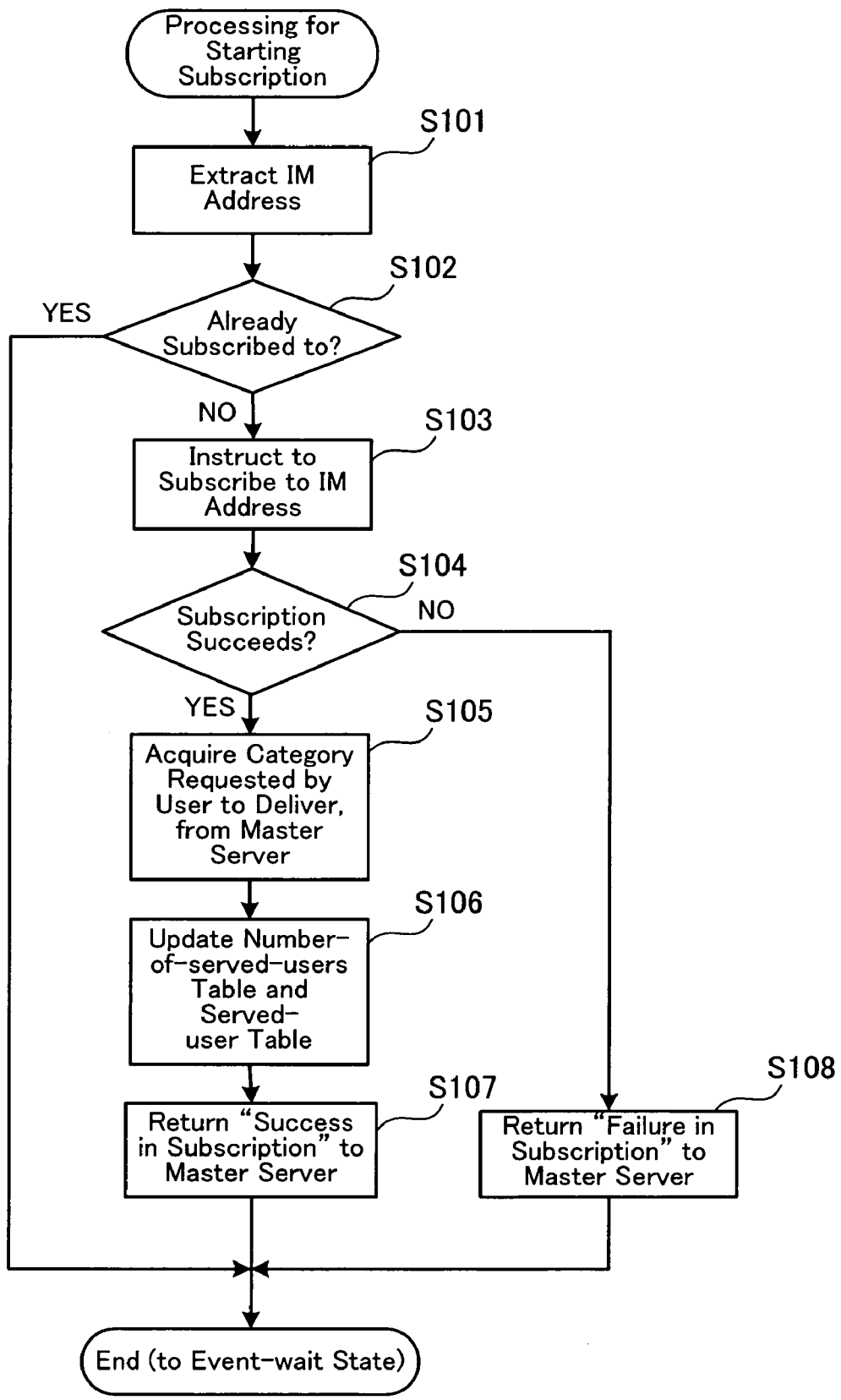
FIG. 22 is a flow diagram indicating a sequence of processing for starting a subscription.

FIG. 22 is a flow diagram indicating a sequence of processing for starting a subscription. The processing illustrated in FIG. 22 is explained below step by step.

<Step S101> When the host 200 receives the subscription-start command, the information provision unit 240 in the host 200 extracts the IM address from the subscription-start command.

<Step S102> The information provision unit 240 determines whether or not the information on the mobile terminal corresponding to the IM address is already subscribed to. Specifically, the information provision unit 240 makes the above determination on the basis of whether or not the extracted IM address is already registered in the "user" field of the served-user table 214. When the IM address is already registered, the above information is already subscribed to, so that the processing of FIG. 22 is completed. When the above information is not yet subscribed to, the operation goes to step S103.

<Step S103> The information provision unit 240 sends to the IM server 300 a request for a subscription in which the extracted IM address is designated.

<Step S104> The information provision unit 240 determines the success or failure of the subscription on the basis of a response from the IM server 300. When the subscription succeeds, the operation goes to step S105. When the subscription fails, the operation goes to step S108.

<Step S105> The information provision unit 240 acquires from the master server 100 through master-data inquiry unit 230 information on the category which the corresponding user requests to deliver. At this time, the acquired information on the category which the corresponding user requests to deliver is the data in the "Category" field in the record in the user-management table 113 in which the IM address extracted in step S103 is set in the "User" field.

<Step S106> The master-data inquiry unit 230 passes to the local-data management unit 220 the acquired information on the category which the corresponding user requests to deliver. The local-data management unit 220 updates the number-of-served-users table 213 and the served-user table 214.

<Step S107> The information provision unit 240 returns to the master server 100 a response indicating the success of the subscription, and the processing of FIG. 22 is completed.

<Step S108> The information provision unit 240 returns to the master server 100 a response indicating the failure in the subscription, the processing of FIG. 22 is completed.

Thereafter, the mobile terminal 400 receives a notification about the request for the subscription, and discloses to the default server in charge the presence which includes positional information. The presence is a function being provided in the instant messaging service, and informing first users which subscribe to the information on a second user, of the state of the second user. In the present embodiment, presence information including the information on the position of the mobile terminal 400 is sent to the host 200. That is, since the mobile terminal 400 sets in the IM server 300 the presence information including the positional information, it is possible to automatically disclose the presence information including the positional information to only the host 200, which subscribes to the information on the mobile terminal 400.

When the mobile terminal 400 discloses the presence information including the positional information, the host 200 is notified of the current position of the mobile terminal. Thereafter, every time the mobile terminal 400 updates the presence information, the presence information including the positional information is sent to the host 200. Every time the host 200 receives the presence information, the host 200 makes a zone determination.

Figure 23:
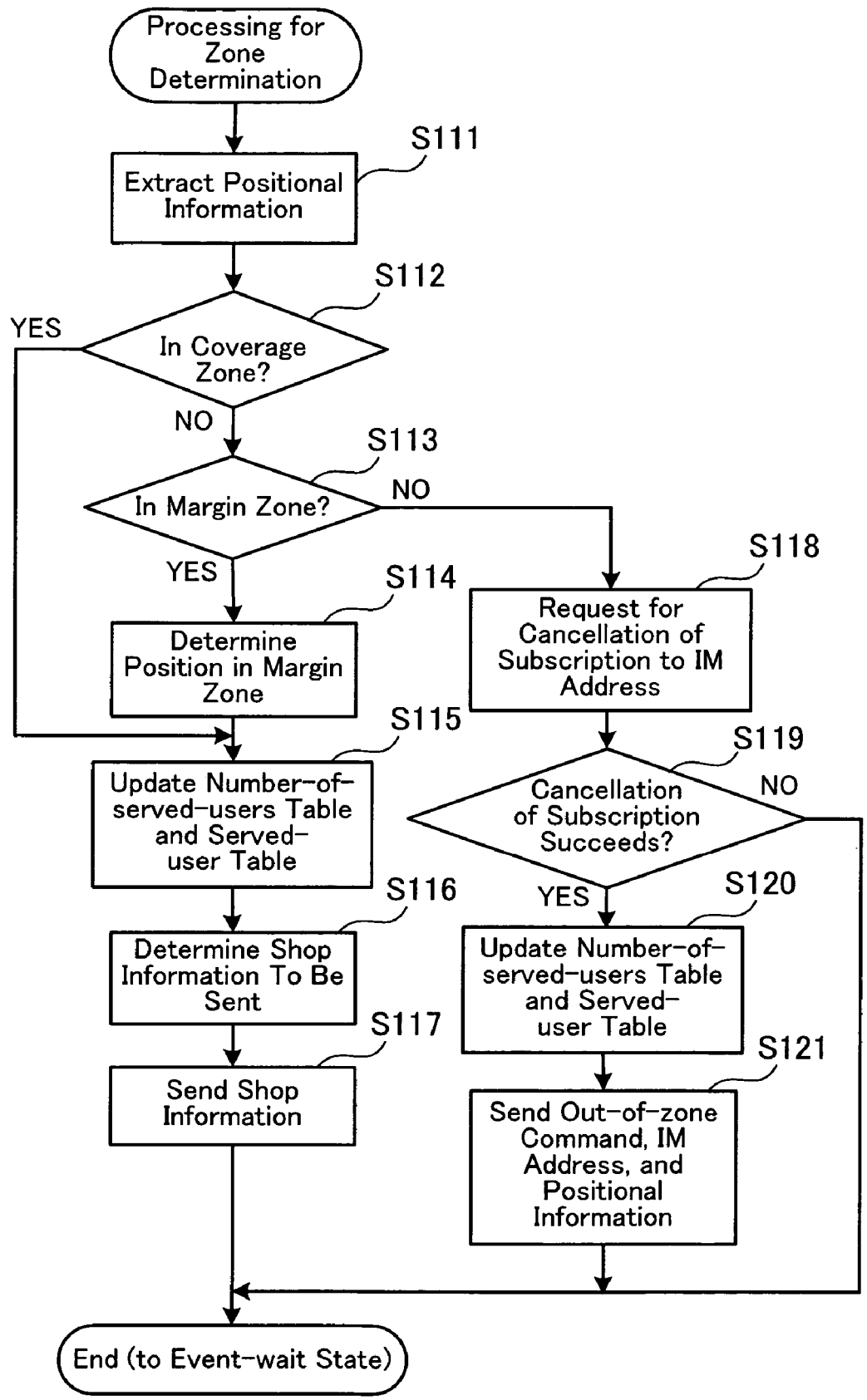
FIG. 23 is a flow diagram indicating a sequence of processing for zone determination.

FIG. 23 is a flow diagram indicating a sequence of processing for zone determination. The processing illustrated in FIG. 23 is explained below step by step.

<Step S111> The zone determination unit 250 in the host 200 extracts the positional information from the presence information.

<Step S112> The zone determination unit 250 determines whether or not the position of the mobile terminal 400 is in the coverage zone of the host 200. When yes is determined, the operation goes to step S115. When no is determined, the operation goes to step S113.

<Step S113> The zone determination unit 250 determines whether or not the position of the mobile terminal 400 is in the margin zone of the host 200. When yes is determined, the operation goes to step S114. When no is determined, the operation goes to step S118.

<Step S114> The zone determination unit 250 determines the position in the margin zone. Since the margin zone is divided into the portions in the eight directions located around the coverage zone, the zone determination unit 250 determines in which portion of the margin zone the mobile terminal 400 is located.

<Step S115> The zone determination unit 250 passes to the local-data management unit 220 the result of the zone determination obtained in steps S112 to S114. The local-data management unit 220 updates the number-of-served-users table 213 and the served-user table 214 on the basis of the result of the zone determination passed from the zone determination unit 250. However, when the above result of the zone determination is identical to the result of another zone determination which is made on the preceding occasion, the number-of-served-users table 213 and the served-user table 214 are not updated.

<Step S116> The zone determination unit 250 passes to the information provision unit 240 the result of the zone determination obtained in steps S112 to S114. The information provision unit 240 determines shop information to be sent to the mobile terminal 400. For example, the information provision unit 240 determines shop information on the shops in the category which the user of the mobile terminal 400 requests, among the shops in the coverage zone and the margin zone, to be sent to the mobile terminal 400.

<Step S117> The information provision unit 240 sends the shop information determined as above to the mobile terminal 400 through the IM server 300, and thereafter the processing of FIG. 23 is completed.

<Step S118> The zone determination unit 250 sends to the IM server 300 a request for cancellation of the subscription to the IM address of the mobile terminal 400.

<Step S119> The zone determination unit 250 determines the success or failure of the cancellation of the subscription on the basis of a response from the IM server 300. When the cancellation of the subscription succeeds, the operation goes to step S120. When the cancellation of the subscription fails, the processing of FIG. 23 is completed.

<Step S120> The zone determination unit 250 notifies the local-data management unit 220 of the cancellation of the subscription. Then, the local-data management unit 220 updates the number-of-served-users table 213 and the served-user table 214.

<Step S121> The information provision unit 240 sends to the master server 100 an out-of-zone command which contains the IM address of the mobile terminal 400 and information on the position of the mobile terminal 400, and the processing of FIG. 23 is completed.

As explained above, when the mobile terminal 400 is located in the coverage zone, or when the mobile terminal 400 is located in the margin zone, the shop information can be sent to the mobile terminal 400. That is, the information provision unit 240 in the host 200 extracts positional information from the received presence information, and checks whether or not the corresponding user is located in the area defined by adding the margin value to the values defining the coverage zone indicated in the "Coverage Zone" field in the coverage-zone table 211. When the user is located in the coverage zone or the margin zone of the host 200, the information provision unit 240 sends to the mobile terminal 400 shop information stored in the local-shop-information table 212 by using the instant messaging function. Then, the mobile terminal 400 stores the shop information in a data-management table arranged in the mobile terminal 400, and displays the names of one or more shops in the shop-list display area 42.

Figure 24:
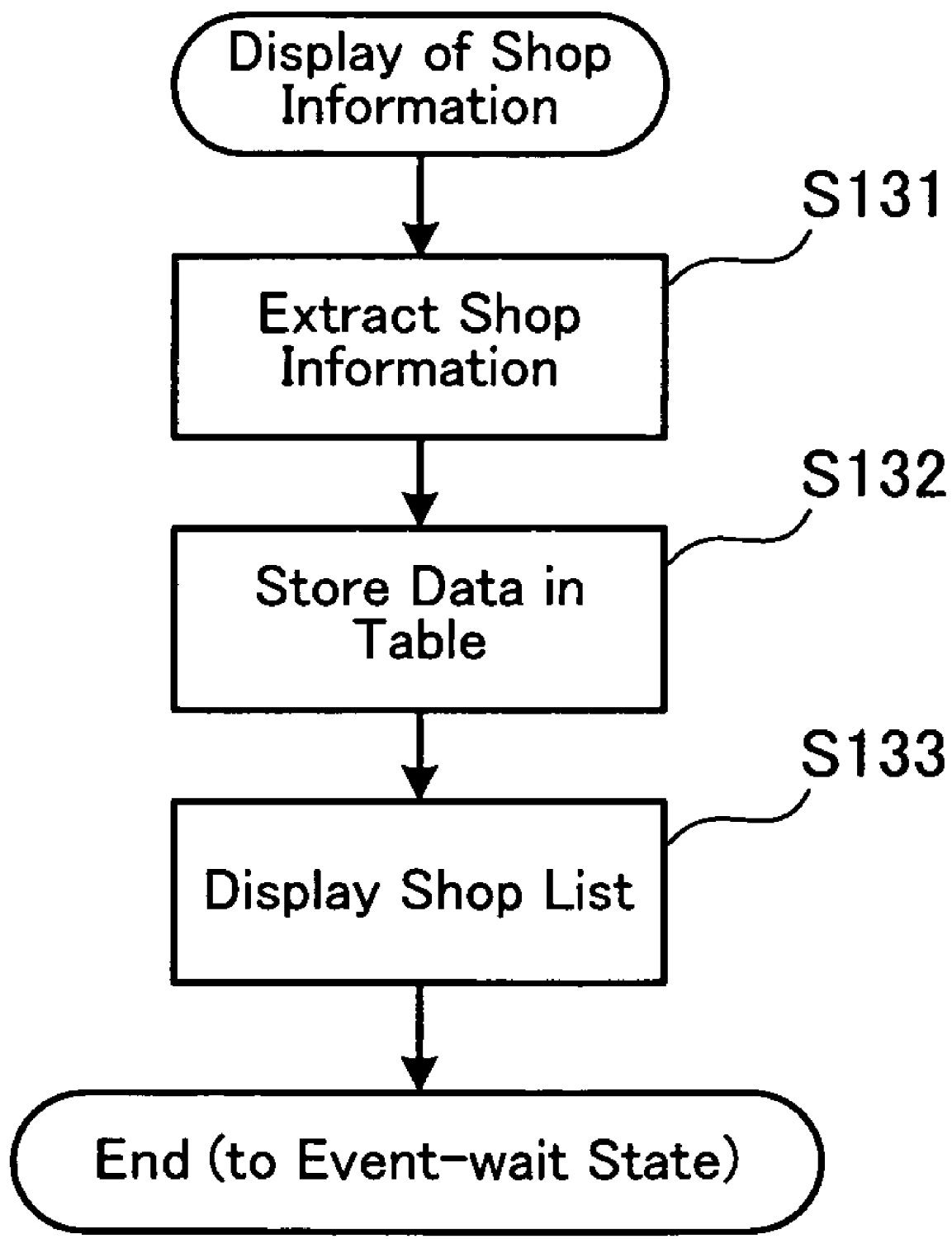
FIG. 24 is a flow diagram indicating a sequence of processing for displaying shop information.

FIG. 24 is a flow diagram indicating a sequence of processing for displaying the shop information. The processing illustrated in FIG. 24 is explained below step by step.

<Step S131> The information acquisition unit 420 in the mobile terminal 400 extracts the shop information from the information sent by the instant messaging function.

<Step S132> The information acquisition unit 420 stores the extracted information in a data table provided inside.

<Step S133> The information acquisition unit 420 displays a shop list based on the newly acquired shop information in an area for the shop list in the shop-list display area 42. Thereafter, the processing of FIG. 24 is completed.

When the master server 100 receives the out-of-zone command from the host 200, the master server 100 performs processing for changing the server in charge of delivery of information to the mobile terminal 400.

Figure 25:
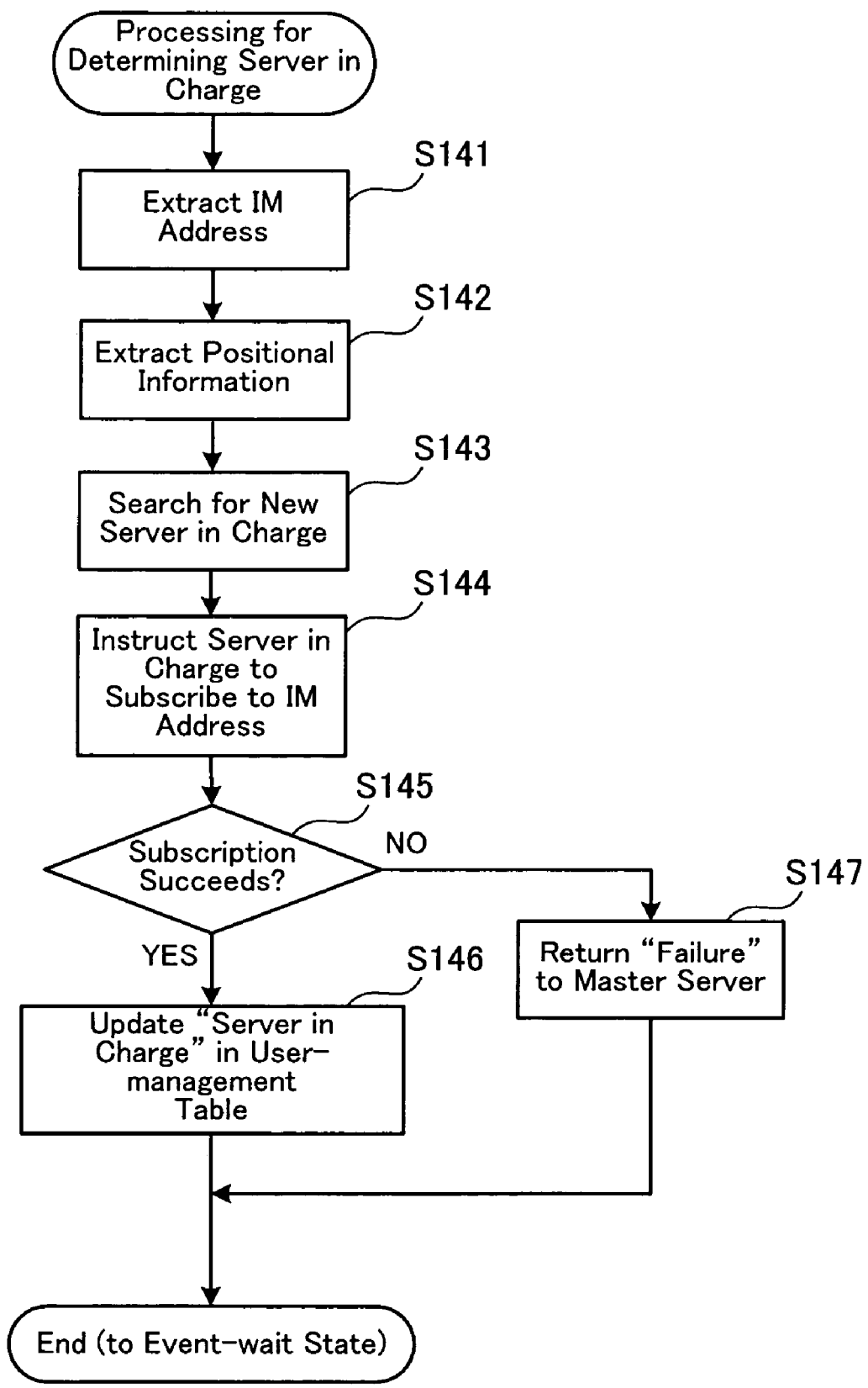
FIG. 25 is a flow diagram indicating a sequence of processing for changing a server in charge.

FIG. 25 is a flow diagram indicating a sequence of processing for changing the server in charge. The processing illustrated in FIG. 25 is explained below step by step.

<Step S141> The server-in-charge determination unit 130 in the master server 100 extracts the IM address from the out-of-zone command sent from the host 200.

<Step S142> The server-in-charge determination unit 130 extracts positional information from the out-of-zone command sent from the host 200.

<Step S143> The server-in-charge determination unit 130 refers to the coverage-definition table 111, and newly determines a host which handles information delivery to a zone in which the mobile terminal 400 is currently located, to be the server in charge of service to the mobile terminal 400. (In this example, it is assumed that the host 200a is determined to be the server in charge.)

<Step S144> The server-in-charge determination unit 130 sends to the server in charge determined in step S143 (the host 200a) an instruction for a subscription to the IM address extracted in step S141.

<Step S145> The server-in-charge determination unit 130 determines the success or failure of the subscription on the basis of a response from the server in charge. When the subscription succeeds, the operation goes to step S146. When the subscription fails, the operation goes to step S147.

<Step S146> When the subscription succeeds, the server-in-charge determination unit 130 notifies the master-data management unit 120 that the server in charge of service to the mobile terminal 400 is changed. Then, the master-data management unit 120 updates the information in the "Server in Charge" field in the record in the user-management table 113 corresponding to the mobile terminal 400 with the hostname of the newly determined server in charge (as a host). Thereafter, the processing of FIG. 25 is completed.

<Step S147> When the subscription fails, the server-in-charge determination unit 130 returns to the master server 100 a response indicating the failure in the change of the server in charge, and the processing of FIG. 25 is completed.

As explained above, when the mobile terminal 400 is not located in the area defined by adding the margin value to the values defining the coverage zone, the host 200 acting as the server in charge cancels the subscription to the mobile terminal 400. The mobile terminal 400 receives a notification of the request for cancellation of the subscription as well as a notification of a request for starting a subscription, and stops the disclosure of the presence including the positional information. In addition, the host 200 informs the master server 100 of the IM address and the position of the corresponding mobile terminal. Then, the master server 100 refers to only the "Coverage Zone" field in the coverage-definition table 111, and searches for a host having a coverage zone which contains the informed position. Further, the master server 100 stores the hostname of the server obtained by the search, in the "Server in Charge" field in the user-management table 113 in correspondence with the user, and thereafter instructs the corresponding server to start a subscription to the corresponding mobile terminal. At this time, when a server program receives the above instruction, the server program starts the subscription to the mobile terminal 400 in the aforementioned sequence.

Thus, when the mobile terminal 400 goes out of the coverage zone and the margin zone, the server in charge is changed. In other words, even when the mobile terminal moves across a boundary between ones of divided zones arranged in a matrix, a host as a server in charge continues service provision until the mobile terminal goes out of the margin zone. Therefore, it is unnecessary to change the server in charge even when a user frequently moves across a boundary of a zone, and it is possible to reduce the loads imposed on the master server and the server in charge although the loads imposed on the master server and the server in charge are increased by changes in the server in charge.

Figure 26:
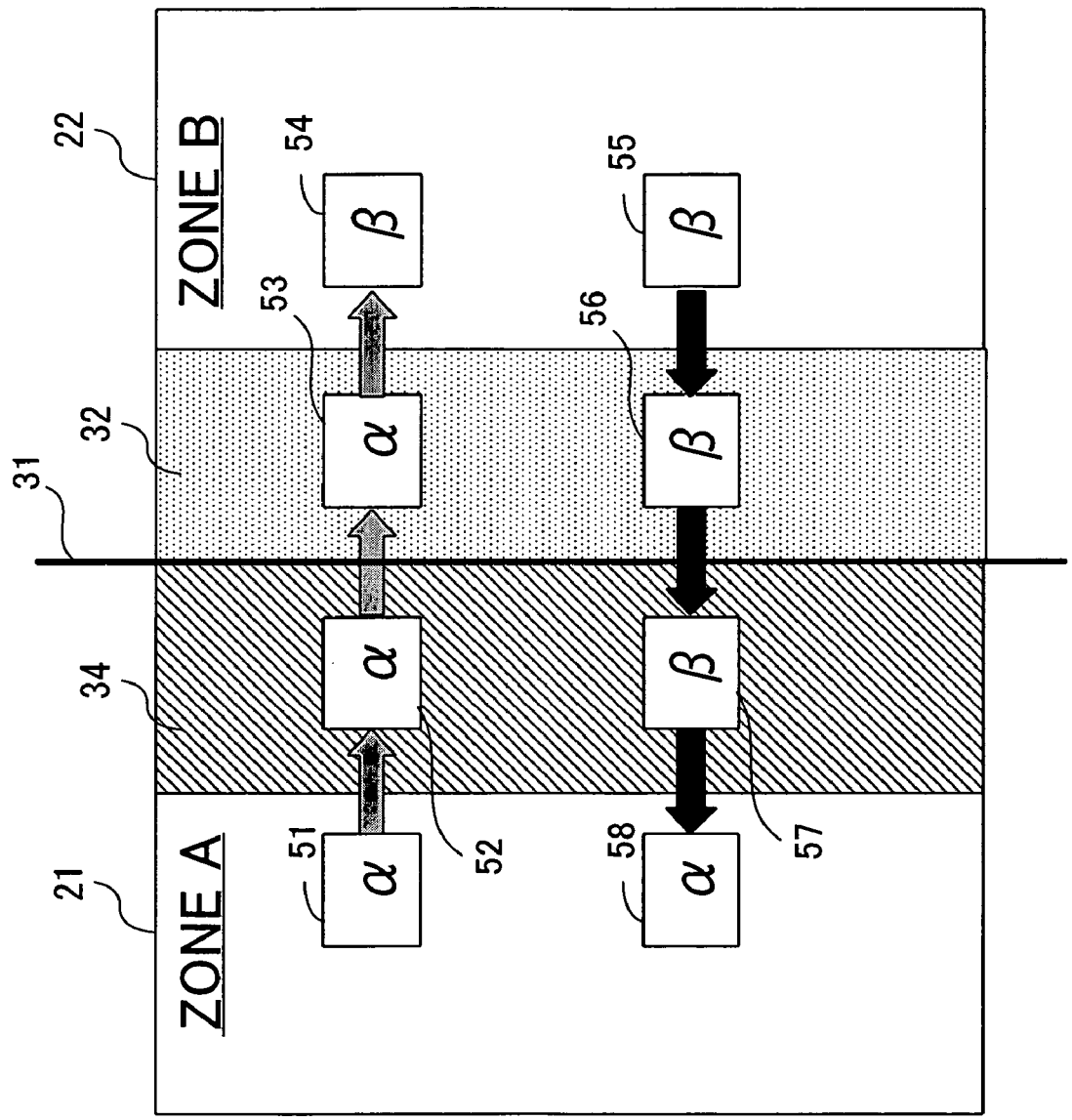
FIG. 26 is a diagram indicating a manner of a change of a server in charge which is made when a mobile terminal moves across a boundary.

FIG. 26 is a diagram indicating a manner of a change of a server in charge which is made when a mobile terminal moves across a boundary. In FIG. 26, movement of the mobile terminal 400 from the position 51 to the position 54 and movement of the mobile terminal 400 from the position 55 to the position 58 are indicated, where the positions 51 to 58 are each indicated by a rectangle, and the hostname "α" or "β" of the server in charge of service to the mobile terminal 400 at each position is indicated in the rectangle. The zone 21 having the identifier "zone A" is the coverage zone of the host 200 having the hostname "α," and the zone 22 having the identifier "zone B" is the coverage zone of the host 200*a* having the hostname "β." The margin zone 32 of the host 200 is a portion of the zone 22 adjacent to the zone 21, and the margin zone 34 of the host 200*a* is a portion of the zone 21 adjacent to the zone 22.

When the user carrying the mobile terminal 400 is located at the position 51 in the zone 21, the host 200 having the hostname "α" is the server in charge. When the user moves to the position 52, and further moves across the boundary 31 to the position 53 (in the margin zone 32), the host 200 having the hostname "α" remains as the server in charge. Thereafter, when the user moves out of the margin zone 32 to the position 54, the server in charge is changed to the host 200*a* having the hostname "β."

Similarly, when the user carrying the mobile terminal 400 is located at the position 55 in the zone 22, the host 200*a* having the hostname "β" is the server in charge. When the user moves to the position 56, and further moves across the boundary 31 to the position 57 (in the margin zone 34), the host 200*a* having the hostname "β" remains as the server in charge. Thereafter, when the user moves out of the margin zone 34 to the position 58, the server in charge is changed to the host 200 having the hostname "α."

Figure 27A:
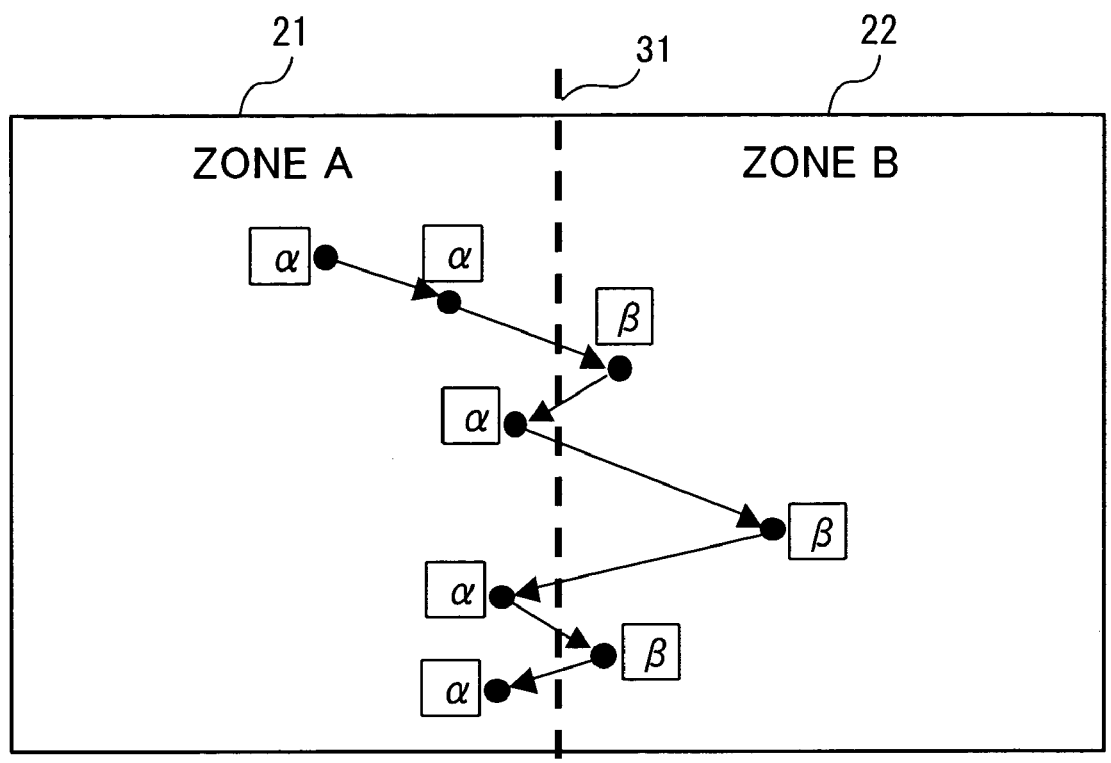
FIG. 27A is a diagram indicating an examples of a conventional manner if a change of a server in charge.
Figure 27B:
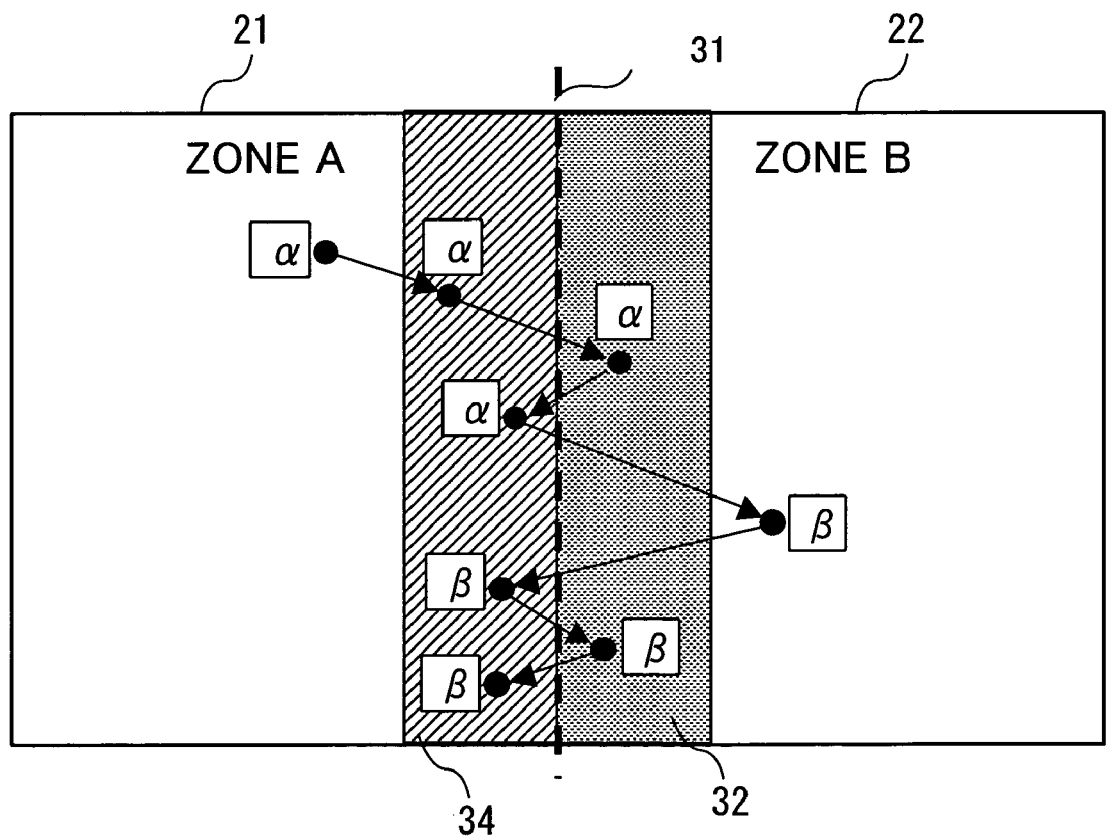
FIG. 27B is a diagram indicating an example if a manner of a change of a server in charge according to the present embodiment.

FIG. 27A shows an example of a change of the server in charge according to a conventional technique, and FIG. 27B shows an example of a change of the server in charge according to the present embodiment. In FIGS. 27A and 27B, examples of paths of the mobile terminal 400 and the hostnames of the servers in charge based on zone determination are indicated.

Assume that the host 200 having the hostname "α" is determined to be the server in charge when the user carrying the mobile terminal 400 stays in the zone 21, and the host 200*a* having the hostname "β" is determined to be the server in charge when the user carrying the mobile terminal 400 stays in the zone 22. According to the conventional technique, the server in charge is changed every time the user carrying the mobile terminal 400 moves across the boundary 31 between the zones 21 and 22. In the example of FIG. 27A, the server in charge is changed six times.

On the other hand, according to the present embodiment, the zone 21 having the identifier "zone A" is the coverage zone of the host 200 having the hostname "α," and the margin zone 32 of the host 200 is defined along the outer boundary of the zone 21. In addition, the zone 22 having the identifier "zone B" is the coverage zone of the host 200*a* having the hostname "β," and the margin zone 34 of the host 200*a* is defined along the outer boundary of the zone 22. In this case, the server in charge is not changed even when the user carrying the mobile terminal 400 moves from the portion of the zone 21 outside the margin zone 34 of the host 200*a*, across the boundary 31 between the zones 21 and 22 to the margin zone 32. The server in charge is changed when the user carrying the mobile terminal 400 moves to the portion of the zone 22 outside the margin zone 32. Therefore, even though the user moves along the same path as the example of FIG. 27A, the server in charge is changed only once according to the present embodiment.

As explained above, since the margin zones are defined, it is possible to suppress the frequency of occurrence of changes of the server in charge, and reduce the loads imposed on the system. For example, it takes much time to perform processing for searching for a new server in charge since it is necessary to search the entire coverage-definition table 111 in the master server 100. Therefore, the processing load imposed on the master server 100 can be reduced by decreasing the number of changes of the servers in charge.

Further, during the processing for zone determination indicated in FIG. 23, it is possible to dynamically modify the margin zones, so as to balance the processing loads imposed on the hosts. For example, the margin zones can be dynamically modified according to the number of users served by each server, the number of users located in the margin zone of each server, the number of users located in the designated zone of each server, or the number of users located in an adjacent zone. It is possible to recognize the number of users served by each server by incrementing a count when a request for starting a subscription occurs, and decrementing the count when a request for canceling a subscription occurs.

Each host can calculate the rectangle corresponding to the outer boundary of the coverage zone, the rectangle corresponding to the outer boundary of the margin zone, and the rectangle corresponding to the inner boundary of the designated zone on the basis of the values in the fields of "Coverage Zone," "Margin," and "Designated Zone" in the coverage-zone table 211 illustrated in FIG. 10. Therefore, when the positional information is sent from the mobile terminal 400, each host checks whether or not the position is in each of the above rectangles. When the position is in one or more of the coverage zone, the margin zone, and the designated zone, the IM address of the mobile terminal 400 is added to one or more IM address lists respectively arranged for the one or more zones. When the position is not in one of the coverage zone, the margin zone, and the designated zone, the IM address of the mobile terminal 400 is deleted from the IM address list arranged for the zone. Thus, the host can recognize the number of users located in the margin zone of the host and the number of users located in the designated zone of the host by counting the number of IM addresses in the corresponding IM address lists.

Each host can be informed of the number of users located in an adjacent zone, for example, by subscribing to the server covering the adjacent zone. In the case where the host 200 having the hostname "α" and the host 200*a* having the hostname "β" cover zones adjacent to each other, the host 200 subscribes to "the number of served users" of the host 200*a*, and the host 200*a* subscribes to "the number of served users" of the host 200. In addition, when the number of users served by each server changes, the server sets the changed number of users served by the server in the presence information. Then, the adjacent server is notified of the changed number of users.

Since the master server 100 can recognize the number of users served by an arbitrary host by referring to the user-management table 113, each host can inquire of the master server 100 the number of users served by a host covering a zone adjacent to the coverage zone of each host, at regular time intervals. This operation can be realized by storing the names of servers which cover zones adjacent to the coverage zone of each host, in the coverage-zone table in the master server.

The dynamic modification of the margin zone according to the present embodiment is explained below. In the following explanations, it is assumed that each of servers covering zones adjacent to each other subscribes to the number of users served by the other of the servers, and each of the hosts 200, 200*a*, and 200*b* recognizes the number of users served by the host, the number of users located in the margin zone of the host, the number of users located in the designated zone of the host, and the number of users served by each of the other hosts covering an adjacent zone, in the aforementioned manner.

Figure 28:
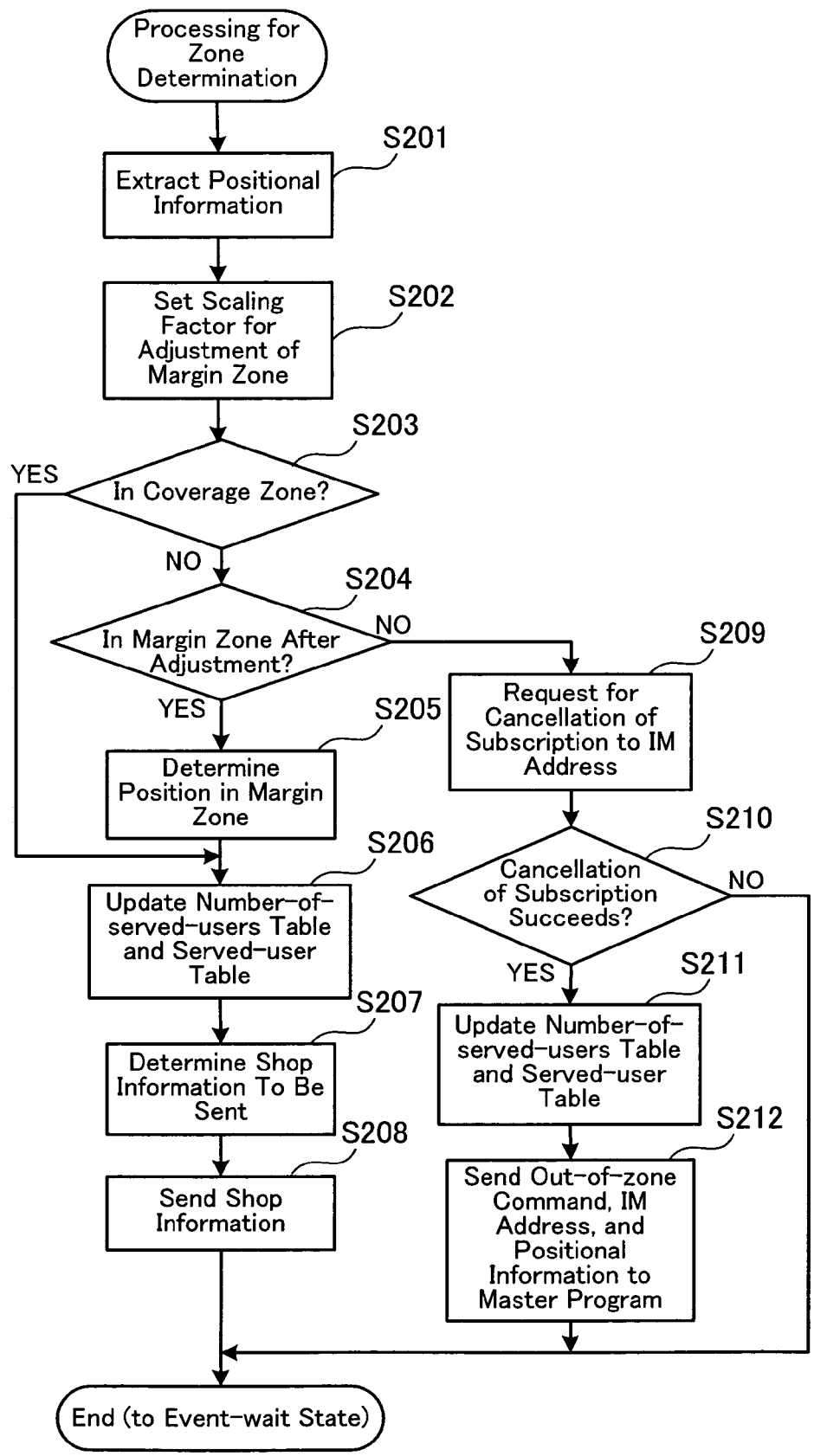
FIG. 28 is a flow diagram indicating a sequence of processing for zone determination accompanied by modification of a margin zone.

FIG. 28 is a flow diagram indicating a sequence of processing for zone determination accompanied by modification of a margin zone. Since the operations in steps S201, S203, and S205 to S212 in FIG. 28 are respectively identical to the operations in steps S111, S112, and S114 to S121 in FIG. 23, the explanations on these steps are not repeated.

<S202> The dynamic data-change unit 260 sets a scaling factor for adjustment of the margin zone. Details of the processing in this step are explained later (with reference to FIG. 29).

Thereafter, the determination with regard to the coverage zone is made. When the position of the mobile terminal is out of the coverage zone of the host (i.e., when no is determined in step S203), the operation goes to step S204.

<S204> The zone determination unit 250 determines whether or not the position extracted in step S201 is in the margin zone which is adjusted by the scaling factor. When yes is determined, the operation goes to step S205. When no is determined, the operation goes to step S209.

Figure 29:
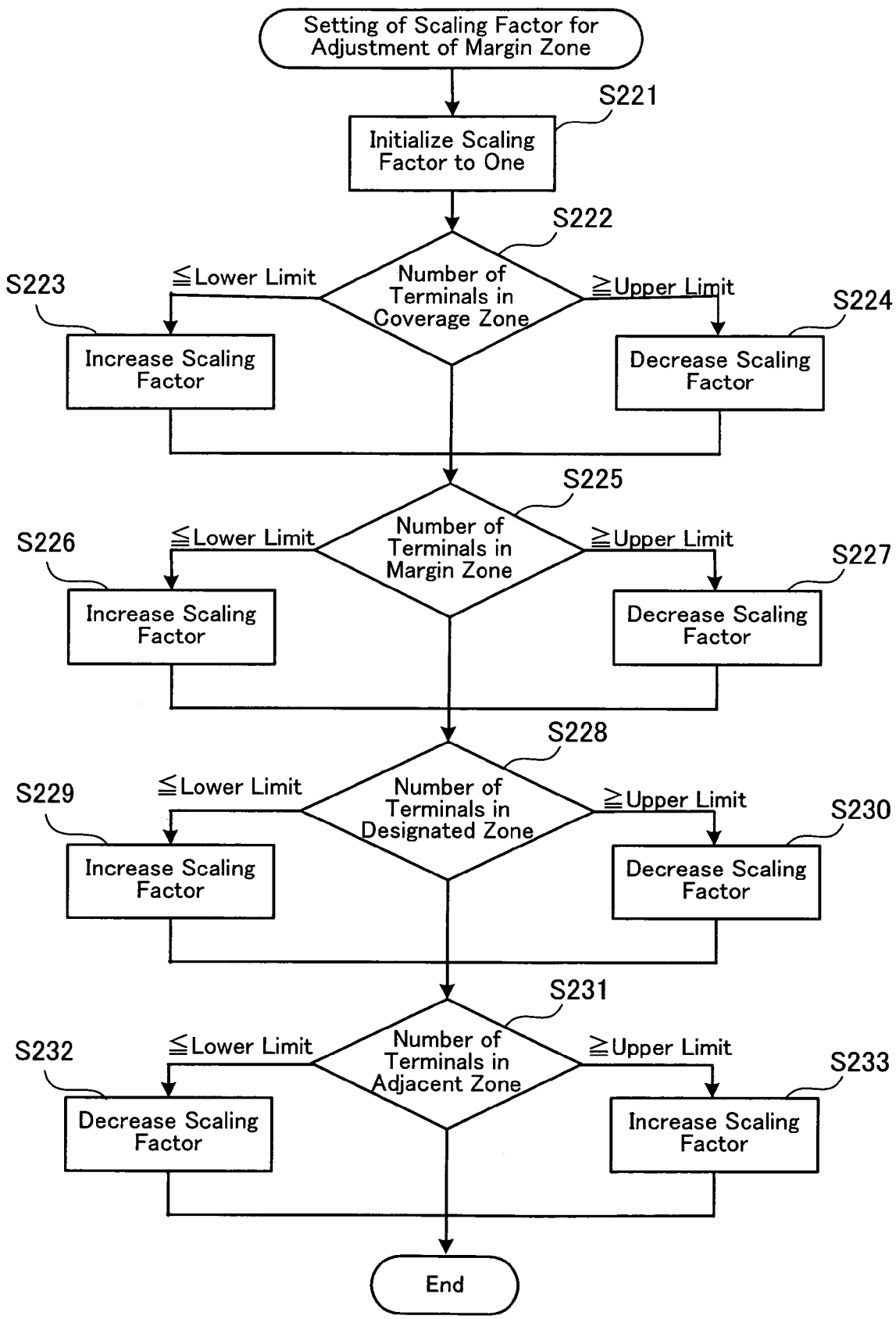
FIG. 29 is a flow diagram indicating a sequence of processing for setting a scaling factor for adjustment of the margin zone.

FIG. 29 is a flow diagram indicating a sequence of processing for setting the scaling factor for adjustment of the margin zone. The processing illustrated in FIG. 29 is explained below step by step.

<Step S221> The dynamic data-change unit 260 initializes the scaling factor to one.

<Step S222> The dynamic data-change unit 260 compares the number of mobile terminals in the coverage zone of the host 200 with a predetermined lower limit (i.e., the number of served users in the "Lower-limit Index" field) and a predetermined upper limit (i.e., the number of served users in the "Upper-limit Index" field). When the number of mobile terminals in the coverage zone is equal to or smaller than the predetermined lower limit, the operation goes to step S223. When the number of mobile terminals in the coverage zone is equal to or greater than the predetermined upper limit, the operation goes to step S224. Otherwise, the operation goes to step S225.

<Step S223> The dynamic data-change unit 260 increases the scaling factor by multiplying the current value of the scaling factor by a coefficient indicated in the "Lower-limit Index" field. Thereafter, the operation goes to step S225.

<Step S224> The dynamic data-change unit 260 decreases the scaling factor by multiplying the current value of the scaling factor by a coefficient indicated in the "Upper-limit Index" field. Thereafter, the operation goes to step S225.

<Step S225> The dynamic data-change unit 260 compares the number of mobile terminals in the margin zone of the host 200 with the predetermined lower limit and the predetermined upper limit. When the number of mobile terminals in the margin zone is equal to or smaller than the predetermined lower limit, the operation goes to step S226. When the number of mobile terminals in the margin zone is equal to or greater than the predetermined upper limit, the operation goes to step S227. Otherwise, the operation goes to step S228.

<Step S226> The dynamic data-change unit 260 increases the scaling factor by multiplying the current value of the scaling factor by a coefficient indicated in the "Lower-limit Index" field. Thereafter, the operation goes to step S228.

<Step S227> The dynamic data-change unit 260 decreases the scaling factor by multiplying the current value of the scaling factor by a coefficient indicated in the "Upper-limit Index" field. Thereafter, the operation goes to step S228.

<Step S228> The dynamic data-change unit 260 compares the number of mobile terminals in the designated zone of the host 200 with the predetermined lower limit and the predetermined upper limit. When the number of mobile terminals in the designated zone is equal to or smaller than the predetermined lower limit, the operation goes to step S229. When the number of mobile terminals in the designated zone is equal to or greater than the predetermined upper limit, the operation goes to step S230. Otherwise, the operation goes to step S231.

<Step S229> The dynamic data-change unit 260 increases the scaling factor by multiplying the current value of the scaling factor by a coefficient indicated in the "Lower-limit Index" field. Thereafter, the operation goes to step S231.

<Step S230> The dynamic data-change unit 260 decreases the scaling factor by multiplying the current value of the scaling factor by a coefficient indicated in the "Upper-limit Index" field. Thereafter, the operation goes to step S231.

<Step S231> The dynamic data-change unit 260 compares the number of mobile terminals in an adjacent zone of the host 200 with the predetermined lower limit and the predetermined upper limit. When the number of mobile terminals in the adjacent zone is equal to or smaller than the predetermined lower limit, the operation goes to step S232. When the number of mobile terminals in the adjacent zone is equal to or greater than the predetermined upper limit, the operation goes to step S233. Otherwise, the processing of FIG. 29 is completed.

<Step S232> The dynamic data-change unit 260 decreases the scaling factor by dividing the current value of the scaling factor by a coefficient indicated in the "Lower-limit Index" field. Thereafter, the processing of FIG. 29 is completed.

<Step S233> The dynamic data-change unit 260 increases the scaling factor by dividing the current value of the scaling factor by a coefficient indicated in the "Upper-limit Index" field. Thereafter, the processing of FIG. 29 is completed.

As explained above, the margin zone can be dynamically modified.

Figure 30:
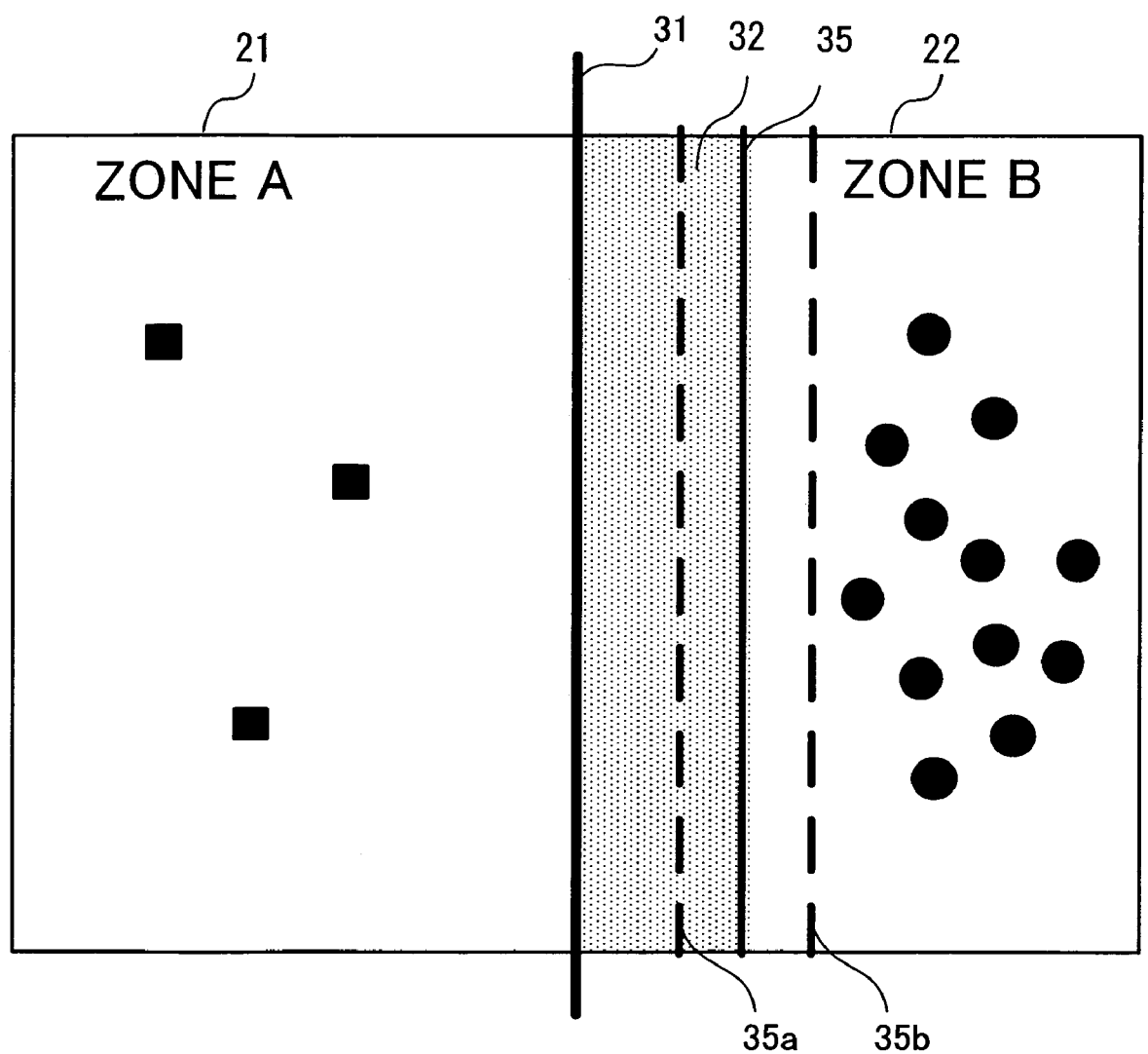
FIG. 30 is a diagram indicating an example of modification of a margin zone based on the number of terminals in each coverage zone.

FIG. 30 is a diagram indicating an example of modification of a margin zone based on the number of terminals in each coverage zone. For example, when the number of terminals in the zone 21 becomes equal to or greater than an upper limit, the margin zone 32 of the host 200 covering the zone 21 is narrowed (e.g., the outer boundary 35 of the margin zone 32 is moved to the position 35a, which is nearer to the zone 21). On the other hand, when the number of terminals in the zone 21 becomes equal to or smaller than a lower limit, the margin zone 32 is widened (e.g., the outer boundary 35 of the margin zone 32 of the host 200 covering the zone 21 is moved to the position 35b, which is farther from the zone 22).

In addition, when the number of terminals in the zone 22 becomes equal to or greater than an upper limit, the margin zone 32 is widened (e.g., the outer boundary 35 of the margin zone 32 of the host 200 covering the zone 21 is moved to the position 35b, which is farther from the zone 21). On the other hand, when the number of terminals in the zone 22 becomes equal to or smaller than a lower limit, the margin zone 32 of the host 200 covering the zone 21 is narrowed (e.g., the outer boundary 35 of the margin zone 32 is moved to the position 35a, which is nearer to the zone 21).

Figure 31:
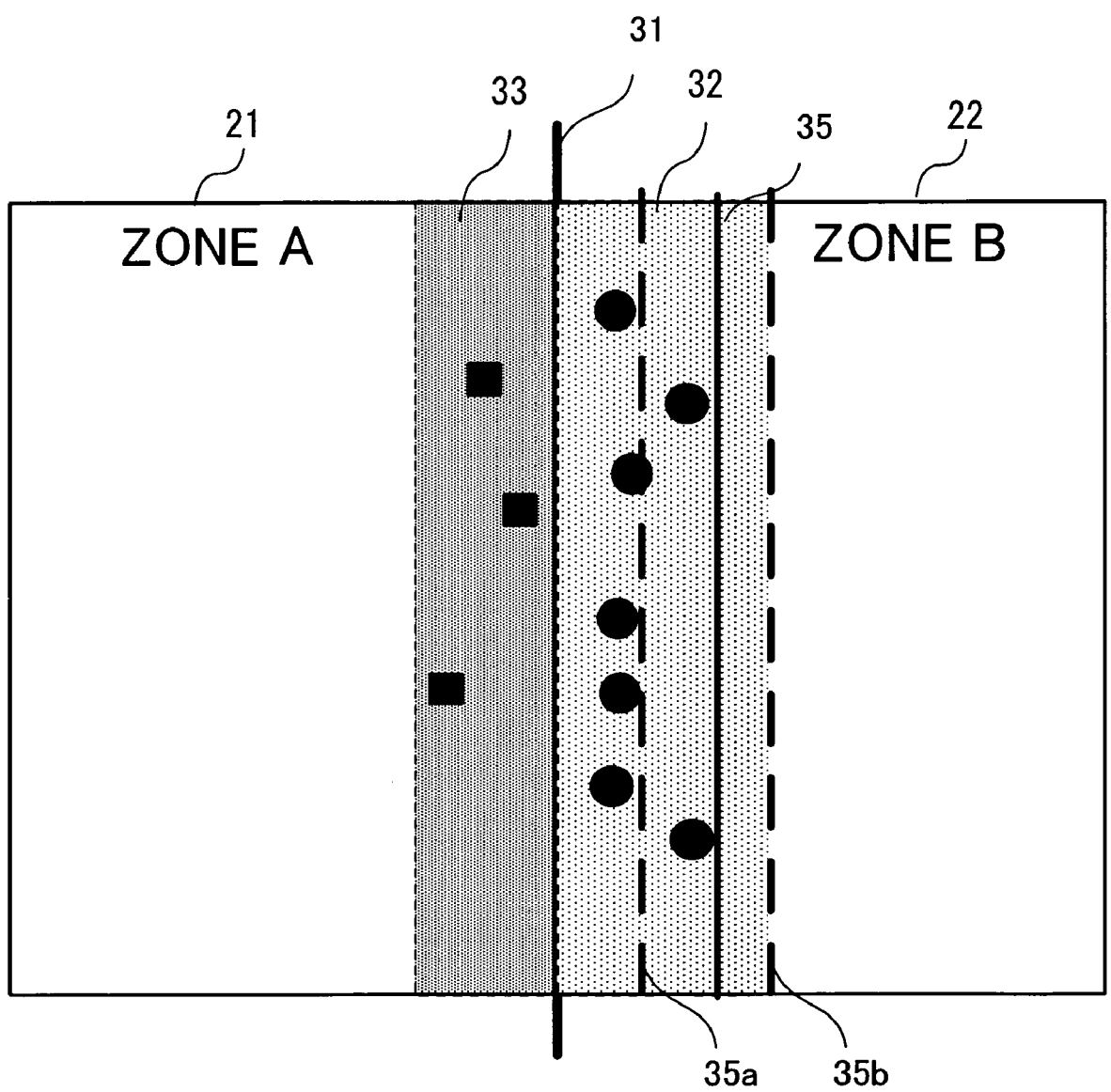
FIG. 31 is a diagram indicating an example of modification of a margin zone based on the numbers of terminals in the margin zone and the designated zone.

FIG. 31 is a diagram indicating an example of modification of a margin zone based on the numbers of terminals in the margin zone and the designated zone. For example, when the number of terminals in the margin zone 32 of the host 200 covering the zone 21 becomes equal to or greater than an upper limit, the margin zone 32 is narrowed (e.g., the outer boundary 35 of the margin zone 32 of the zone 21 is moved to the position 35a, which is nearer to the zone 21). On the other hand, when the number of terminals in the margin zone 32 of the host 200 covering the zone 21 becomes equal to or smaller than a lower limit, the margin zone 32 of the zone 21 is widened (e.g., the outer boundary 35 of the margin zone 32 is moved to the position 35b, which is farther from the zone 21).

In addition, when the number of terminals in the designated zone 33 of the host 200 covering the zone 21 becomes equal to or greater than an upper limit, the margin zone 32 is narrowed (e.g., the outer boundary 35 of the margin zone 32 is moved to the position 35a, which is nearer to the zone 21). On the other hand, when the number of terminals in the designated zone 33 becomes equal to or smaller than a lower limit, the margin zone 32 of the zone 21 is widened (e.g., the outer boundary 35 of the margin zone 32 is moved to the position 35b, which is farther from the zone 21).

The amount of the modification of the margin zone is defined in the coverage-zone table 211. For example, consider the case where the host 200 has the coverage-zone table 211 containing the contents indicated in FIG. 10, is currently in charge of service to 550 users, and receives positional information as presence information from the mobile terminal 400. The first line of the "Upper-limit Index" field of the coverage-zone table 211 for the host 200 indicates that "500, 0.8," i.e., "when the number of served users exceeds 500, the margin zone should be multiplied by 0.8." Therefore, when the zone determination is made, the margin zone is multiplied by 0.8.

At this time, the position of the mobile terminal 400 which has been determined to be in the margin zone before the decrease may become outside the zone after the decrease in the margin zone. However, even in such a case, the server in charge may not be changed at the time of the decrease of the margin zone, and when the position which is next sent from the mobile terminal 400 is also determined to be out of the margin zone, the server in charge may be changed.

Similarly, consider the case where the host has the coverage-zone table 211 containing the contents indicated in FIG. 10, is currently in charge of service to 50 users, and receives positional information as presence information from the mobile terminal 400. The first line of the "Lower-limit Index" field of the coverage-zone table 211 for this host indicates that "100, 1.5," i.e., "when the number of served users falls below 100, the margin zone should be multiplied by 1.5." Therefore, when the zone determination is made, the margin zone is multiplied by 1.5. Further, when the number of served users is between the lower and upper limits, the margin zone is not modified.

In the above cases, the modification of the margin zone is determined on the basis of the number of users served by the host 200. Further, it is also possible to determine the modification of the margin zone on the basis of the number of users in the margin zone or the designated zone in a similar manner. In the case where the modification of the margin zone is determined on the basis of the number of users in an adjacent zone, the scaling factor for the margin zone is the reciprocal of the aforementioned index. The scaling factor may be determined by using only one of the number of users served by the host 200, the number of users in the margin zone, the number of users in the designated zone, and the number of users in an adjacent zone, or a combination of ones of the above numbers of users. However, since there are inclusion relationships between the number of users served by the host 200, the number of users in the margin zone, and the number of users in the designated zone, it is possible to use one of the numbers between which an inclusion relationship exists, in determination of the scaling factor for the margin zone. For example, it is possible to determine the scaling factor for the margin zone by using the number of users in the margin zone, the number of users in the designated zone, and the number of users in an adjacent zone, and not the number of users served by the host 200. In the case where the host has the coverage-zone table 211 containing the contents indicated in FIG. 10, and the number of users in the margin zone, the number of users in the designated zone, and the number of users in an adjacent zone are respectively 550, 550, and 50, the scaling factor for the margin zone is determined to be 0.8×0.8(1+1.5) =0.43.

In the coverage-zone table 211 illustrated in FIG. 10, the values in the "Upper-limit Index" field and the "Lower-limit Index" field are commonly set for the coverage zone, the margin zone, the designated zone, and an adjacent zone. Alternatively, it is possible to independently set the values in the "Upper-limit Index" field and the "Lower-limit Index" field for the respective types of zones. For example, it is possible to independently set the values in the "Upper-limit Index" field and the "Lower-limit Index" field for each of adjacent zones located around the coverage zone. Further, it is possible to send from the adjacent zones the indexes for adjustment of the margin, instead of the number of users.

Next, processing for a change of a server in charge on the basis of the allowable residence time of users in the margin zone is explained below. When each of the hosts 200, 200a, 200b, . . . determines that the position of the mobile terminal 400 is in the margin zone of the host, the host memorizes the IM address of the mobile terminal 400 and the time at which the positional information is received. Thereafter, when the host determines again that the position of the mobile terminal 400 is in the margin zone of the host, the host calculates the interval between the current time and the time at which the mobile terminal was first determined to be in the margin zone of the host, and compares the calculated interval with the allowable residence time held in the coverage-zone table 211 illustrated in FIG. 10. When the interval exceeds the allowable residence time, the host determines that the mobile terminal 400 is out of the zone. Otherwise, the host determines that the mobile terminal 400 is within the zone. When the mobile terminal 400 is determined to be out of the zone, the host sends to the master server 100 the IM address and the positional information for processing for changing the assignment of the server in charge.

Even when the mobile terminal 400 is determined to be within the zone, the time at which the mobile terminal was first determined to be in the margin zone of the host is not cleared, and is used in comparison with the allowable residence time when positional information is received next. However, when the position of the mobile terminal of which the host is informed is determined to be in the coverage zone instead of the margin zone after the position of the mobile terminal was previously determined to be in the margin zone, the host clears the time at which the mobile terminal was first determined to be in the margin zone of the host.

Figure 32:
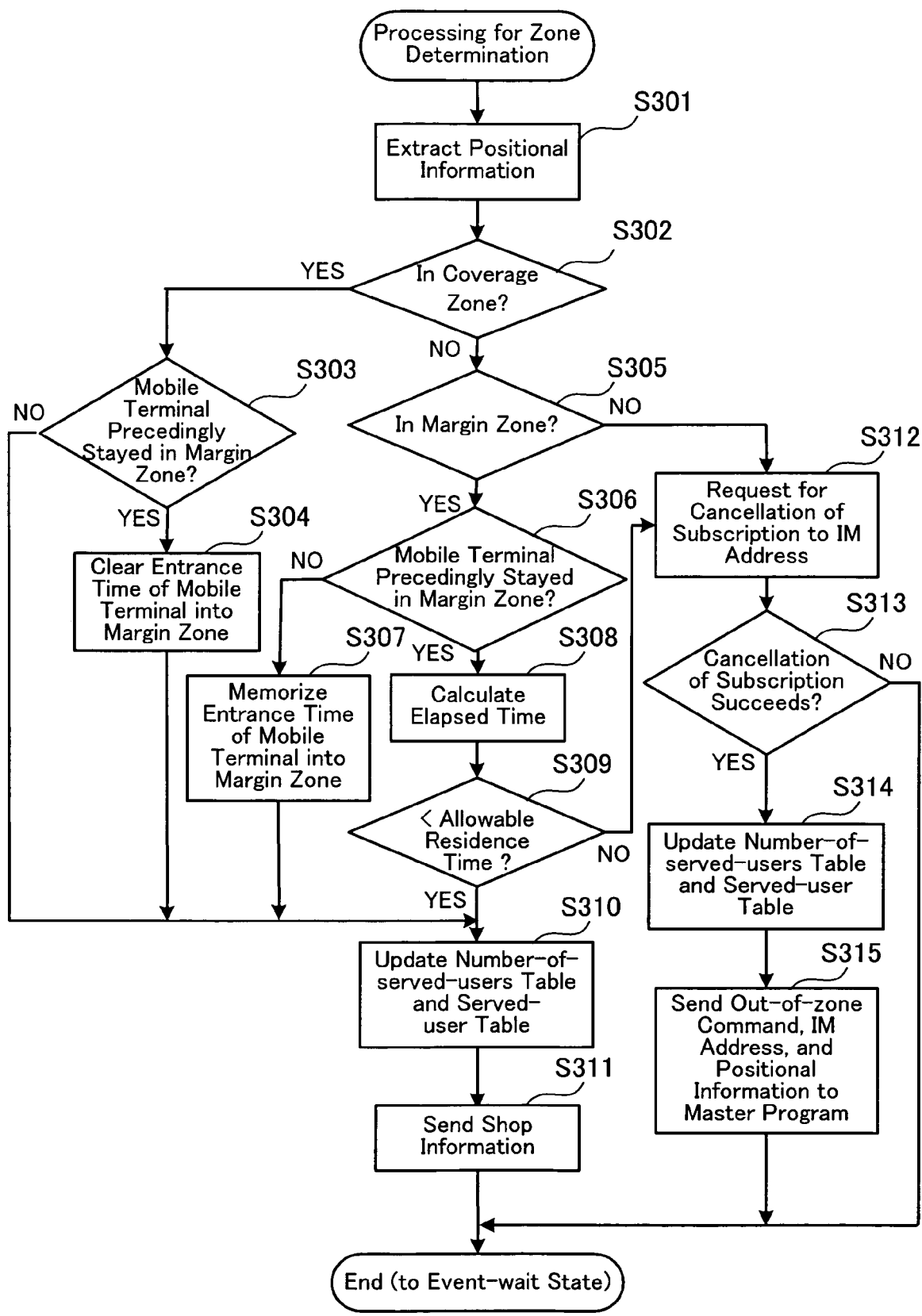
FIG. 32 is a flow diagram indicating a sequence of processing for zone determination which is performed when a server in charge is changed by using an allowable residence time in the margin zone.

FIG. 32 is a flow diagram indicating a sequence of processing for zone determination which is performed when a server in charge is changed by using the allowable residence time in the margin zone. The processing illustrated in FIG. 32 is explained below step by step.

<Step S301> The zone determination unit 250 extracts positional information from presence information.

<Step S302> The zone determination unit 250 determines whether or not the position indicated by the extracted positional information is in the coverage zone of the host 200. When yes is determined, the operation goes to step S303. When no is determined, the operation goes to step S305.

<Step S303> The zone determination unit 250 determines whether or not the mobile terminal stayed in the margin zone on the preceding occasion (on which positional information was acquired). When yes is determined, the operation goes to step S304. When no is determined, the operation goes to step S310.

<Step S304> The zone determination unit 250 clears the time at which the mobile terminal enters the margin zone. Thereafter, the operation goes to step S310.

<Step S305> When it is determined in step S302 that the mobile terminal is out of the coverage zone, the zone determination unit 250 determines whether or not the mobile terminal is in the margin zone. When yes is determined, the operation goes to step S306. When no is determined, the operation goes to step S312.

<Step S306> The zone determination unit 250 determines whether or not the mobile terminal stayed in the margin zone on the preceding occasion (on which positional information was acquired). When yes is determined, the operation goes to step S308. When no is determined, the operation goes to step S307.

<Step S307> The zone determination unit 250 memorizes the time at which the mobile terminal enters the margin zone. Thereafter, the operation goes to step S310.

<Step S308> The zone determination unit 250 calculates the time which has elapsed from the time at which the mobile terminal enters the margin zone.

<Step S309> The zone determination unit 250 determines whether or not the elapsed time is smaller than the allowable residence time. When yes is determined, the operation goes to step S310. When no is determined, the operation goes to step S312.

<Step S310> The zone determination unit 250 passes the results of the zone determination made in steps S302 to S309 to the local-data management unit 220. Then, the local-data management unit 220 updates the number-of-served-users table 213 and the served-user table 214 on the basis of the results of the zone determination passed from the zone determination unit 250.

<Step S311> The zone determination unit 250 passes the results of the zone determination made in steps S302 to S309 to the information provision unit 240. The information provision unit 240 determines shop information which is to be sent to the mobile terminal 400. For example, the information provision unit 240 determines shop information on shops in a category requested by the user of the mobile terminal 400, among the shops in the coverage zone and the margin zone, to be sent to the mobile terminal 400. Then, the information provision unit 240 sends the shop information to the mobile terminal 400 through the IM server 300, and the processing of FIG. 32 is completed.

<Step S312> The zone determination unit 250 sends to the IM server 300 a request for cancellation of a subscription to the IM address of the mobile terminal 400.

<Step S313> The zone determination unit 250 determines the success or failure of the cancellation of the subscription based on a response from the IM server 300. When the cancellation of the subscription succeeds, the operation goes to step S314. When the cancellation of the subscription fails, the processing of FIG. 32 is completed.

<Step S314> The zone determination unit 250 notifies the local-data management unit 220 of the cancellation of the subscription. Then, the local-data management unit 220 updates the number-of-served-users table 213 and the served-user table 214.

<Step S315> The information provision unit 240 sends to the master server 100 an out-of-zone command containing the IM address and the position of the mobile terminal 400, and the processing of FIG. 32 is completed.

As explained above, even in the case where the user stays in the margin zone, it is possible to change the server in charge when the time for which the user stays in the margin zone reaches a predetermined time.

Figure 33:
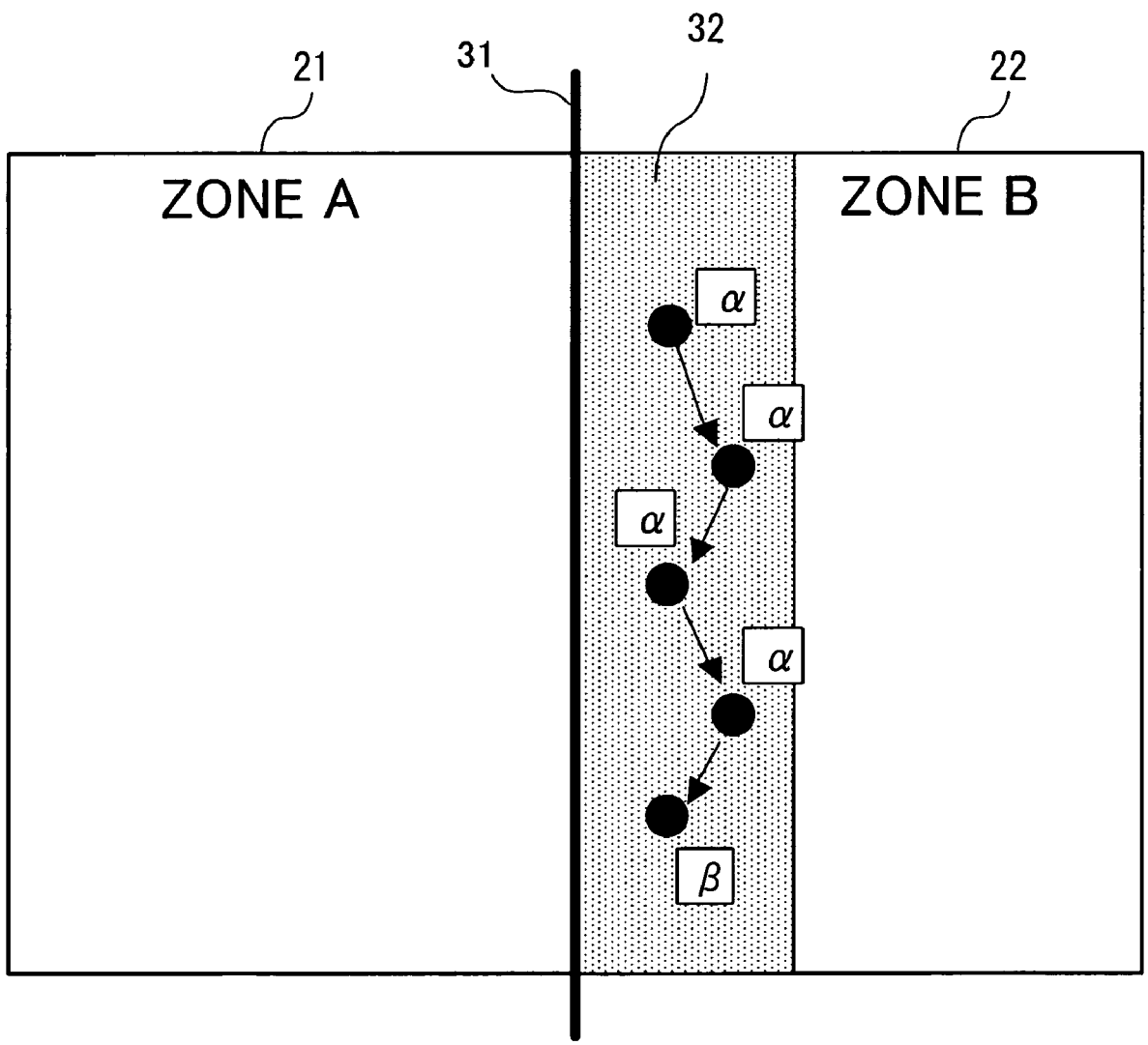
FIG. 33 is a diagram indicating an example of a change of a server in charge which is made when a mobile terminal stays in a margin zone for a long time.

FIG. 33 is a diagram indicating an example of a change of a server in charge which is made when a mobile terminal stays in a margin zone for a long time. When the user carrying the mobile terminal 400 moves from the zone 21 covered by the host 200 having the hostname "α" to the margin zone 32, the server in charge is not changed immediately after the user enters the margin zone 32. Thereafter, when the time for which the user stays in the margin zone 32 reaches a predetermined time, the server in charge of service to the mobile terminal 400 is changed to the host 200a having the hostname "β."

Finally, the dynamic modification of the allowable residence time based on the number of users served by each server, the number of users in the margin zone, the number of users in the designated zone, or the number of users in an adjacent zone is explained below.

Figure 34:
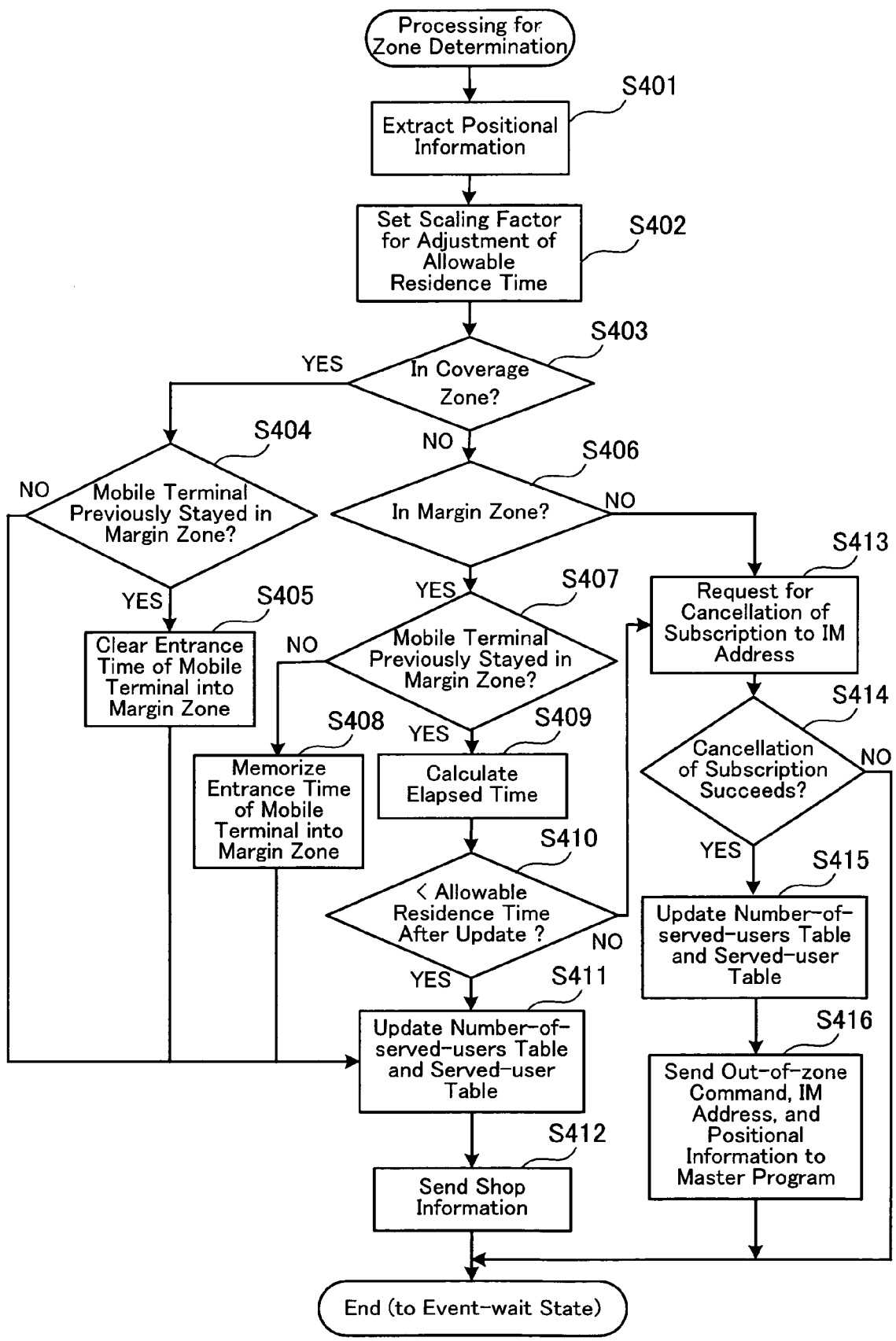
FIG. 34 is a flow diagram indicating a sequence of processing for zone determination accompanied by modification of the allowable residence time.

FIG. 34 is a flow diagram indicating a sequence of processing for zone determination accompanied by modification of the allowable residence time. Since the operations in steps S401, S403 to S409, and S411 to S416 in FIG. 34 are respectively identical to the operations in steps S301 to S308 and S310 to S315 in FIG. 32, the explanations on these steps are not repeated.

<S402> The dynamic data-change unit 260 sets a scaling factor for adjustment of the allowable residence time. Details of the processing in this step are explained later (with reference to FIG. 35).

Thereafter, processing for determination with regard to the coverage zone and the like is performed. When it is determined that the mobile terminal have been staying in the coverage zone of the host since the previous zone determination, the operation goes to step S410.

<S410> The zone determination unit 250 determines whether or not the elapsed time calculated in step S409 is smaller than the allowable residence time which is adjusted by the scaling factor. When yes is determined, the operation goes to step S411. When no is determined, the operation goes to step S413.

Figure 35:
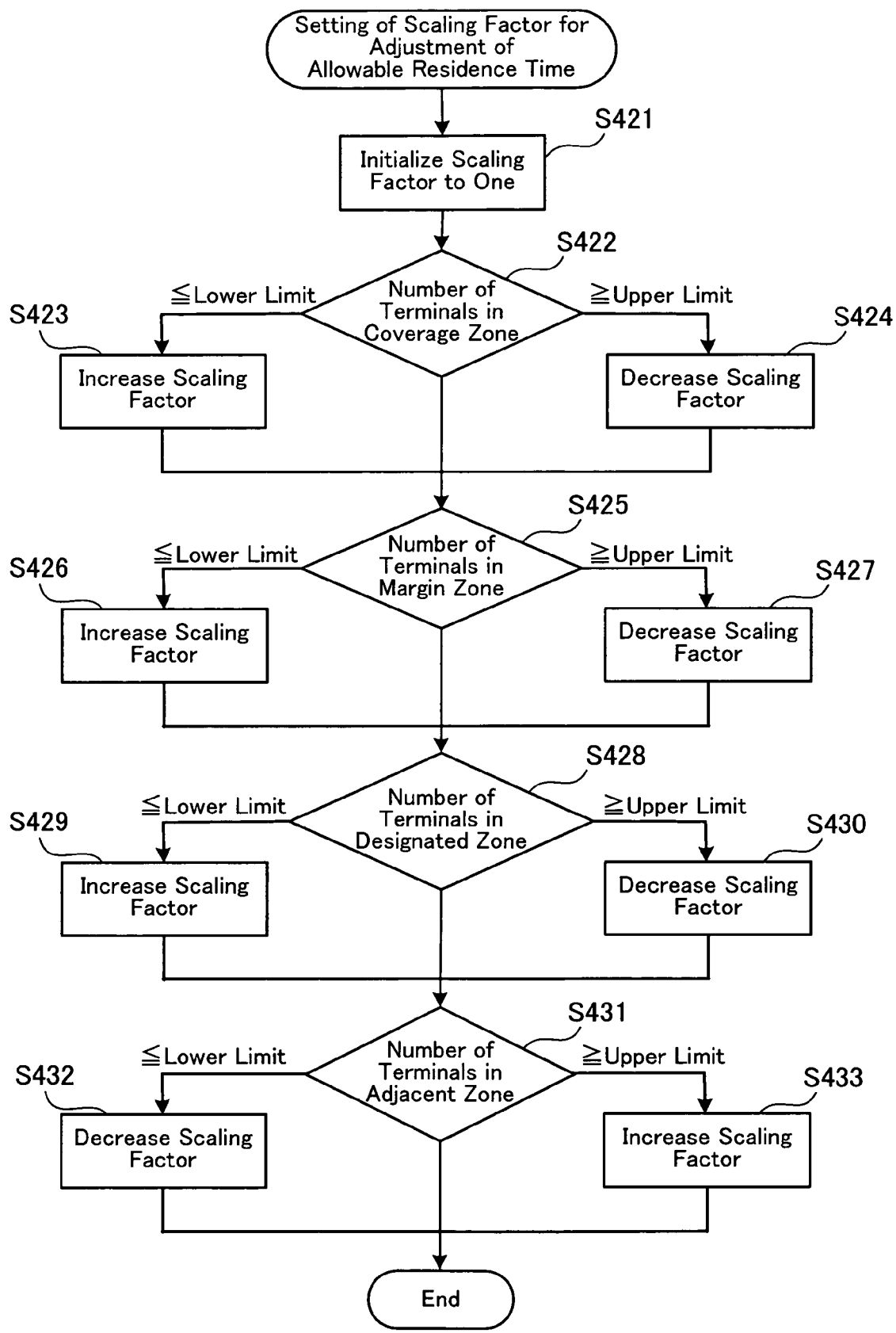
FIG. 35 is a flow diagram indicating a sequence of processing for setting a scaling factor for adjustment of the allowable residence time.

FIG. 35 is a flow diagram indicating a sequence of processing for setting a scaling factor for adjustment of the allowable residence time. The processing illustrated in FIG. 35 is explained below step by step.

<Step S421> The dynamic data-change unit 260 initializes the scaling factor to one.

<Step S422> The dynamic data-change unit 260 compares the number of mobile terminals in the coverage zone of the host 200 with a predetermined lower limit (i.e., the number of served users in the "Lower-limit Index" field) and a predetermined upper limit (i.e., the number of served users in the "Upper-limit Index" field). When the number of mobile terminals in the coverage zone is equal to or smaller than the predetermined lower limit, the operation goes to step S423. When the number of mobile terminals in the coverage zone is equal to or greater than the predetermined upper limit, the operation goes to step S424. Otherwise, the operation goes to step S425.

<Step S423> The dynamic data-change unit 260 increases the scaling factor by multiplying the current value of the scaling factor by a coefficient indicated in the "Lower-limit Index" field. Thereafter, the operation goes to step S425.

<Step S424> The dynamic data-change unit 260 decreases the scaling factor by multiplying the current value of the scaling factor by a coefficient indicated in the "Upper-limit Index" field. Thereafter, the operation goes to step S425.

<Step S425> The dynamic data-change unit 260 compares the number of mobile terminals in the margin zone of the host 200 with a predetermined lower limit and a predetermined upper limit. When the number of mobile terminals in the margin zone is equal to or smaller than the predetermined lower limit, the operation goes to step S426. When the number of mobile terminals in the margin zone is equal to or greater than the predetermined upper limit, the operation goes to step S427. Otherwise, the operation goes to step S428.

<Step S426> The dynamic data-change unit 260 increases the scaling factor by multiplying the current value of the scaling factor by a coefficient indicated in the "Lower-limit Index" field. Thereafter, the operation goes to step S428.

<Step S427> The dynamic data-change unit 260 decreases the scaling factor by multiplying the current value of the scaling factor by a coefficient indicated in the "Upper-limit Index" field. Thereafter, the operation goes to step S428.

<Step S428> The dynamic data-change unit 260 compares the number of mobile terminals in the designated zone of the host 200 with a predetermined lower limit and a predetermined upper limit. When the number of mobile terminals in the designated zone is equal to or smaller than the predetermined lower limit, the operation goes to step S429. When the number of mobile terminals in the designated zone is equal to or greater than the predetermined upper limit, the operation goes to step S430. Otherwise, the operation goes to step S431.

<Step S429> The dynamic data-change unit 260 increases the scaling factor by multiplying the current value of the scaling factor by a coefficient indicated in the "Lower-limit Index" field. Thereafter, the operation goes to step S431.

<Step S430> The dynamic data-change unit 260 decreases the scaling factor by multiplying the current value of the scaling factor by a coefficient indicated in the "Upper-limit Index" field. Thereafter, the operation goes to step S431.

<Step S431> The dynamic data-change unit 260 compares the number of mobile terminals in an adjacent zone of the host 200 with a predetermined lower limit and a predetermined upper limit. When the number of mobile terminals in the adjacent zone is equal to or smaller than the predetermined lower limit, the operation goes to step S429. When the number of mobile terminals in the adjacent zone is equal to or greater than the predetermined upper limit, the operation goes to step S430. Otherwise, the processing of FIG. 35 is completed.

<Step S432> The dynamic data-change unit 260 decreases the scaling factor by dividing the current value of the scaling factor by a coefficient indicated in the "Lower-limit Index" field. Thereafter, the processing of FIG. 35 is completed.

<Step S433> The dynamic data-change unit 260 increases the scaling factor by dividing the current value of the scaling factor by a coefficient indicated in the "Upper-limit Index" field. Thereafter, the processing of FIG. 35 is completed.

As explained above, the allowable residence time can be dynamically modified.

For example, consider the case where the host 200 has the coverage-zone table 211 indicated in FIG. 10, is currently in charge of service to 550 users, and receives positional information as presence information from the mobile terminal which was previously determined to be in the margin zone. The second line of the "Upper-limit Index" field of the coverage-zone table 211 for the host 200 in FIG. 10 indicates that "500, 0.5," i.e., "when the number of served users exceeds 500, the allowable residence time in the margin zone should be multiplied by 0.5." Therefore, when the position of which the host 200 is notified is still in the margin zone, the allowable residence time is multiplied by 0.5, and thereafter the time which has elapsed since the mobile terminal was first determined to be in the margin zone of the host is compared with the allowable residence time.

At this time, the mobile terminal which has been determined to be located in the zone on the basis of the residence time in the margin zone before the decrease of the allowable residence time may become outside the zone after the decrease due to the excess over the modified allowable residence time. However, even in such a case, the server in charge may not be changed at the time of the decrease of the allowable residence time, and when the position which is next sent from the mobile terminal is also determined to be out of the margin zone, the server in charge may be changed.

Similarly, consider the case where the host has the coverage-zone table 211 indicated in FIG. 10, is currently in charge of service to 50 users, and receives positional information as presence information from the mobile terminal. The second line of the "Lower-limit Index" field of the coverage-zone table 211 for this host in FIG. 10 indicates that "100, 1.5," i.e., "when the number of served users falls below 100, the allowable residence time in the margin zone should be multiplied by 1.5." Therefore, when the position of which the host 200 is notified is still in the margin zone, the allowable residence time is multiplied by 1.5, and thereafter the time which has elapsed since the mobile terminal was first determined to be in the margin zone of the host is compared with the allowable residence time. Further, when the number of served users is between the lower and upper limits, the allowable residence time is not modified.

In the above cases, the modification of the allowable residence time is determined on the basis of the number of users served by the host 200. Further, it is also possible to determine the modification of the allowable residence time on the basis of the number of users in the margin zone or the designated zone in a similar manner. In the case where the modification of the allowable residence time is determined on the basis of the number of users in an adjacent zone, the scaling factor for the allowable residence time is the reciprocal of the aforementioned index. The scaling factor may be determined by using only one of the number of users served by the host 200, the number of users in the margin zone, the number of users in the designated zone, and the number of users in an adjacent zone. However, since there are inclusion relationships between the number of users served by the host 200, the number of users in the margin zone, and the number of users in the designated zone, it is impossible to use both the numbers between which an inclusion relationship exists, in determination of the scaling factor for the allowable residence time. For example, in the case where the host has the coverage-zone table 211 indicated in FIG. 10, and the number of users in the margin zone, the number of users in the designated zone, and the number of users in an adjacent zone are respectively 550, 550, and 50, the scaling factor for the allowable residence time is determined to be $0.5 \times 0.5 \times (1+1.5) = 0.17$.

In the coverage-zone table 211 illustrated in FIG. 10, the values in the "Upper-limit Index" field and the "Lower-limit Index" field are commonly set for the coverage zone, the number of users in the margin zone, the number of users in the designated zone, and the number of users in an adjacent zone. Alternatively, it is possible to independently set the values in the "Upper-limit Index" field and the "Lower-limit Index" field for each type of zones. For example, it is possible to independently set the values in the "Upper-limit Index" field and the "Lower-limit Index" field for each of adjacent zones located around the coverage zone. Further, it is possible to send from the adjacent zones the indexes for adjustment of the allowable residence time, instead of the number of users. Furthermore, it is possible to dynamically modify the allowable residence time in the margin zone after the margin zone per se is dynamically modified.

The above processing functions can be realized by computers. In this case, programs describing details of processing for realizing the functions which the master server 100, the hosts 200, 200a, 200b, . . . , and the mobile terminal 400 should have are provided. When the computers execute the above programs, the above processing functions can be realized on the computers.

The programs describing the details of the processing can be stored in recording mediums which can be read by the computers. The recording mediums may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the programs into the market, for example, it is possible to sell portable recording mediums such as DVDs or CD-ROMs in which the programs are recorded. Alternatively, it is possible to store the programs in a storage device belonging to a server computer, and transfer the programs to other computers through a network.

Each of the computers which executes one of the above programs stores the program in a storage device belonging to the computer, where the program is originally recorded in, for example, a portable recording medium. In this case, the computer reads the program from the storage device, and performs processing in accordance with the program. Alternatively, the computer may directly read the program from the portable recording medium for performing processing in accordance with the program. Further, the computer can sequentially execute processing in accordance with each portion of the program every time the portion of the program is transferred from the server computer.

As explained above, according to the present invention, information provision to a mobile terminal is started when the mobile terminal enters the coverage zone, and ended when the mobile terminal goes out of the margin zone located along the outer boundary of the coverage zone. That is, when the mobile terminal goes out of the coverage zone, and is still in the margin zone, the information provision is continued. Thus, it is possible to suppress the frequency of occurrence of switching operations for starting or ending information provision.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information provision method for providing to a mobile terminal information corresponding to a position of the mobile terminal by using a computer, the information provision method comprising:

acquiring information on the position of said mobile terminal;

determining whether or not said mobile terminal is in one of a coverage zone and a margin zone on the basis of said information on the position, where the coverage zone and the margin zone are defined in advance so that the margin zone is outside the coverage zone and immediately adjacent to an outer boundary of the coverage zone;

starting information provision to said mobile terminal when the mobile terminal enters the coverage zone; and ending said information provision to said mobile terminal when the mobile terminal goes out of the margin zone after the mobile terminal becomes a destination of the information provision, wherein an allowable residence time in said margin zone is set in advance, and said information provision is ended when a time for which said mobile terminal stays in said margin zone exceeds said allowable residence time.

2. The information provision method according to claim 1, wherein said margin zone is dynamically modified on the basis of information inputted from outside.

3. The information provision method according to claim 2, wherein said information inputted from outside is the number of mobile terminals in an adjacent zone.

4. The information provision method according to claim 2, wherein said information inputted from outside is the number of mobile terminals in said coverage zone.

5. The information provision method according to claim 2, wherein said information inputted from outside is the number of mobile terminals in said margin zone.

6. The information provision method according to claim 2, wherein said information inputted from outside is the number of mobile terminals in a portion of said coverage zone which is designated in advance.

7. The information provision method according to claim 1, wherein said allowable residence time is dynamically modified on the basis of information inputted from outside.

8. The information provision method according to claim 7, wherein said information inputted from outside is the number of mobile terminals in an adjacent zone.

9. The information provision method according to claim 7, wherein said information inputted from outside is the number of mobile terminals in said coverage zone.

10. The information provision method according to claim 7, wherein said information inputted from outside is the number of mobile terminals in said margin zone.

11. The information provision method according to claim 7, wherein said information inputted from outside is the number of mobile terminals in a portion of said coverage zone which is designated in advance.

12. The information provision method according to claim 1, wherein said computer acquires information on the position of said mobile terminal when the computer receives a notification that the mobile terminal is in said coverage zone, from a master server which controls an entire service for information provision.

13. The information provision method according to claim 1, wherein a master server controls an entire service for information provision, and when said information provision to said mobile terminal is ended, said computer notifies the master server that a setting for the information provision to the mobile terminal is cancelled.

14. The information provision method according to claim 13, wherein said computer starts acquisition of said information on the position of said mobile terminal when the computer receives from said master server a request for starting the information provision to the mobile terminal, and repeatedly acquires the information on the position until the information provision is ended.

15. An information provision device for providing to a mobile terminal information corresponding to a position of the mobile terminal, the information provision device comprising:

a position-information acquisition unit to acquire information on the position of said mobile terminal;

a zone determination unit to determine whether or not said mobile terminal is in one of a coverage zone and a margin zone on the basis of said information on the position, where the coverage zone and the margin zone are defined in advance so that the margin zone is outside the coverage zone and immediately adjacent to an outer boundary of the coverage zone; and an information provision unit to start information provision to said mobile terminal when the mobile terminal enters the coverage zone, and end the information provision to the mobile terminal when the mobile terminal goes out of the margin zone after the mobile terminal becomes a destination of the information provision, wherein an allowable residence time in said margin zone is set in advance, and said information provision is ended when a time for which said mobile terminal stays in said margin zone exceeds said allowable residence time.

16. A computer-readable recording medium recording an information provision program for providing to a mobile terminal information corresponding to a position of the mobile terminal, said information provision program making a computer perform operations of:

acquiring information on the position of said mobile terminal;

determining whether or not said mobile terminal is in one of a coverage zone and a margin zone on the basis of said information on the position, where the coverage zone and the margin zone are defined in advance so that the margin zone is outside the coverage zone and immediately adjacent to an outer boundary of the coverage zone;

starting information provision to said mobile terminal when the mobile terminal enters the coverage zone; and ending said information provision to said mobile terminal when the mobile terminal goes out of the margin zone after the mobile terminal becomes a destination of the information provision, wherein an allowable residence time in said margin zone is set in advance, and said information provision is ended when a time for which said mobile terminal stays in said margin zone exceeds said allowable residence time.

* * * * *